US012652714B2

(12) United States Patent
Shi et al.

(10) Patent No.: US 12,652,714 B2
(45) Date of Patent: Jun. 9, 2026

(54) MULTI-DEVICE COLLABORATION METHOD, ELECTRONIC DEVICE, AND RELATED PRODUCT

(71) Applicant: Honor Device Co., Ltd., Shenzhen (CN)

(72) Inventors: Jiaojiao Shi, Shenzhen (CN); Chuan Qin, Shenzhen (CN); Juan Li, Shenzhen (CN); Guoqiang Qi, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 258 days.

(21) Appl. No.: 18/550,813

(22) PCT Filed: Dec. 2, 2022

(86) PCT No.: PCT/CN2022/136343
§ 371 (c)(1),
(2) Date: Sep. 15, 2023

(87) PCT Pub. No.: WO2024/016559
PCT Pub. Date: Jan. 25, 2024

(65) Prior Publication Data
US 2025/0039961 A1     Jan. 30, 2025

(30) Foreign Application Priority Data

Jul. 18, 2022    (CN) ........................ 202210839523.X

(51) Int. Cl.
*H04W 76/14*        (2018.01)
*H04M 1/72412*      (2021.01)

(52) U.S. Cl.
CPC ....... *H04W 76/14* (2018.02); *H04M 1/72412* (2021.01)

(58) Field of Classification Search
CPC ................................. H04W 4/80; H04W 76/14
See application file for complete search history.

(56) References Cited

U.S. PATENT DOCUMENTS

2010/0178873 A1*  7/2010  Lee ........................ H04B 17/27
                                                    455/41.3
2011/0037712 A1*  2/2011  Kim ...................... G06F 3/0488
                                                    345/173
(Continued)

FOREIGN PATENT DOCUMENTS

CN        112286618 A        1/2021
CN        112995727 A        6/2021
(Continued)

OTHER PUBLICATIONS

Bing, Lu; "Honor Magic Book 16Pro Multi-screen Collaborative Smart Office"; Computers & Networking; Jan. 26, 2022; 2 pages.

*Primary Examiner* — Wen W Huang
(74) *Attorney, Agent, or Firm* — Slater Matsil, LLP

(57)            ABSTRACT

Embodiments of this application provide a multi-device collaboration method, an electronic device, and a related product. The method includes: A first electronic device switches from a first page to a second page, and establishes a first near field communication connection to a first near field device in response to a user's operation on the first page, where on the second page, a device identifier of the first electronic device comes into contact with a device identifier of the first near field device; and the first electronic device switches to a third page, maintains the first near field communication connection to the first near field device, and establishes the first near field communication connection to a second near field device in response to the user's operation on the second page.

17 Claims, 65 Drawing Sheets

(56)                    References Cited

U.S. PATENT DOCUMENTS

| | | | |
|---|---|---|---|
| 2014/0365944 A1* | 12/2014 | Moore ................. | G09B 29/003 |
| | | | 715/772 |
| 2015/0319554 A1 | 11/2015 | Blanche et al. | |
| 2016/0037563 A1 | 2/2016 | Debates et al. | |
| 2016/0128124 A1* | 5/2016 | Liu ....................... | H04L 67/306 |
| | | | 709/204 |
| 2017/0086014 A1* | 3/2017 | Hwang ................... | H04L 67/55 |
| 2017/0311368 A1* | 10/2017 | Kandur Raja .......... | H04L 12/28 |
| 2019/0068393 A1* | 2/2019 | Lee ....................... | G06V 10/255 |
| 2021/0026527 A1 | 1/2021 | Humbert et al. | |

FOREIGN PATENT DOCUMENTS

| | | | |
|---|---|---|---|
| CN | 113467904 A | 10/2021 | |
| CN | 113873679 A | 12/2021 | |
| CN | 114065706 A | 2/2022 | |
| CN | 114077373 A | 2/2022 | |
| CN | 114222020 A | 3/2022 | |
| CN | 114629932 A | 6/2022 | |
| CN | 114679610 A | 6/2022 | |
| CN | 115002937 A | 9/2022 | |
| WO | 2022127661 A1 | 6/2022 | |

* cited by examiner

Electronic device 100

FIG. 2

CONT. FROM FIG. 16A

TO FIG. 16C

CONT.
FROM

FROM

FROM

FROM

550

Switch the device?

No          Yes

☐ Don't ask again          59

521

TO

MULTI-DEVICE COLLABORATION METHOD, ELECTRONIC DEVICE, AND RELATED PRODUCT

CROSS-REFERENCE TO RELATED APPLICATIONS

This application is a national stage of International Application No. PCT/CN2022/136343 filed on Dec. 2, 2022, which claims priority to Chinese Patent Application No. 202210839523.X filed on Jul. 18, 2022. The disclosures of both of the aforementioned application are hereby incorporated by reference in their entireties.

TECHNICAL FIELD

This application relates to the field of terminal technologies, and in particular, to a multi-device collaboration method, an electronic device, and a related product.

BACKGROUND

Multi-device collaboration is a distribution technology applied to a plurality of electronic devices. By using the multi-device collaboration technology, cross-system and cross-device collaboration can be performed between two or more electronic devices, so as to implement resource sharing and collaborative operations.

With continuous development of terminal technologies, a plurality of different collaboration modes have emerged for multi-device collaboration. In a conventional solution, if a master device and a slave device support only one collaboration mode, the master device and the slave device establish multi-device collaboration based on the collaboration mode. If a master device and a slave device support a plurality of collaboration modes, when the master device and the slave device establish multi-device collaboration for the first time, a default collaboration mode of the two parties is used. If it is not the first time that the master device and the slave device establish multi-device collaboration, a collaboration mode used when the two parties previously established multi-device collaboration is selected.

However, when a user uses the master device and the slave device to perform multi-device collaboration, a collaboration mode expected to be used is probably different from the previously used collaboration mode. In this state, the user can change the collaboration mode only by using another application in the master device or the slave device, but cannot select, in a process of establishing multi-device collaboration, a collaboration mode that the user expects to use. This affects user experience.

SUMMARY

Embodiments of this application provide a multi-device collaboration method, an electronic device, and a related product, to improve user experience of multi-device collaboration.

According to a first aspect, an embodiment of this application provides a multi-device collaboration method, including: A first electronic device displays a first page on a display, where the first page includes a device identifier of the first electronic device and a device identifier of at least one near field device, the near field device includes a second electronic device, and there are a plurality of collaboration modes between the first electronic device and the second electronic device; the first electronic device displays, on the first page, a mode identifier of at least one of the plurality of collaboration modes in response to a user's operation on the first page; the first electronic device determines a collaboration mode corresponding to a first mode identifier as a target collaboration mode in response to the user's tap operation on the first mode identifier, where the first mode identifier is any one of a mode identifier of the at least one collaboration mode; and the first electronic device establishes multi-device collaboration with the second electronic device based on the target collaboration mode.

According to the method provided in this embodiment of this application, when the first electronic device and the second electronic device support a plurality of collaboration modes, the user may select, on the first electronic device, the target collaboration mode that the user expects to use. In this way, the first electronic device and the second electronic device can establish multi-device collaboration based on the target collaboration mode, thereby improving user experience.

In an implementation, that the first electronic device displays, on the first page, a mode identifier of at least one of the plurality of collaboration modes in response to a user's operation on the first page includes: the first electronic device displays, on the first page, the mode identifier of the at least one of the plurality of collaboration modes in response to an operation of dragging, by the user on the first page, a device identifier of the second electronic device so that the device identifier of the second electronic device comes into contact with the device identifier of the first electronic device. In this way, when the user wants to establish multi-device collaboration between the first electronic device and the second electronic device, the user can intuitively learn, based on a mode identifier, a collaboration mode that can be selected by the user.

In an implementation, that the first electronic device displays, on the first page, a mode identifier of at least one of the plurality of collaboration modes in response to a user's operation on the first page includes: the first electronic device establishes multi-device collaboration with the second electronic device based on a preset collaboration mode in response to an operation of dragging, by the user on the first page, a device identifier of the second electronic device so that the device identifier of the second electronic device comes into contact with the device identifier of the first electronic device; the first electronic device displays, on the first page, a mode identifier of the preset collaboration mode; and the first electronic device displays, on the first page, the mode identifier of the at least one of the plurality of collaboration modes in response to the user's tap operation on the mode identifier of the preset collaboration mode. In this way, when the user wants to establish multi-device collaboration between the first electronic device and the second electronic device, the first electronic device may first establish multi-device collaboration with the second electronic device based on the preset collaboration mode, and then the user selects the target collaboration mode.

In an implementation, that the first electronic device establishes multi-device collaboration with the second electronic device based on the target collaboration mode includes: the first electronic device switches the multi-device collaboration between the first electronic device and the second electronic device from the preset collaboration mode to the target collaboration mode. In this way, when the first electronic device and the second electronic device support a plurality of collaboration modes, the first electronic device and the second electronic device may first establish multi-device collaboration based on the preset collaboration mode, and then the user may select, on the first electronic device, the target collaboration mode that the user expects to use. The first electronic device may switch from the preset collaboration mode to the target collaboration mode based on the user's selection, thereby improving user experience.

In an implementation, after the first electronic device establishes multi-device collaboration with the second electronic device based on the target collaboration mode, the method further includes: the first electronic device displays, on the first page, a mode identifier of the target collaboration mode; and the first electronic device terminates the multi-device collaboration with the second electronic device in response to the user's operation on the mode identifier of the target collaboration mode. In this way, the user may terminate, on the first page, the multi-device collaboration between the first electronic device and the second electronic device, thereby improving user experience.

In an implementation, the method further includes: the first electronic device displays a first button on the first page; the first electronic device displays a second page on the display in response to the user's tap operation on the first button, where the second page includes a first list, and the first list includes an option of at least one collaboration mode; the first electronic device displays a third page in response to the user's tap operation on a first option, where the first option is an option of any collaboration mode in the first list, and the third page includes a switch button of the collaboration mode corresponding to the first option; and the first electronic device turns on or turns off the collaboration mode in response to the user's tap operation on the switch button. In this way, the user may directly enter a multi-device collaboration settings page from a multi-device collaboration connection page, to perform control such as turn-on and turn-off on an automatic collaboration service, thereby improving user experience.

In an implementation, the method further includes: the first electronic device displays a second button on the first page; the first electronic device displays a second list on the first page in response to the user's tap operation on the second button, where the second list includes an option of at least one collaboration mode; and the first electronic device displays first support information on the first page in response to the user's tap operation on a second option, where the second option is an option of any collaboration mode in the second list, and the first support information includes whether the first electronic device and/or the near field device support/supports the collaboration mode corresponding to the second option. In this way, the first electronic device can directly display support information of the automatic collaboration service on the multi-device collaboration connection page, thereby improving user experience.

In an implementation, the first support information includes a preset tag added to a device identifier, on the first page, of an electronic device that supports the collaboration mode corresponding to the second option.

In an implementation, the method further includes: the first electronic device displays second support information on the first page in response to the user's tap operation on the second option, where the second support information includes whether another electronic device other than the first electronic device and the near field device supports the collaboration mode corresponding to the second option.

In an implementation, the method further includes: in a state in which the first electronic device has established first multi-device collaboration with a first near field device, the first electronic device connects a second near field device to the first multi-device collaboration in response to an operation of dragging, by the user on the first page, a device identifier of the second near field device so that the device identifier of the second near field device comes into contact with the device identifier of the first electronic device, where the first multi-device collaboration is established based on a first collaboration mode, the first collaboration mode supports simultaneous connection of three electronic devices, and the second near field device is a near field device that supports the first collaboration mode.

In an implementation, the method further includes: in a state in which the first electronic device has established second multi-device collaboration with a first near field device, the first electronic device terminates the second multi-device collaboration and establishes multi-device collaboration with a second near field device in response to an operation of dragging, by the user on the first page, a device identifier of the second near field device so that the device identifier of the second near field device comes into contact with the device identifier of the first electronic device, where the second multi-device collaboration is established based on a second collaboration mode, and the second collaboration mode does not support simultaneous connection of three electronic devices.

In an implementation, the method further includes: in a state in which the first electronic device has established multi-device collaboration with an off-ring device, the first electronic device terminates the established multi-device collaboration with the off-ring device and establishes multi-device collaboration with a third near field device in response to an operation of dragging, by the user on the first page, a device identifier of the third near field device so that the device identifier of the third near field device comes into contact with the device identifier of the first electronic device.

In an implementation, the method further includes: in a state in which a fourth near field device has established multi-device collaboration with an off-ring device or the fourth near field device has established multi-device collaboration with a fifth near field device, the first electronic device terminates the established multi-device collaboration between the fourth near field device and the fifth near field device or the off-ring device, and establishes multi-device collaboration between the first electronic device and the fourth near field device in response to an operation of dragging, by the user on the first page, a device identifier of the fourth near field device so that the device identifier of the fourth near field device comes into contact with the device identifier of the first electronic device.

In an implementation, the method further includes: in a state in which each of the first electronic device and a sixth near field device has established multi-device collaboration with another electronic device, the first electronic device terminates the multi-device collaboration established by each of the first electronic device and the sixth near field device, and establishes multi-device collaboration between the first electronic device and the sixth near field device in response to an operation of dragging, by the user on the first page, a device identifier of the sixth near field device so that the device identifier of the sixth near field device comes into contact with the device identifier of the first electronic device.

In this way, when the first electronic device and/or the near field device have/has established multi-device collaboration, the user may directly add, on the first page, a device that is to participate in multi-device collaboration or switch a device participating in multi-device collaboration, thereby improving user experience.

In an implementation, the method further includes: on the first page, the first electronic device displays, in a first preset color, a device identifier of each electronic device that has established a multi-device connection, and displays, in a second preset color, a device identifier of each electronic device that has not established a multi-device connection, where the first preset color is different from the second preset color. In this way, the first page may use different colors of a device identifier to indicate states of multi-device collaboration establishment by a master device or a near field device, thereby improving user experience.

According to a second aspect, an embodiment of this application further provides a multi-device collaboration apparatus, including: a display module, configured to display a first page on a display, where the first page includes a device identifier of the first electronic device and a device identifier of at least one near field device, the near field device includes a second electronic device, and there are a plurality of collaboration modes between the first electronic device and the second electronic device; a first response module, configured to display, on the first page, a mode identifier of at least one of the plurality of collaboration modes in response to a user's operation on the first page; a second response module, configured to determine a collaboration mode corresponding to a first mode identifier as a target collaboration mode in response to the user's tap operation on the first mode identifier, where the first mode identifier is any one of a mode identifier of the at least one collaboration mode; and a connection module, configured to establish multi-device collaboration with the second electronic device based on the target collaboration mode.

According to the apparatus provided in this embodiment of this application, when the first electronic device and the second electronic device support a plurality of collaboration modes, the user may select, on the first electronic device, the target collaboration mode that the user expects to use. In this way, the first electronic device and the second electronic device can establish multi-device collaboration based on the target collaboration mode, thereby improving user experience.

According to a third aspect, an embodiment of this application further provides a computer-readable storage medium. The computer-readable storage medium stores instructions. When the instructions are run on a computer, the computer is enabled to perform the method in the foregoing aspect and the implementations of the foregoing aspect.

According to a fourth aspect, an embodiment of this application further provides a computer program product including instructions. When the computer program product runs on a computer, the computer is enabled to perform the method in the foregoing aspect and the implementations of the foregoing aspect.

According to a fifth aspect, an embodiment of this application further provides a chip system. The chip system includes a processor, configured to support the foregoing terminal device in implementing functions in the foregoing aspects, for example, generating or processing information in the foregoing method.

6

Figure 2:
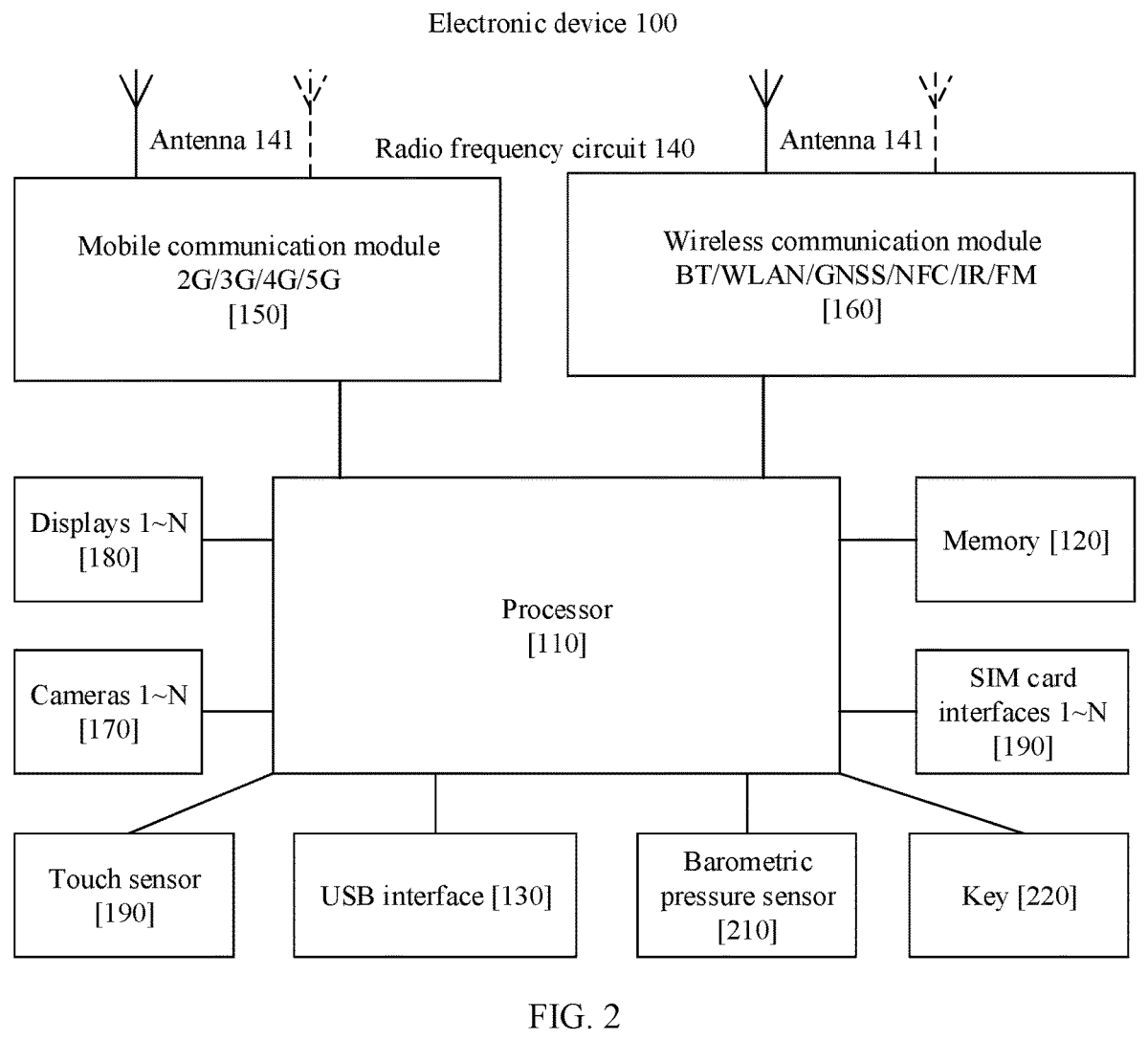
Figure 3:
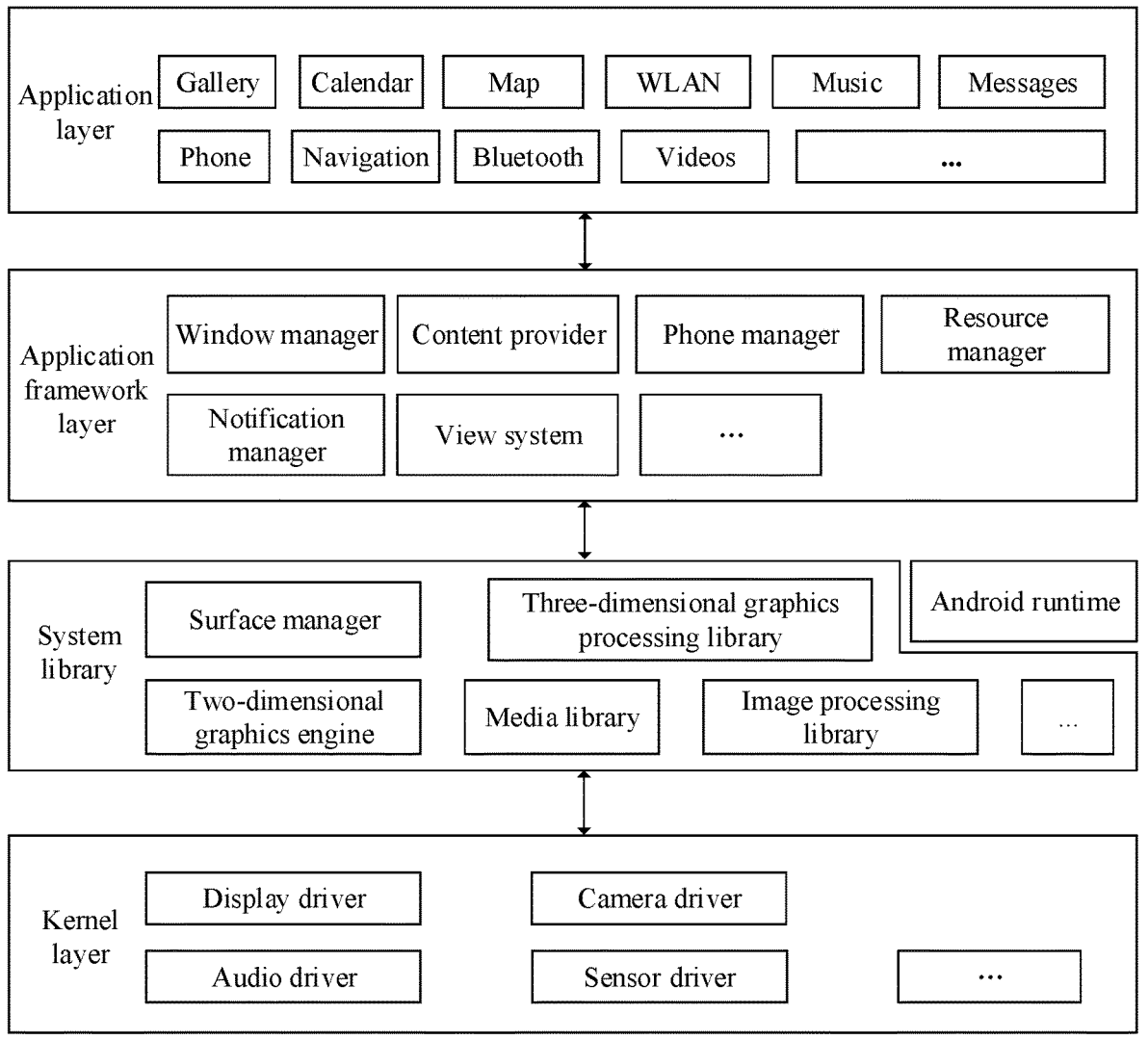
Figure 4:
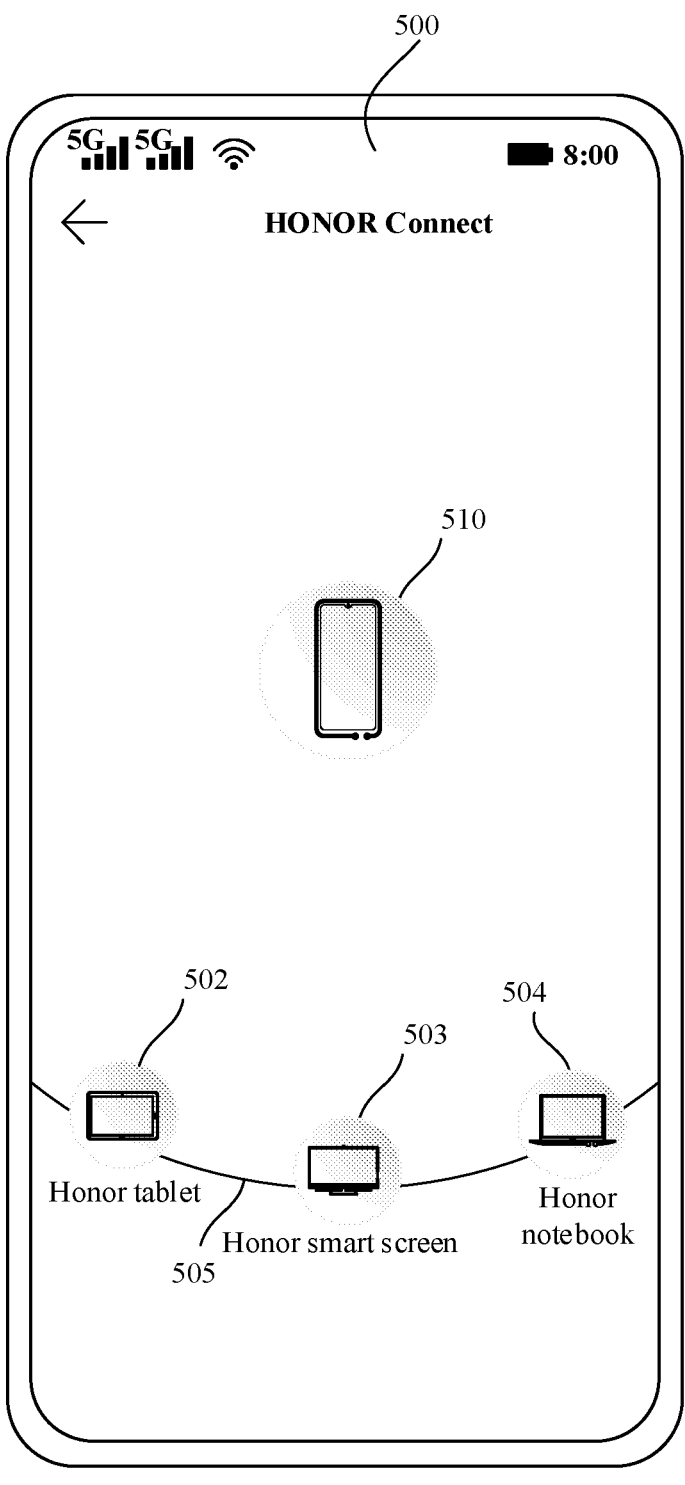
Figure 5A:
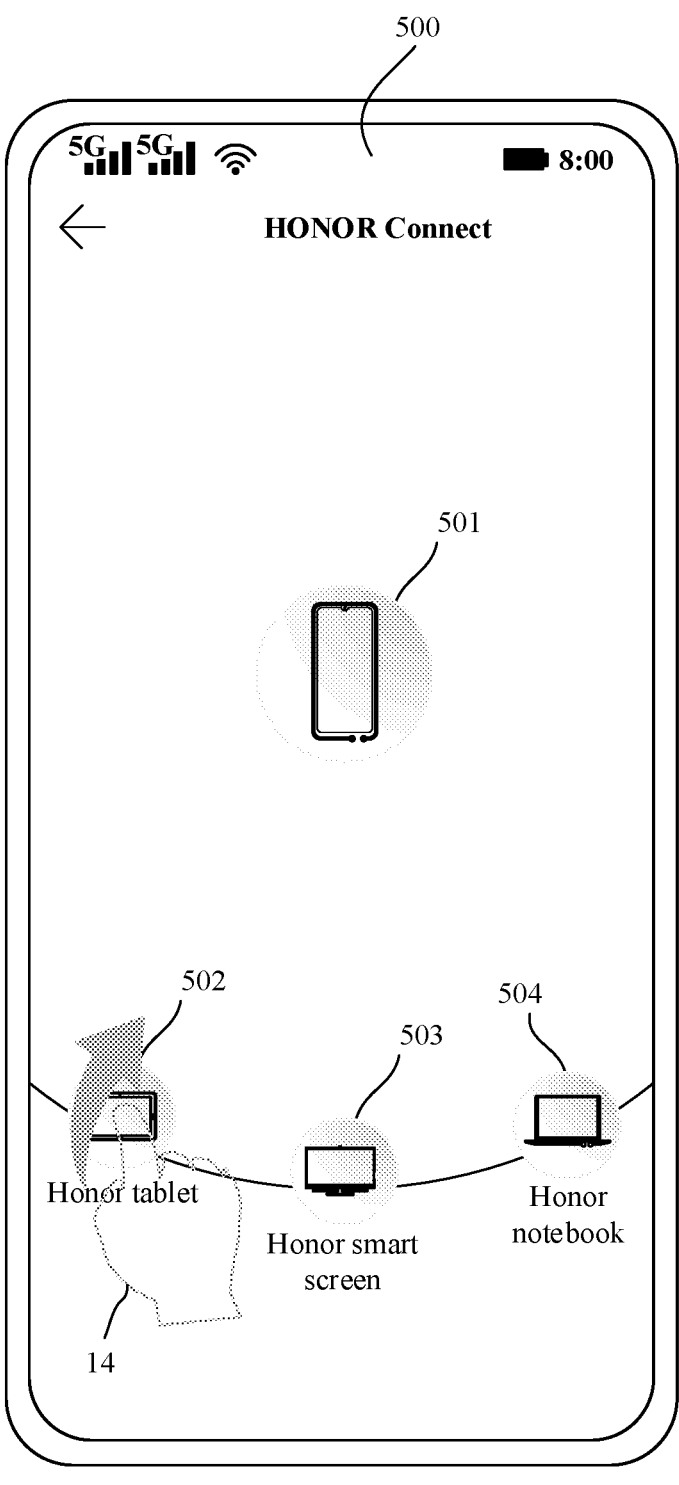
Figure 5B:
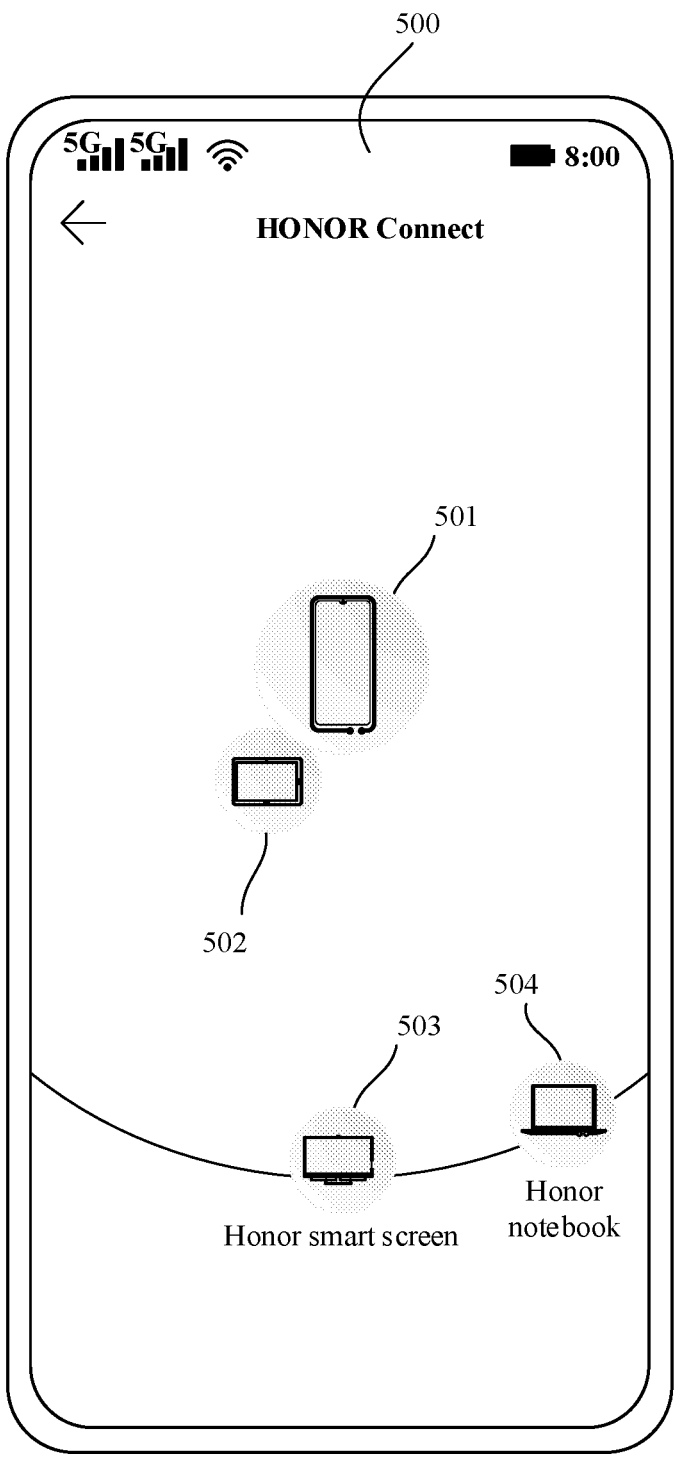
Figure 5C:
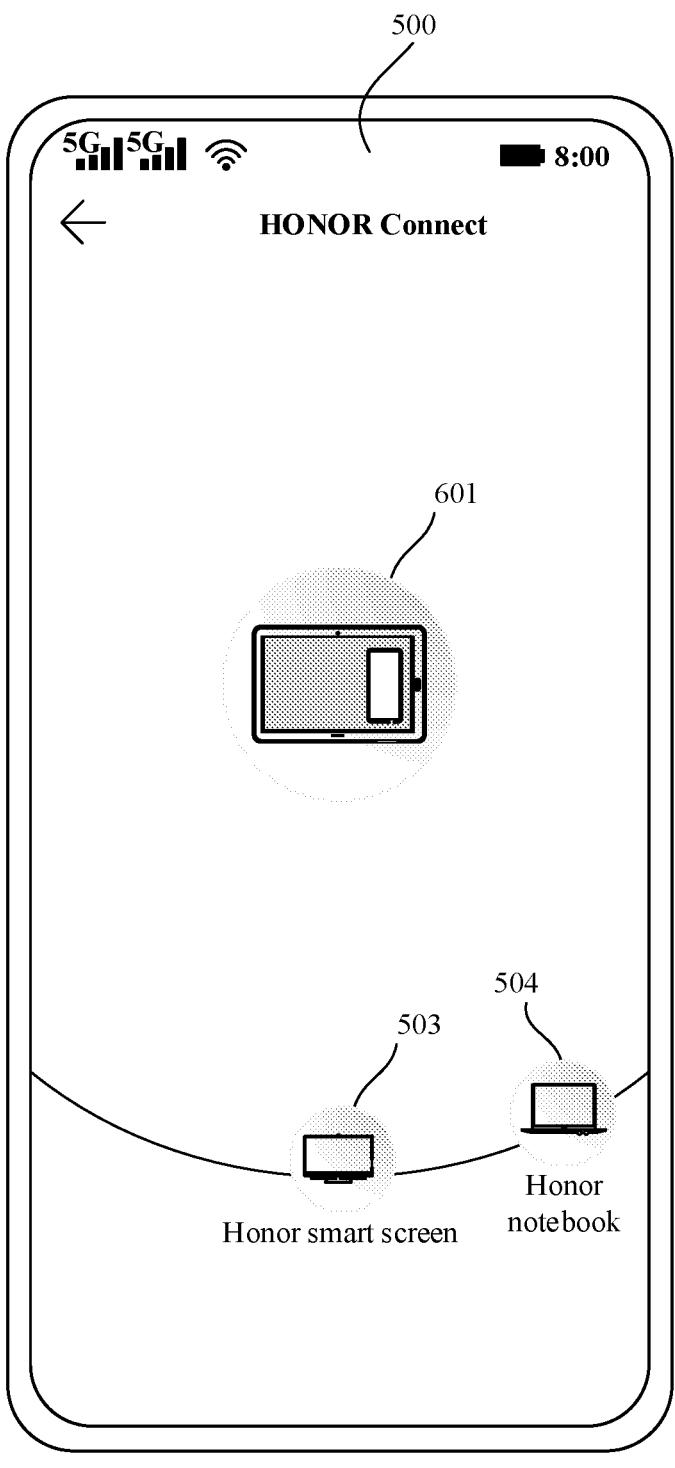
Figure 6:
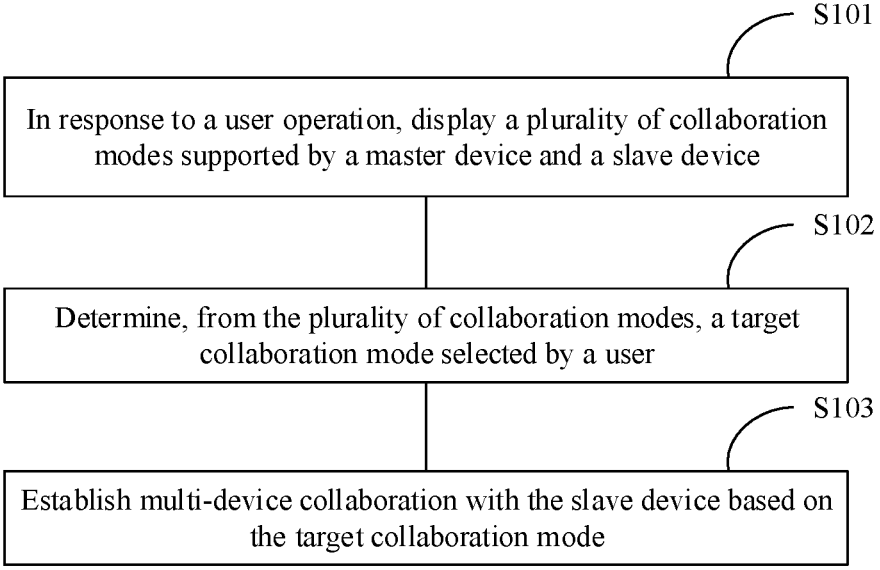
Figure 10:
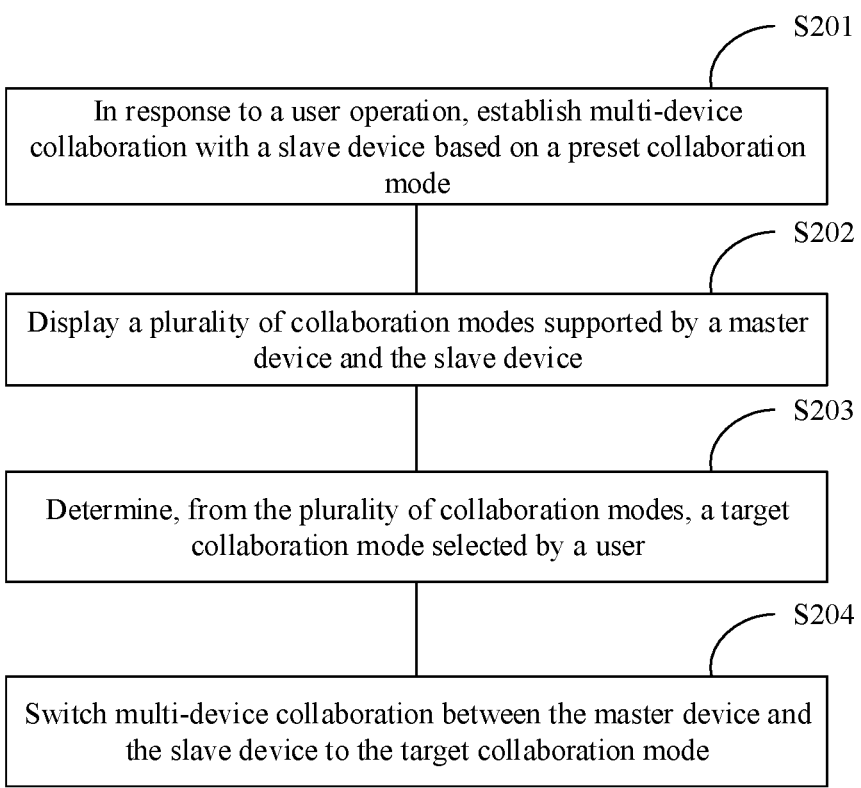
Figure 13A:
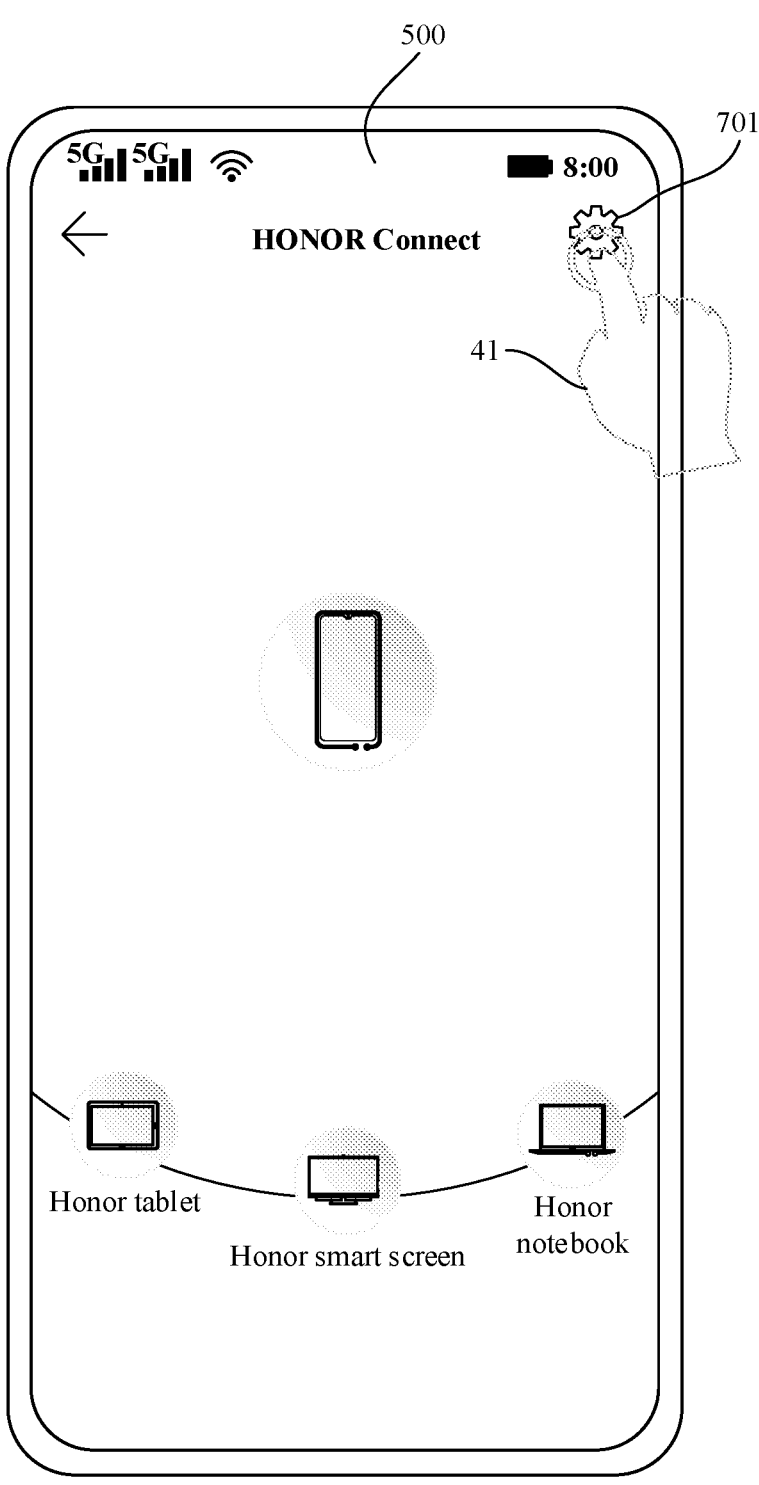
Figure 13B:
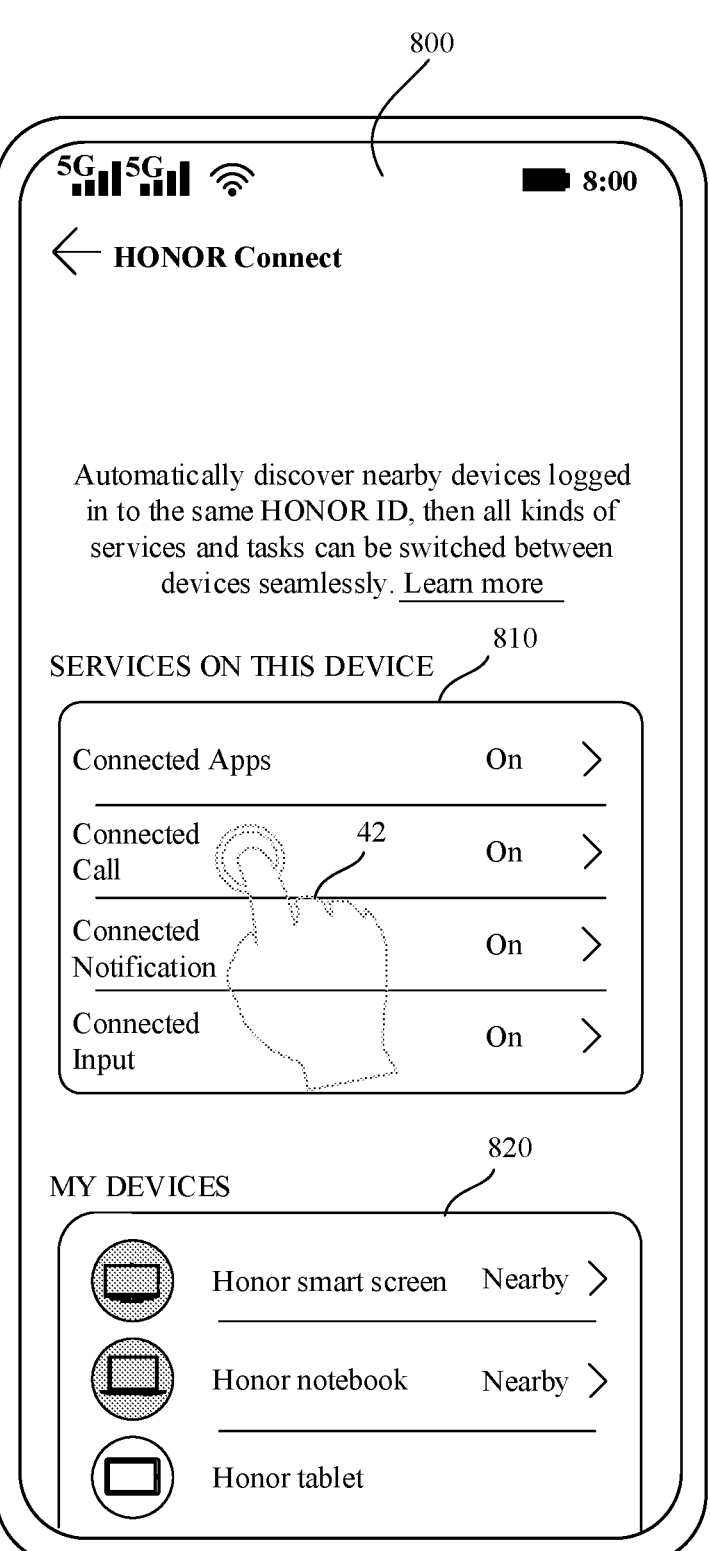
Figure 13C:
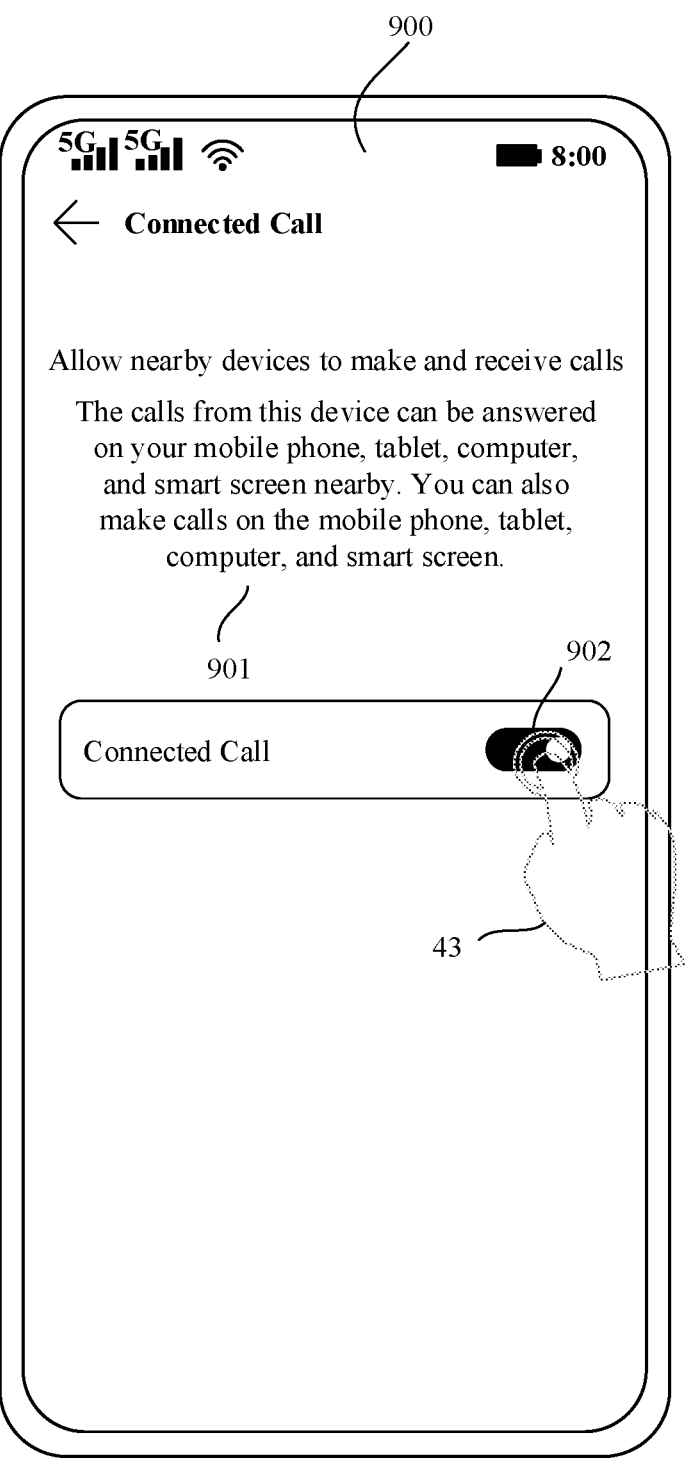
Figure 15A:
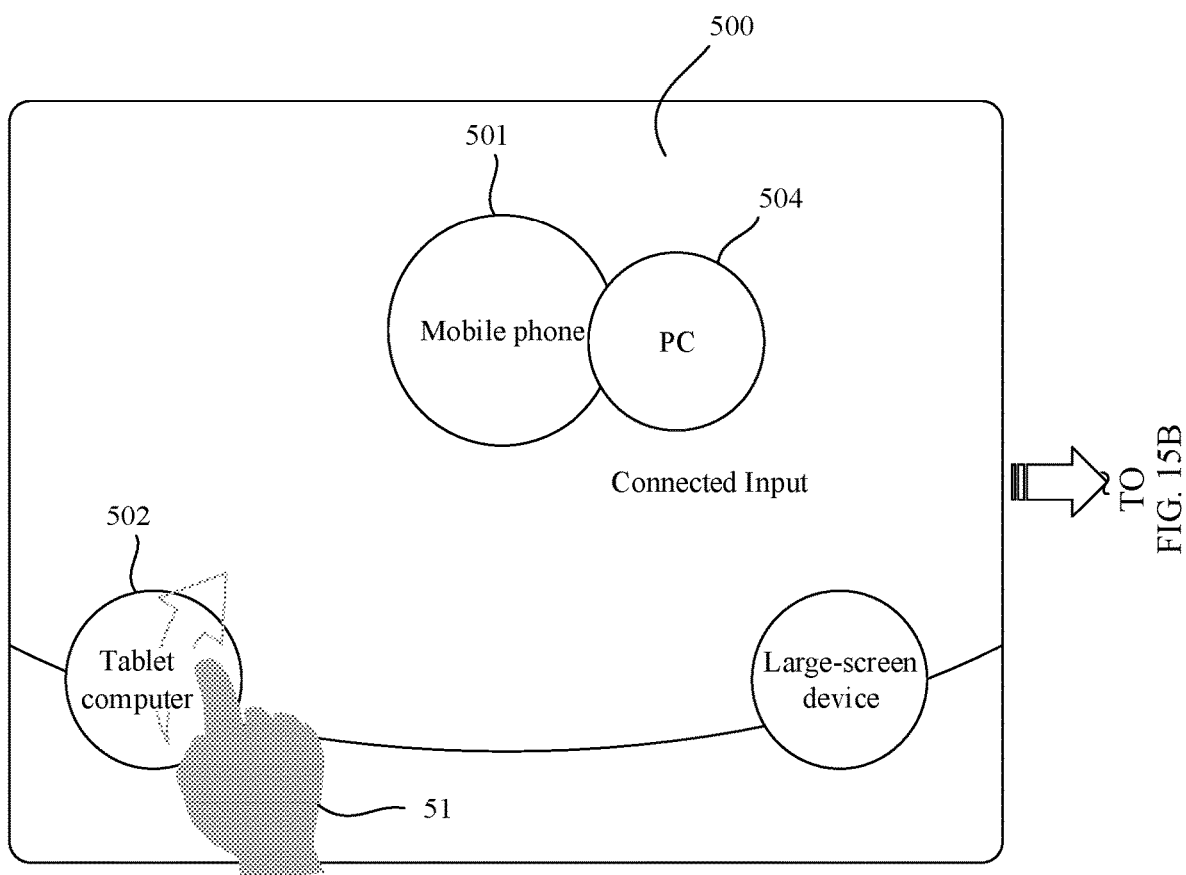
Figures 15A, 15B:
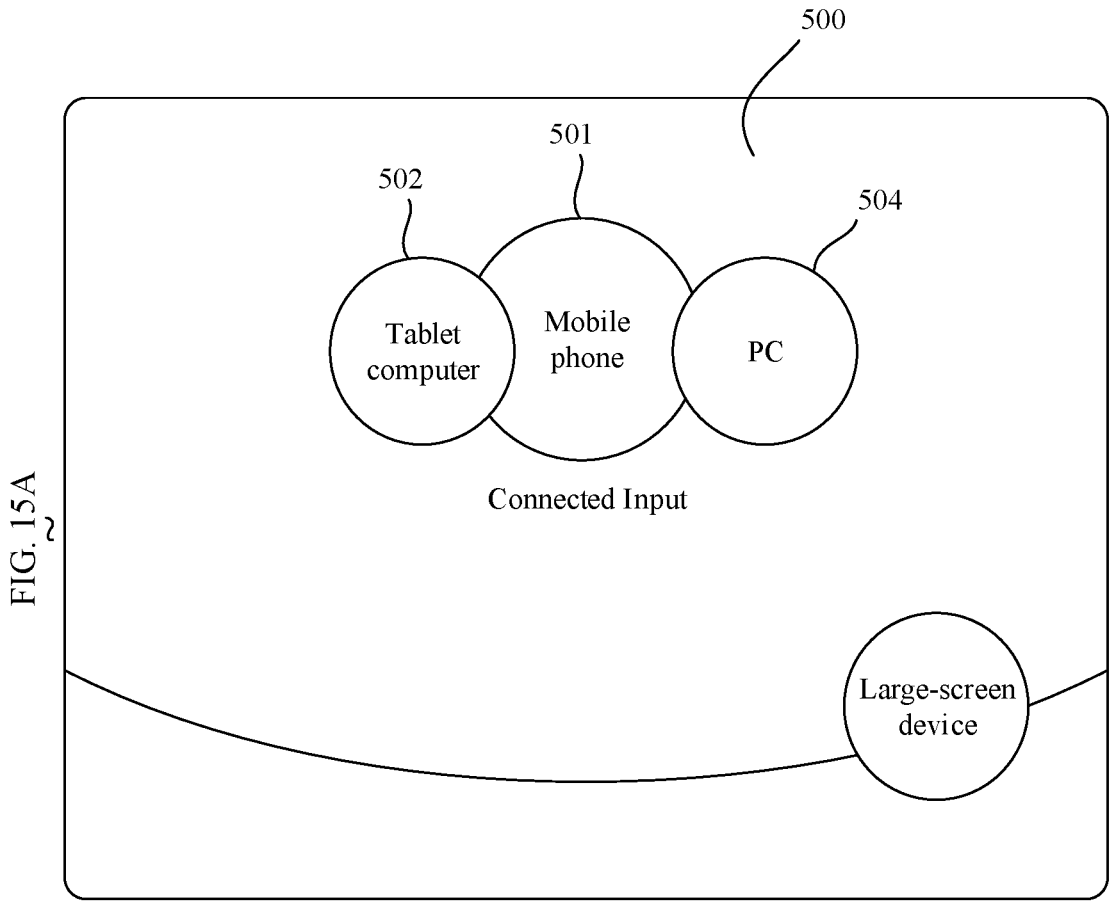
Figure 16A:
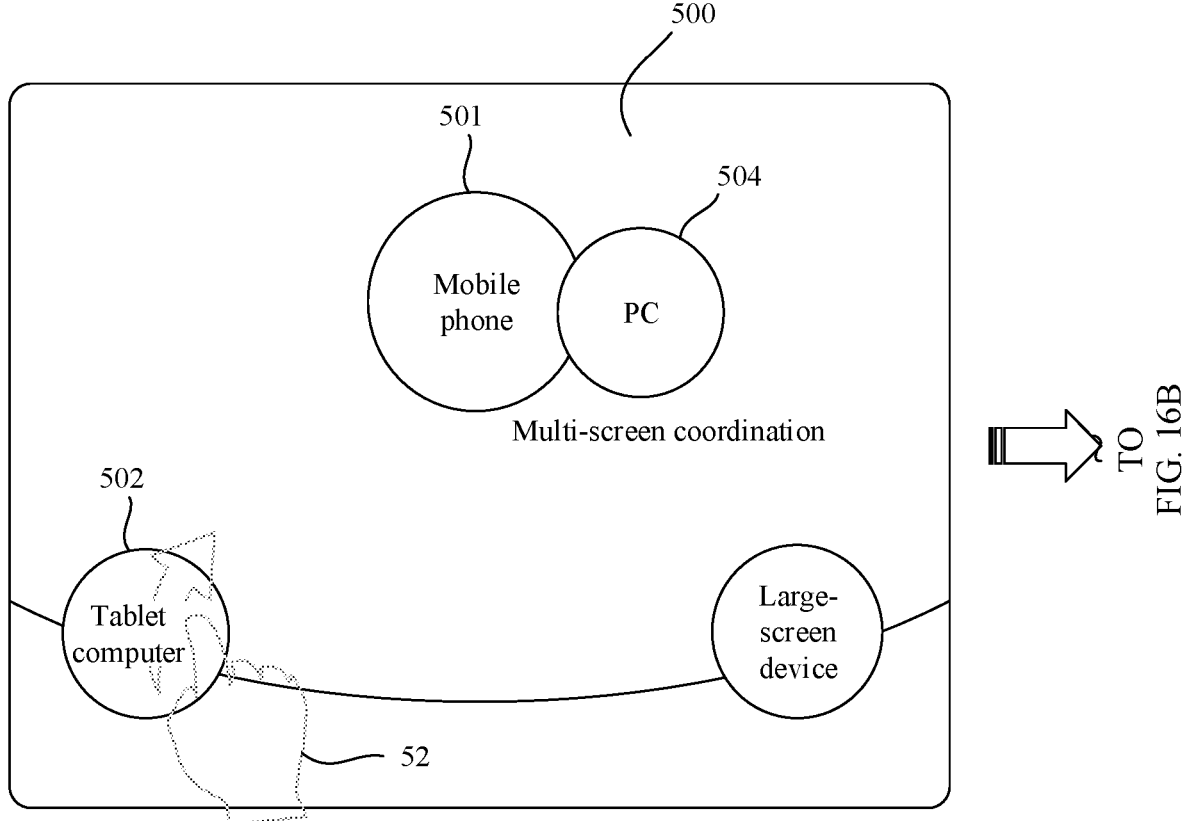
Figure 16B:
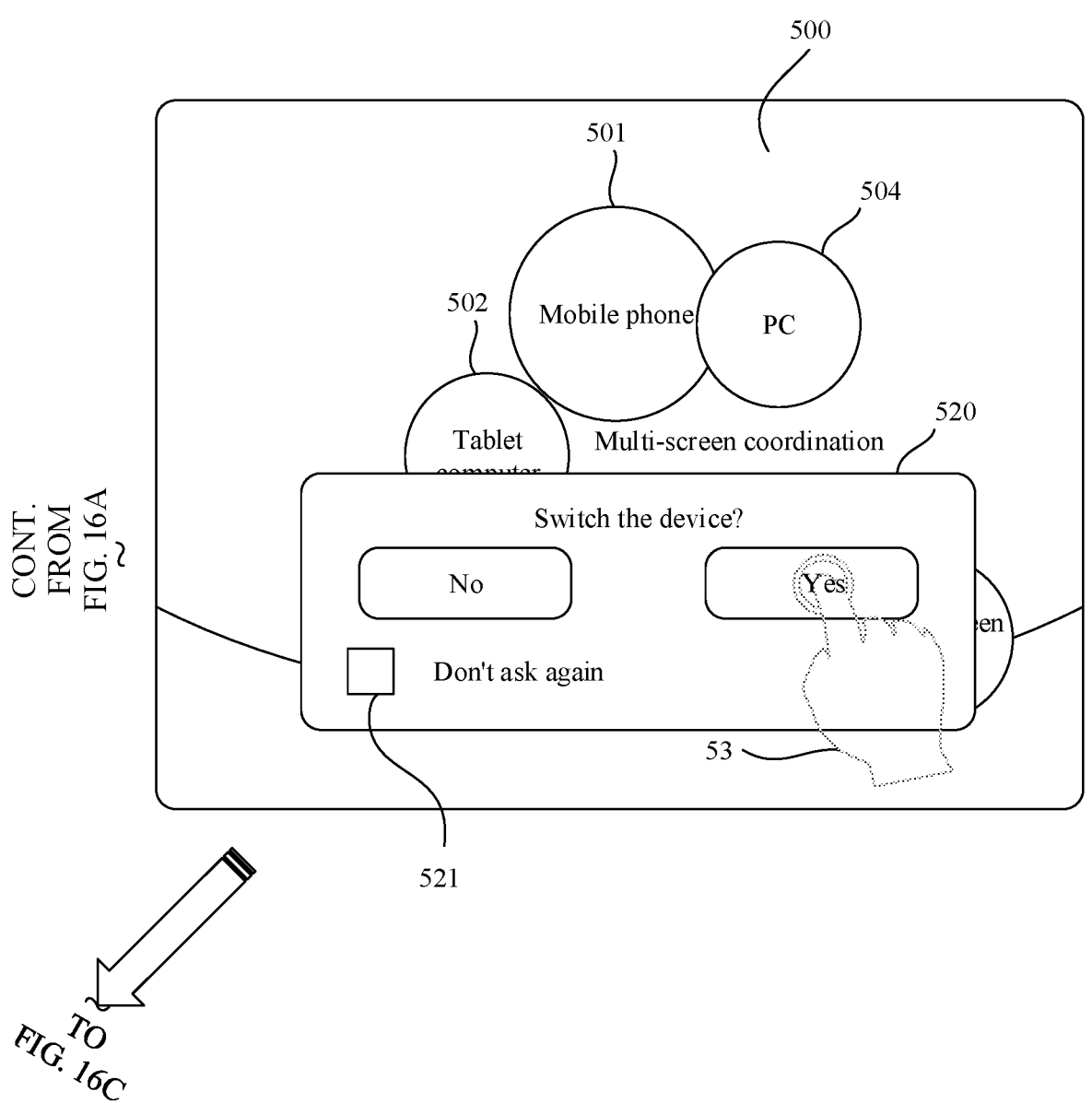
Figure 16C:
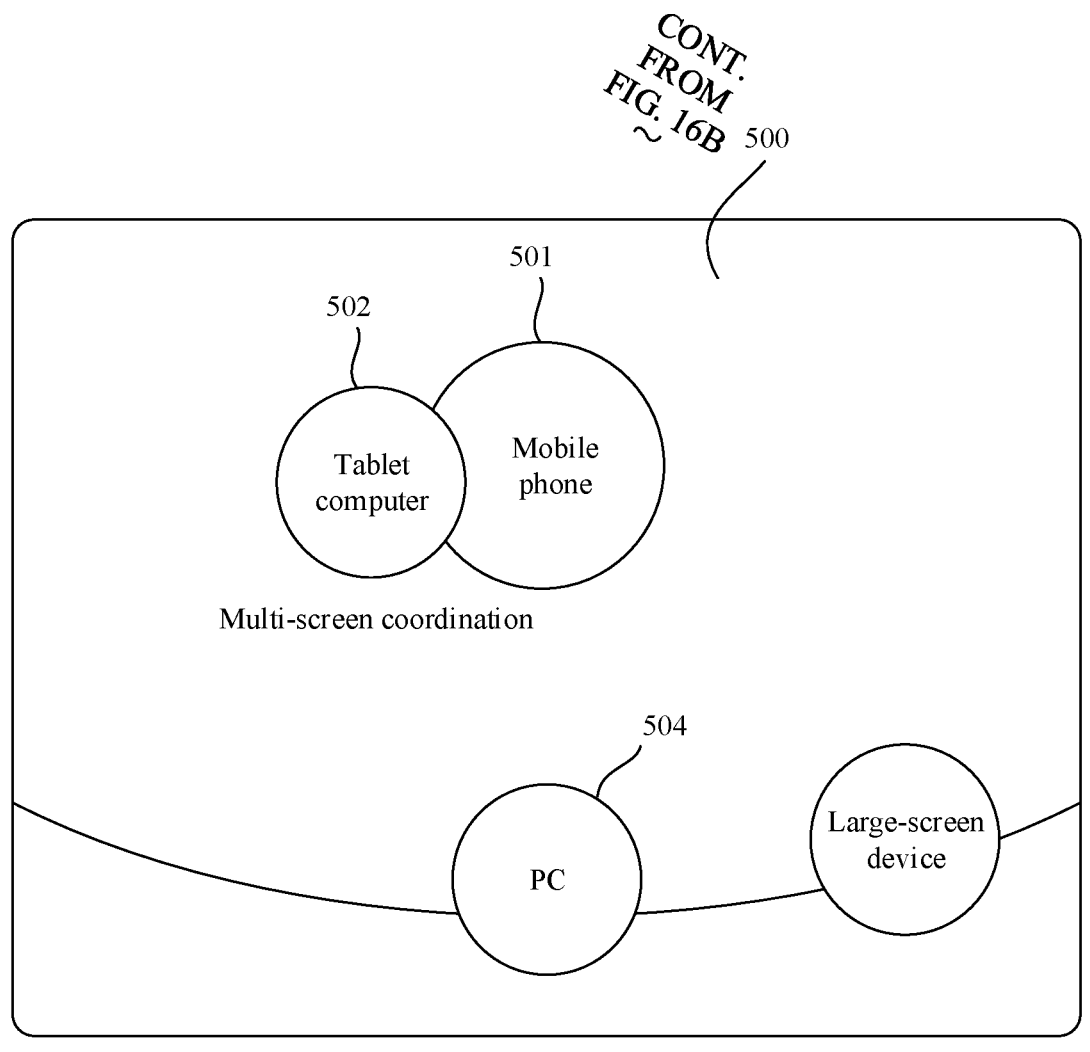
Figure 17A:
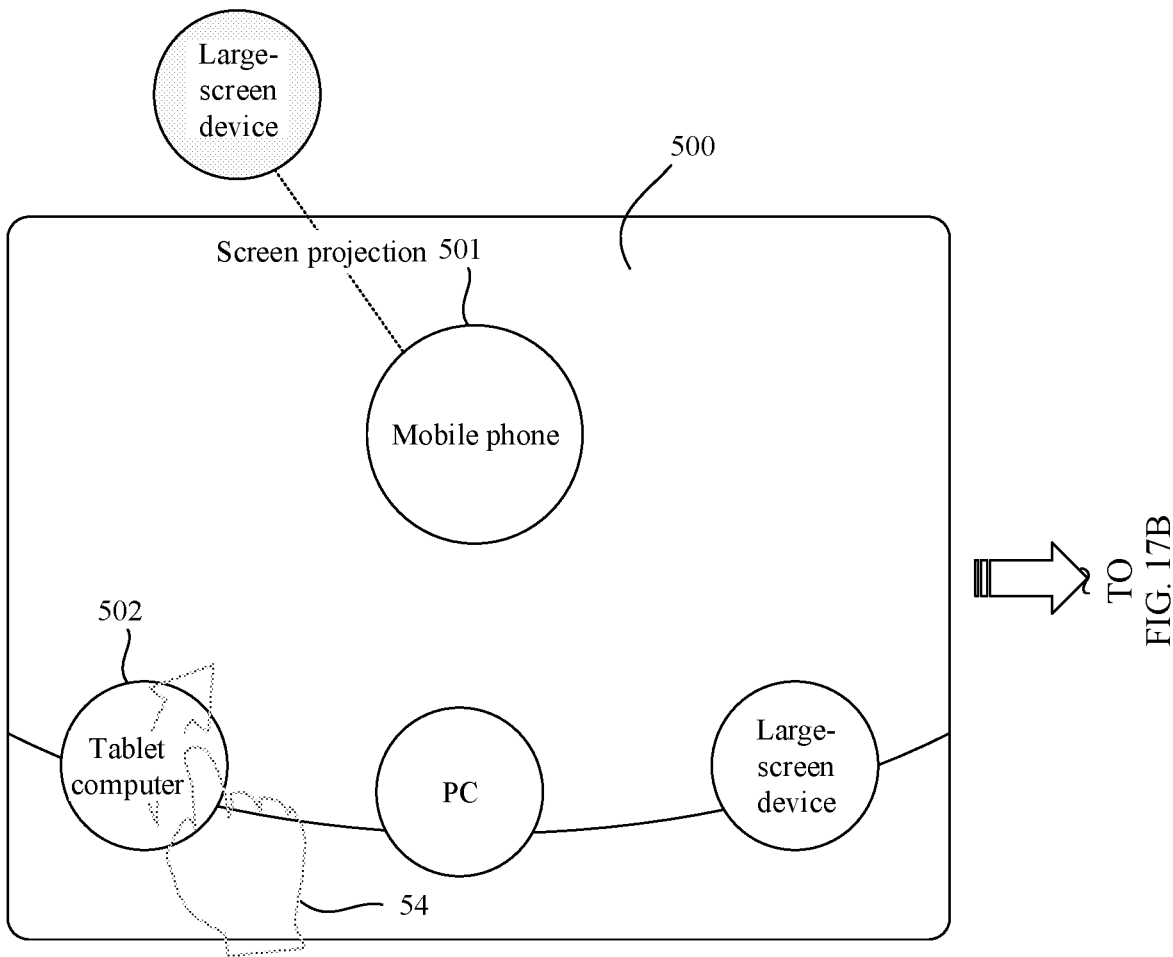
Figure 17B:
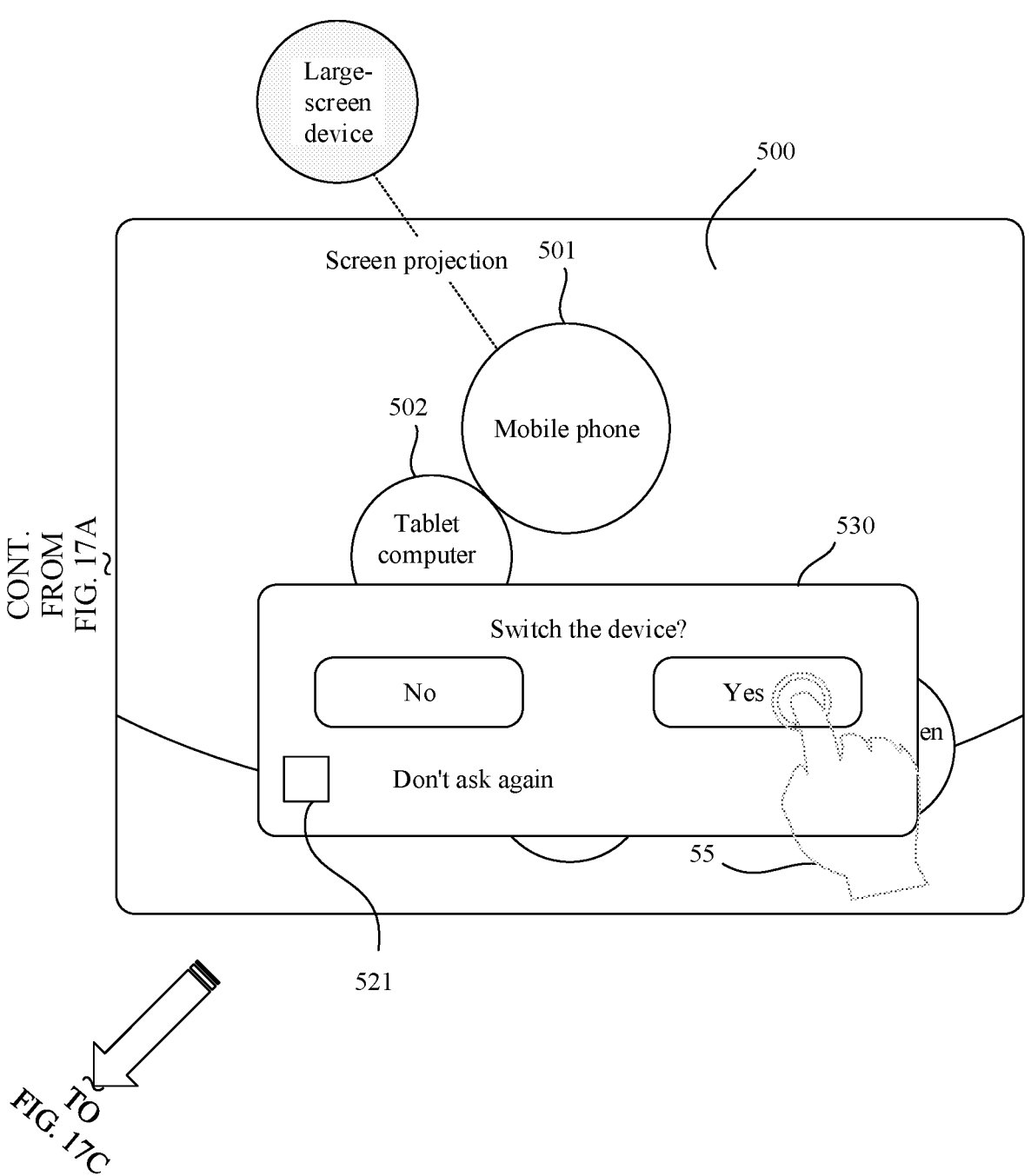
Figure 17C:
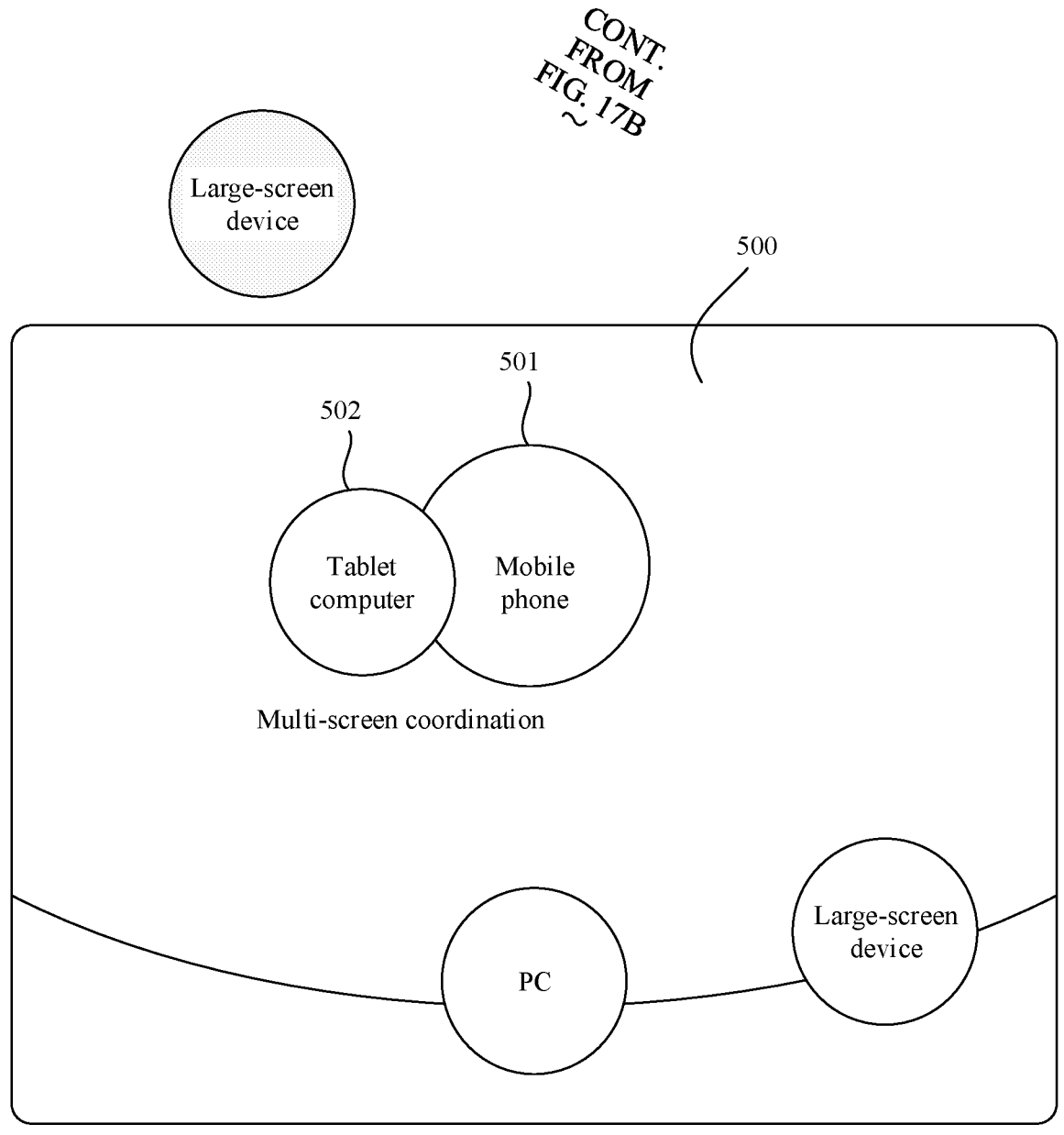
Figure 18A:
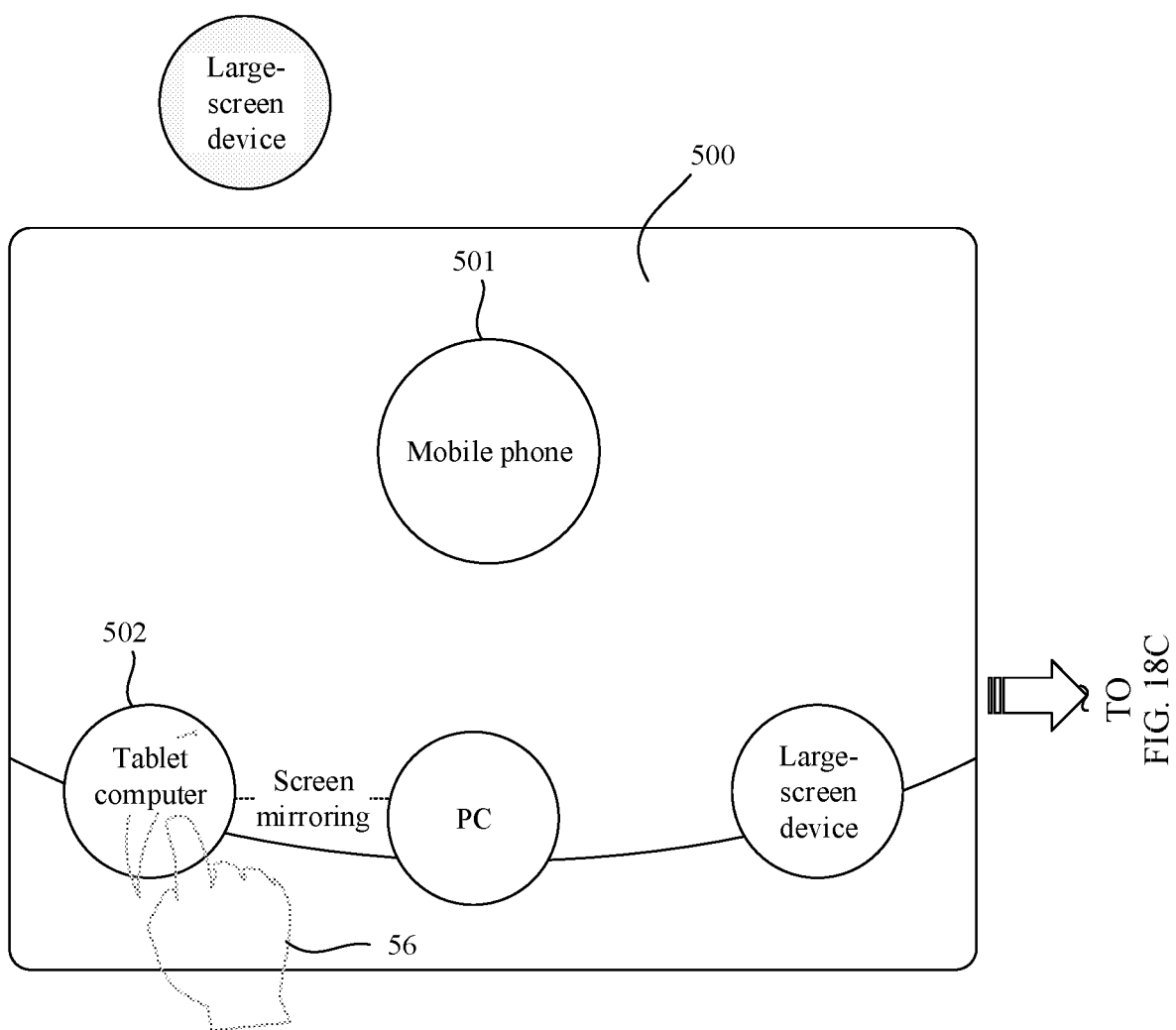
Figure 18B:
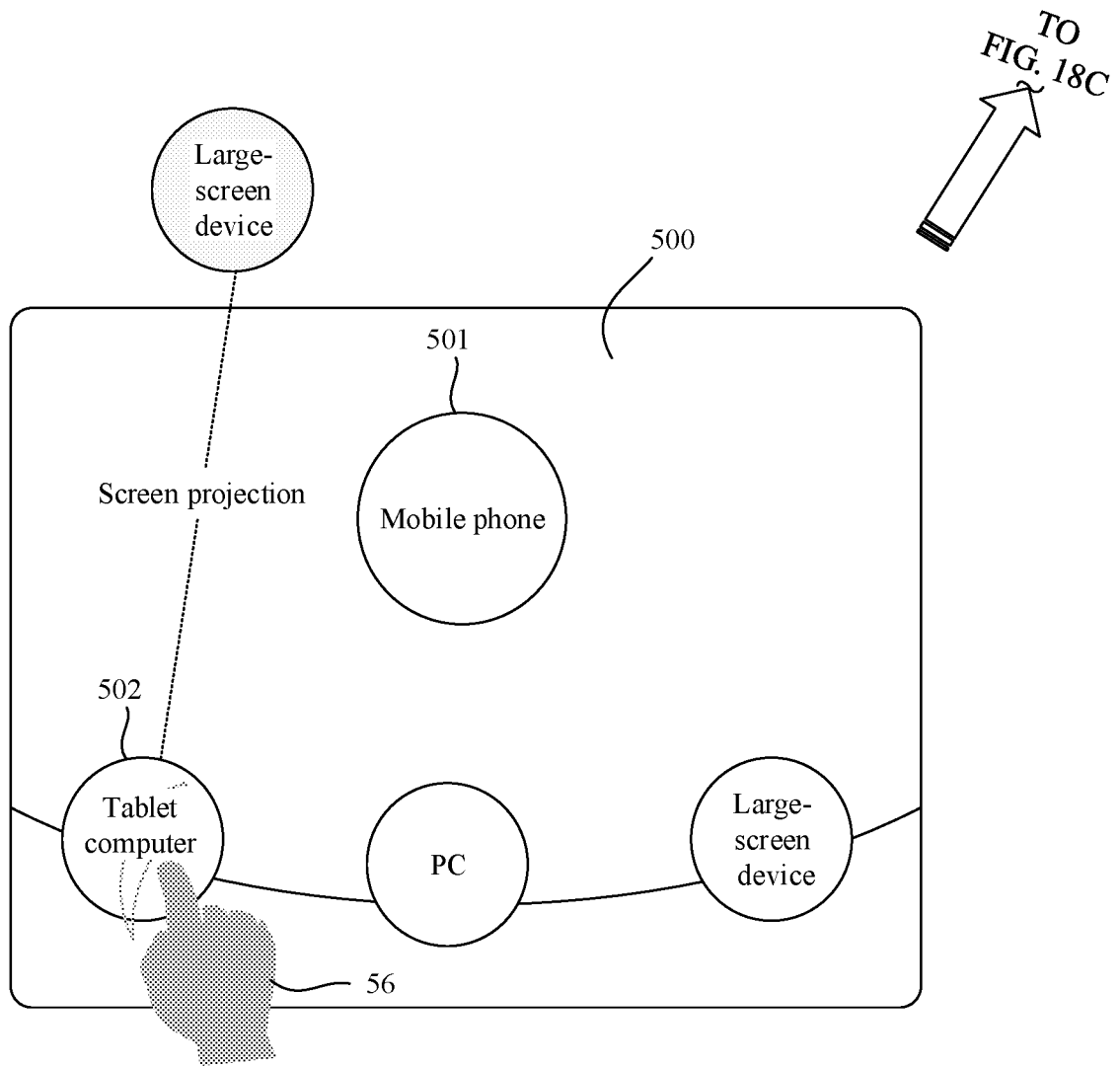
Figure 18C:
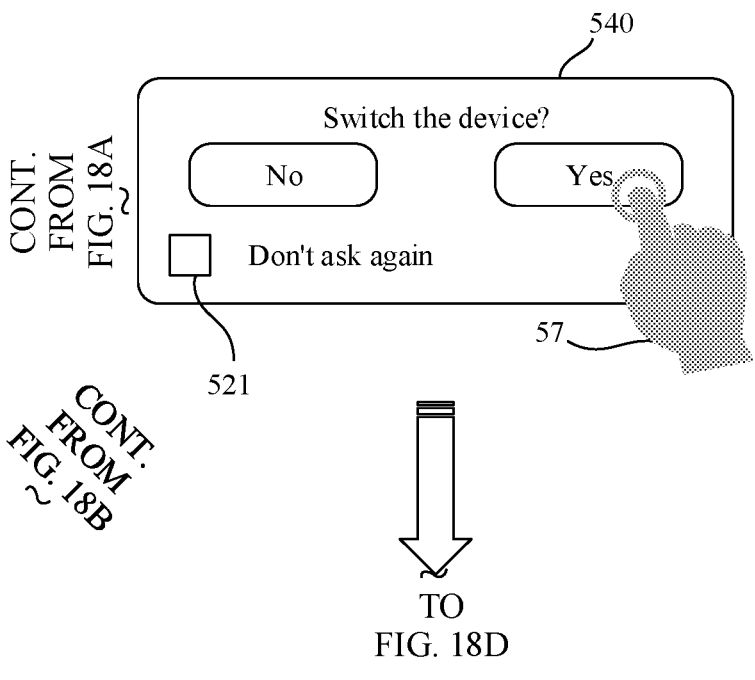
Figure 18D:
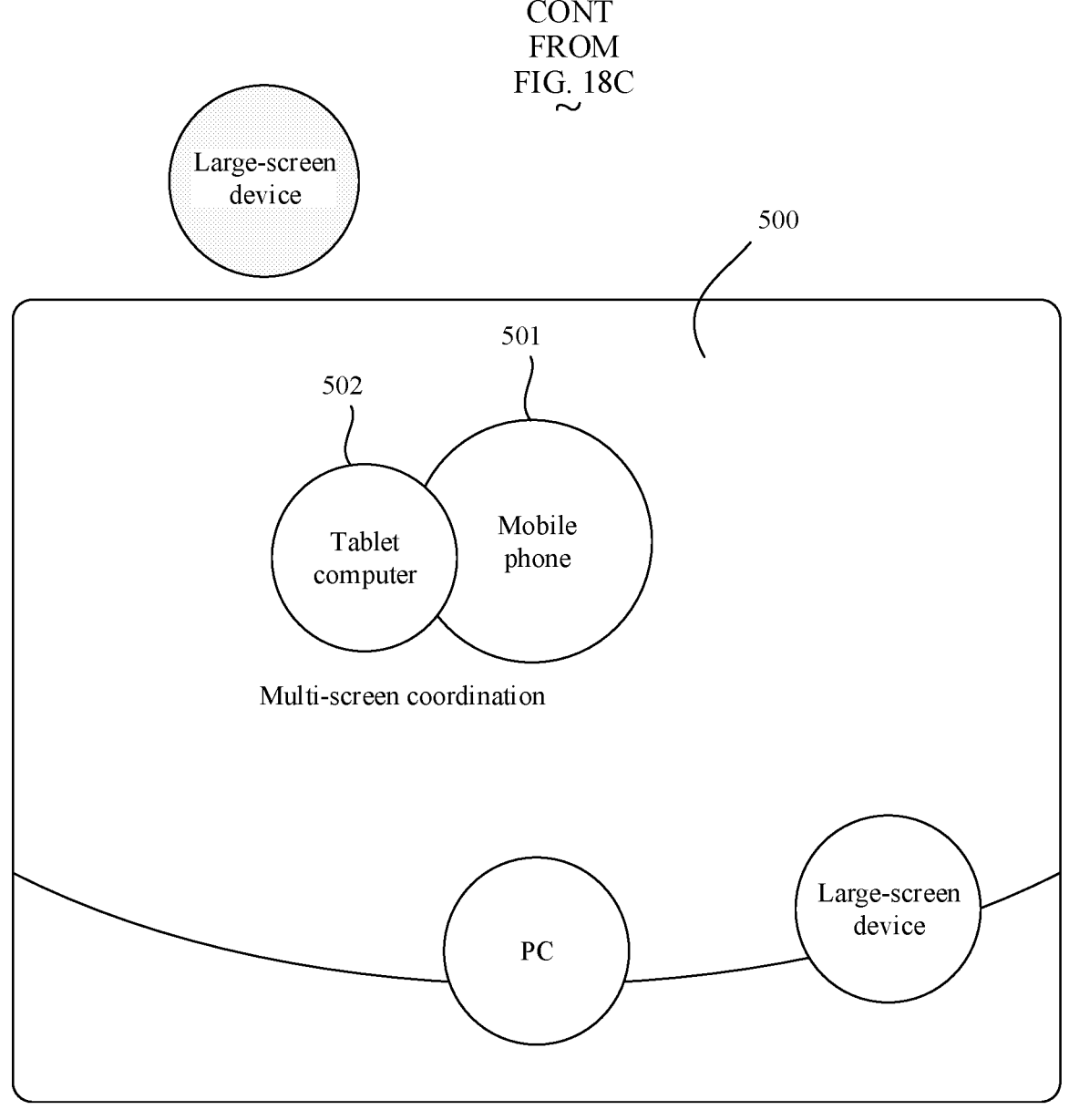
Figure 19A:
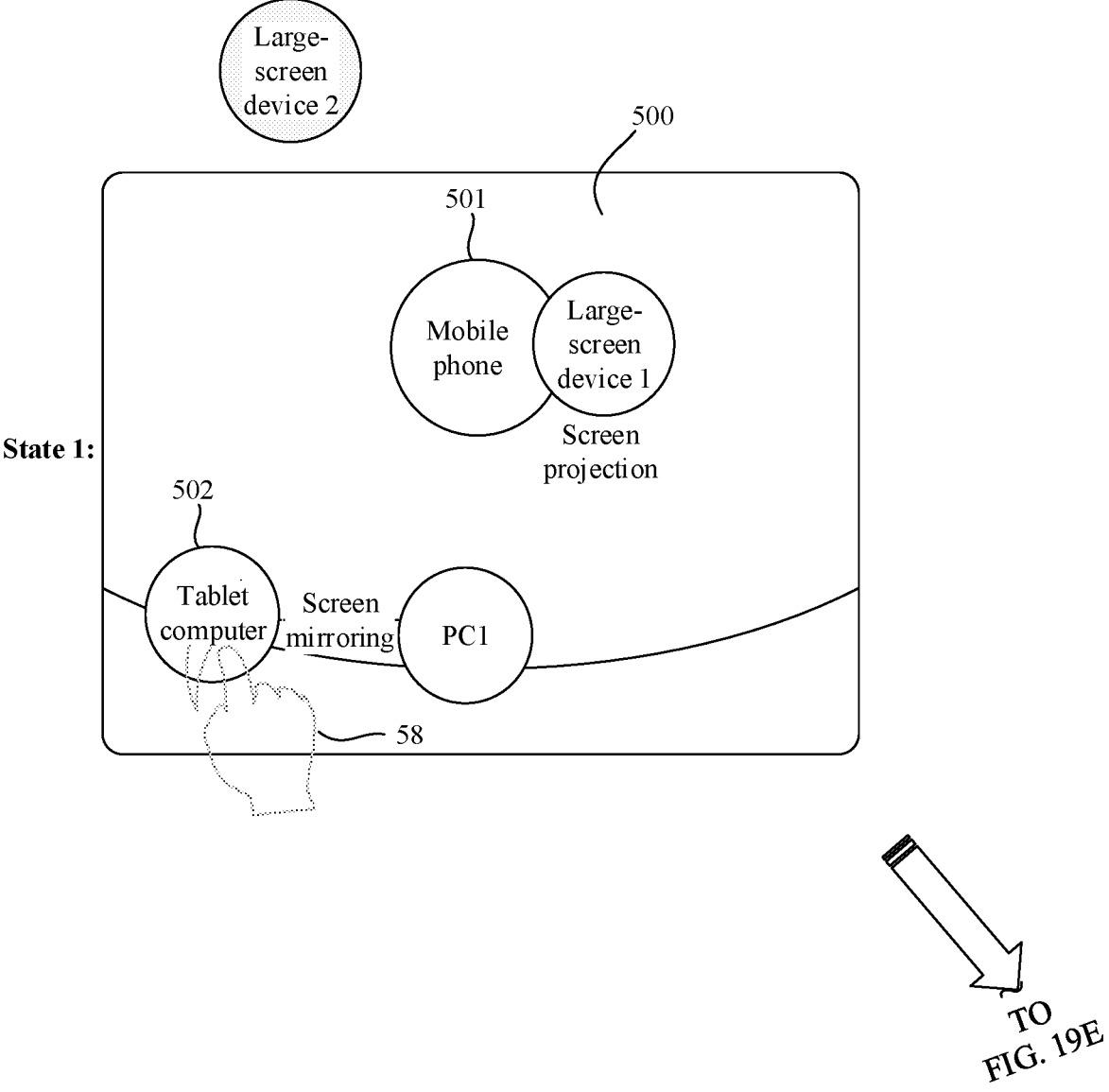
Figure 19B:
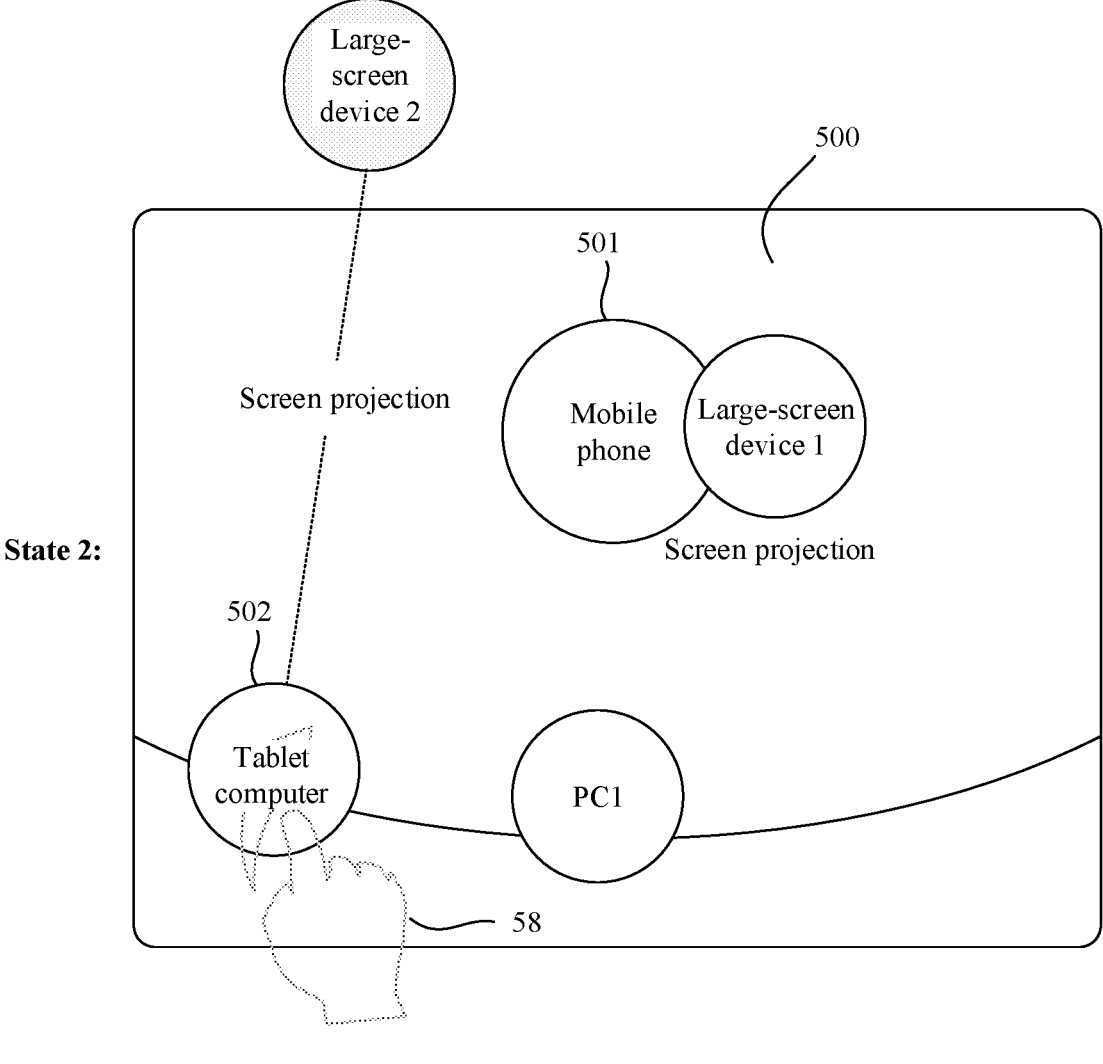
Figure 19C:
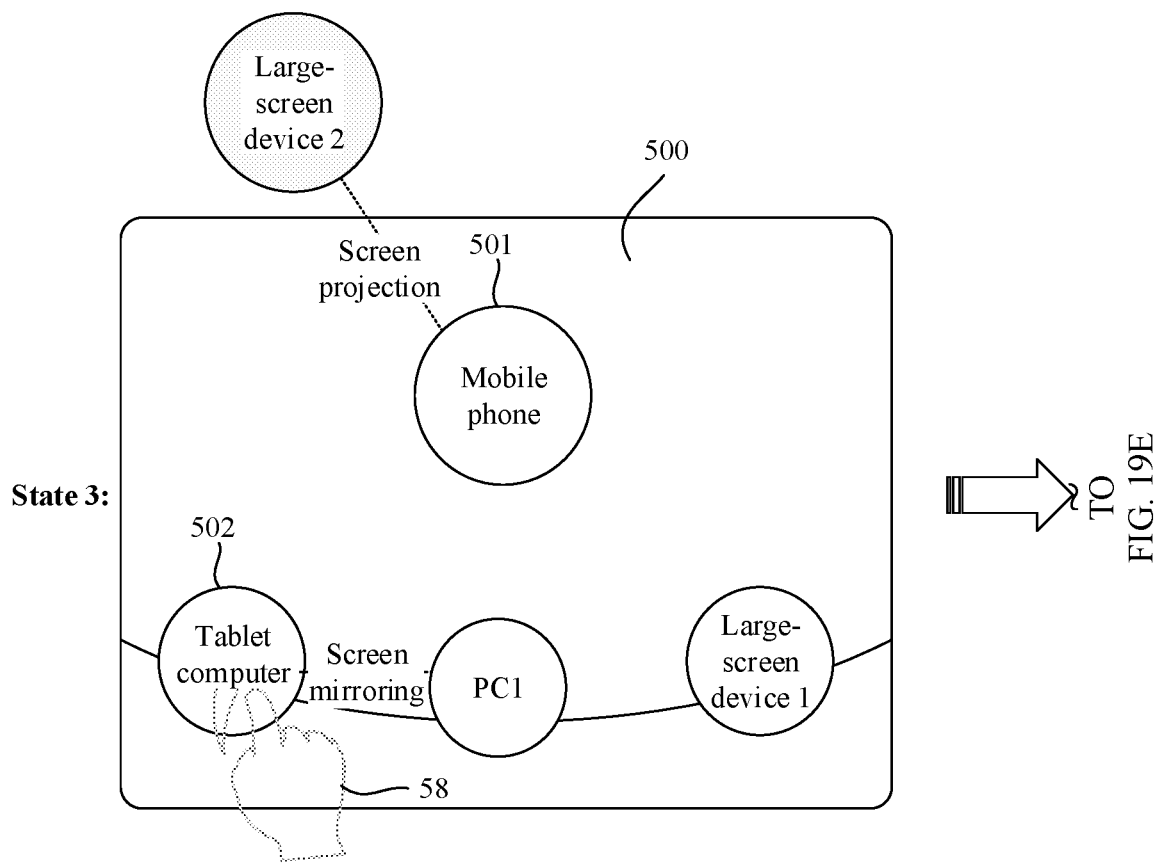
Figure 19D:
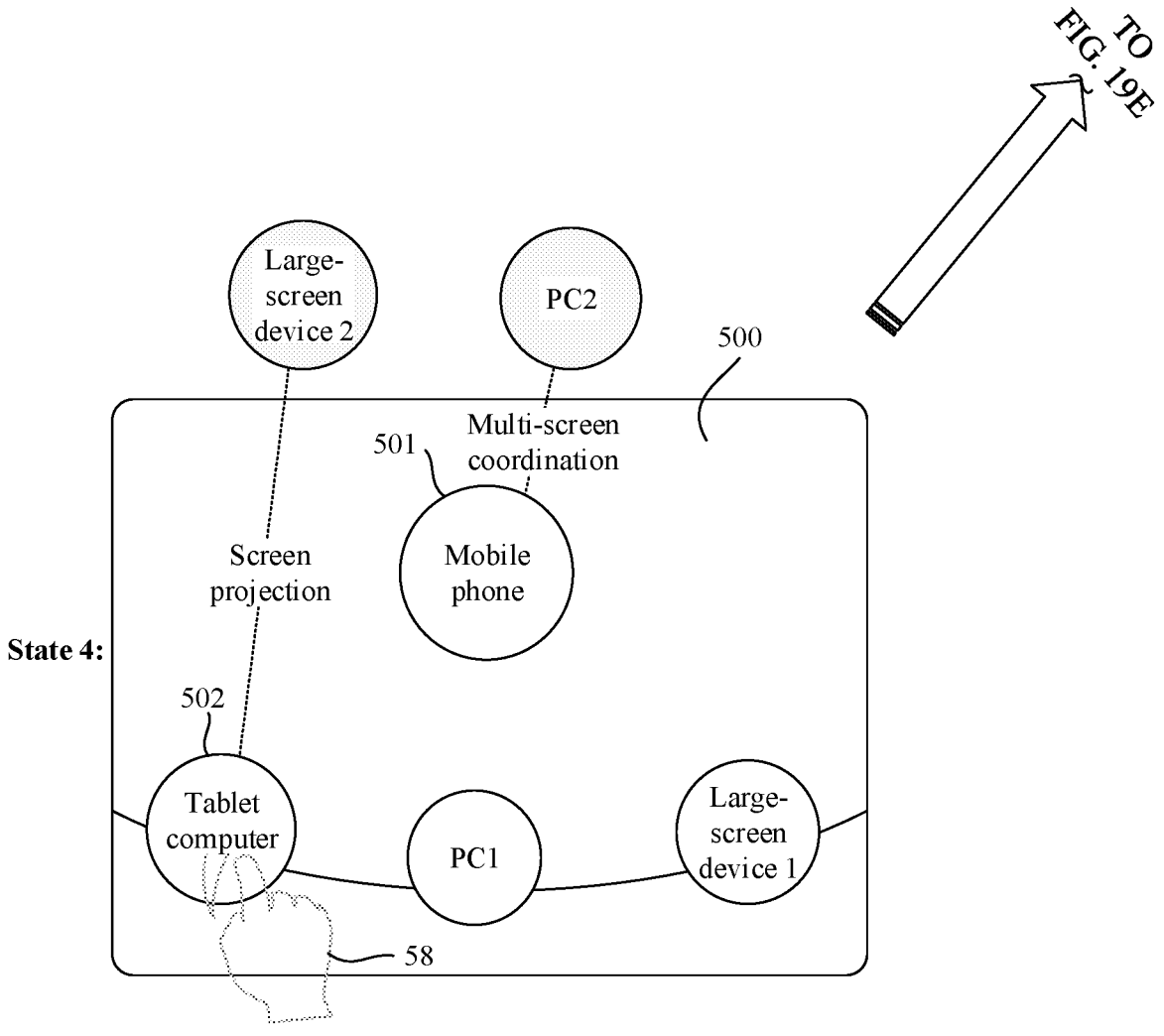
Figures 19A, 19B, 19C, 19D, 19E, 19F:
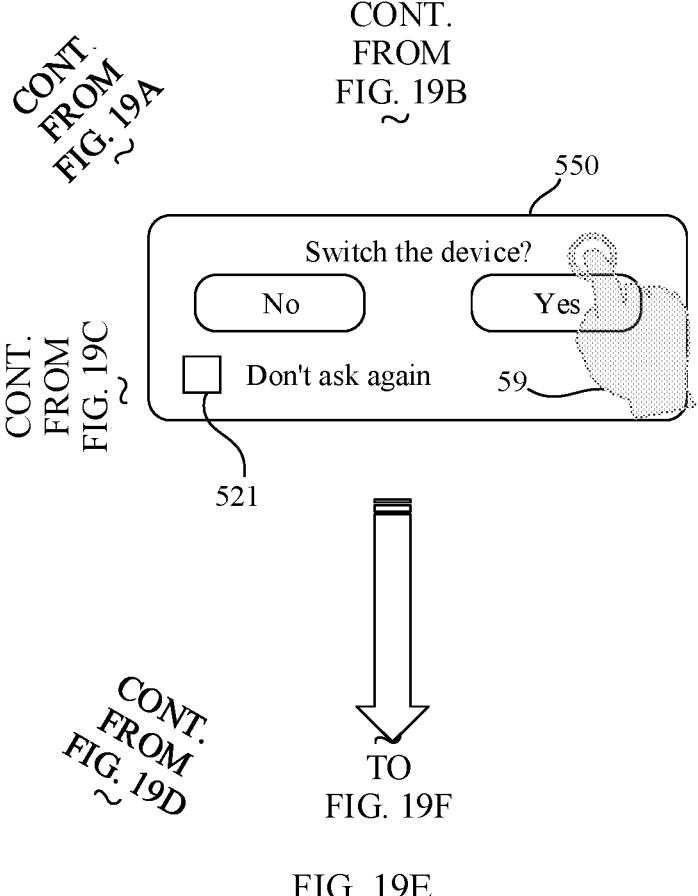
Figure 19F:
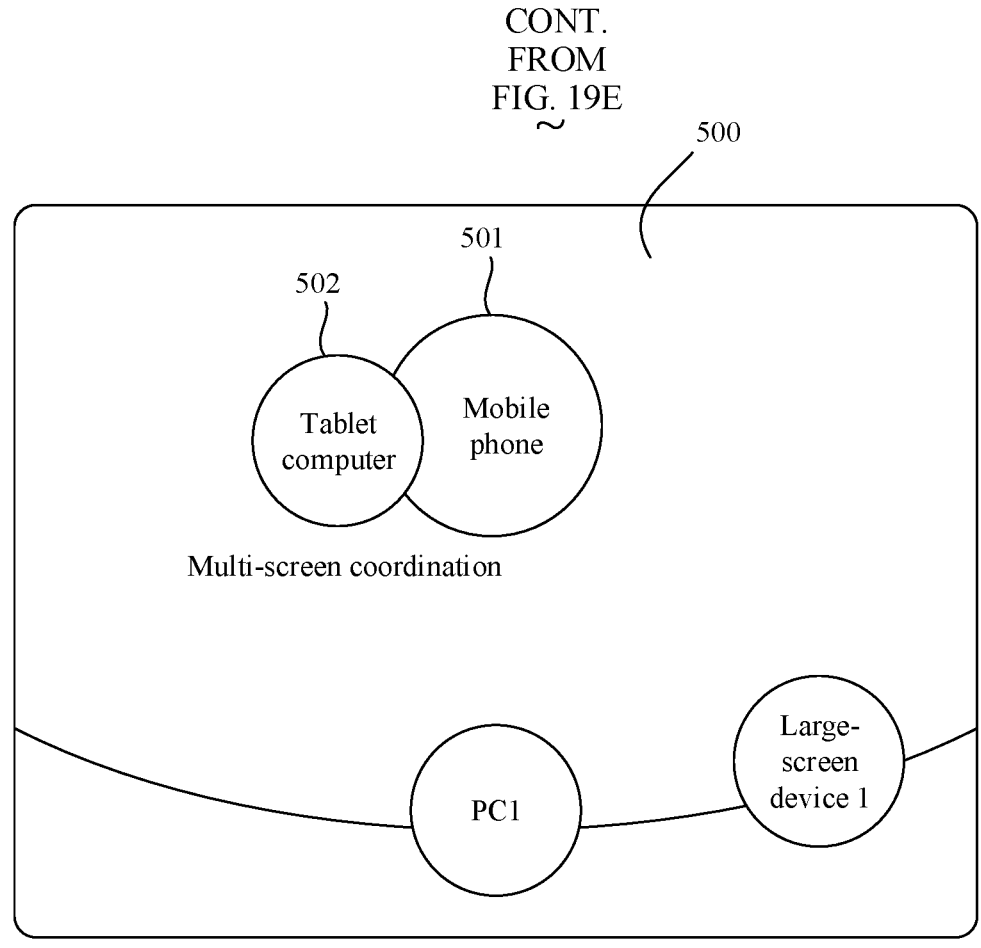
Figure 20A:
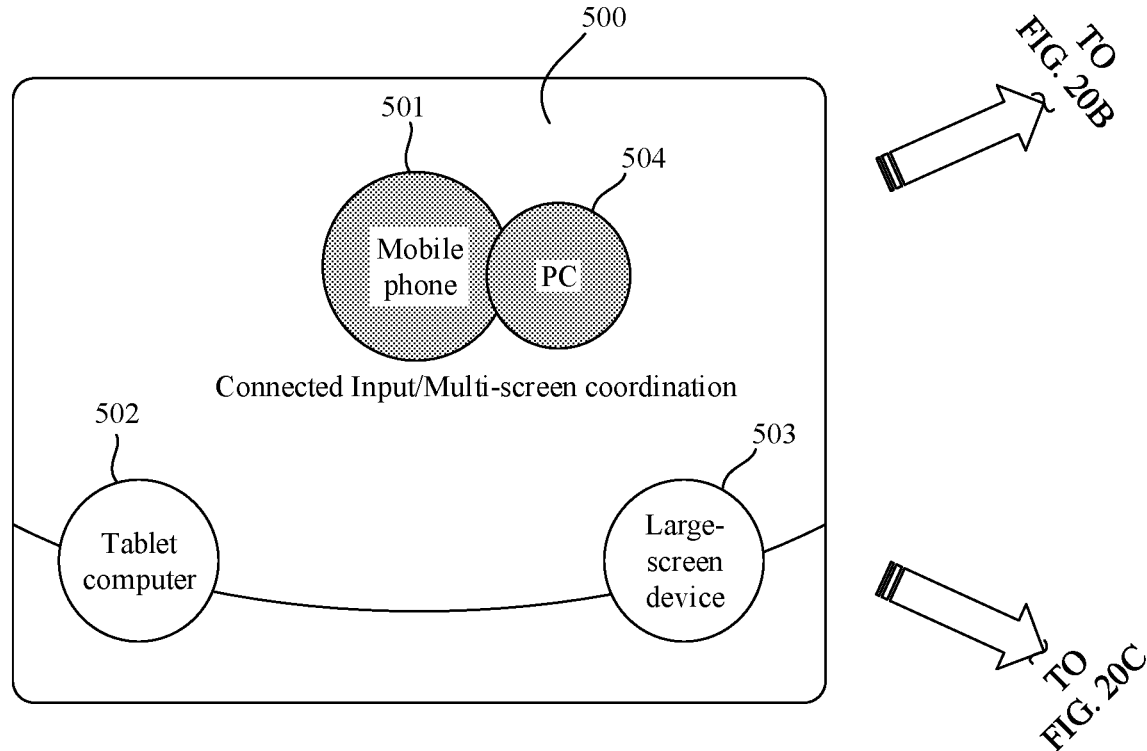
Figure 20B:
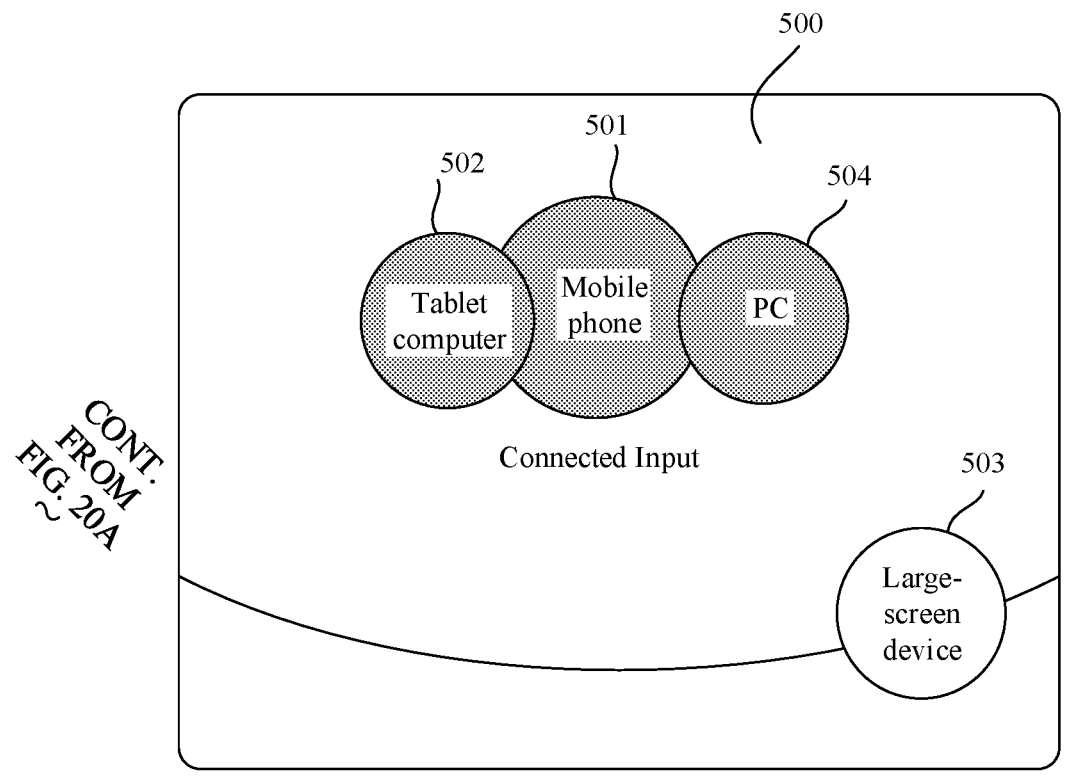
Figure 20C:
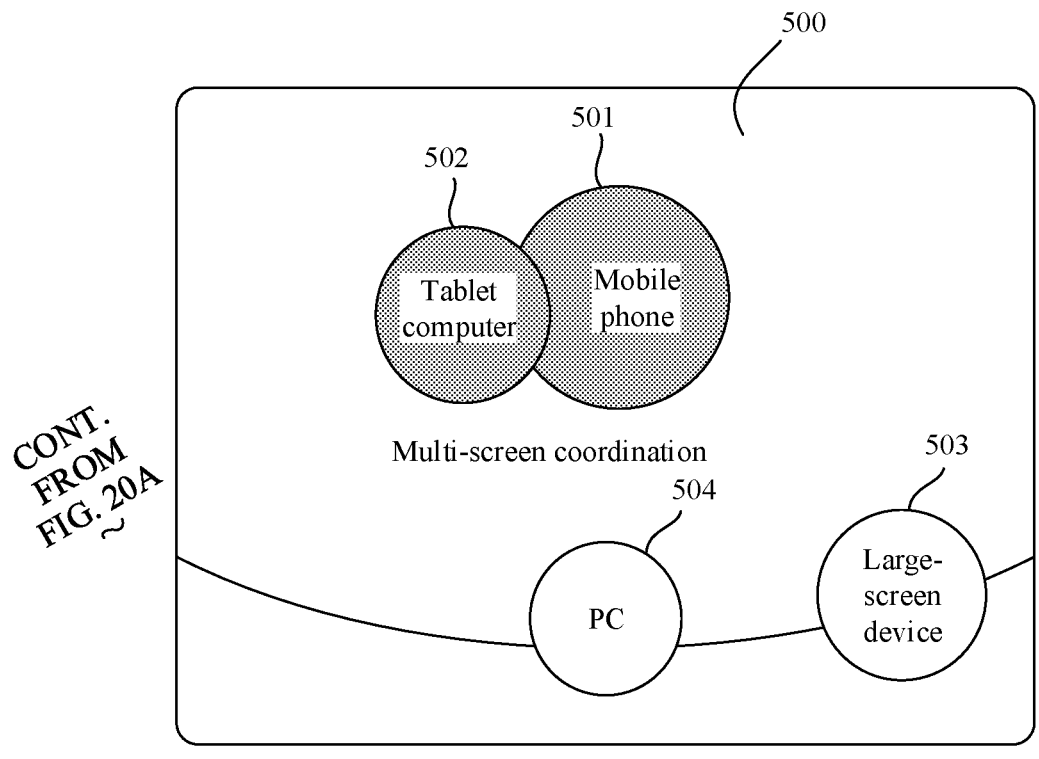
Figure 21:
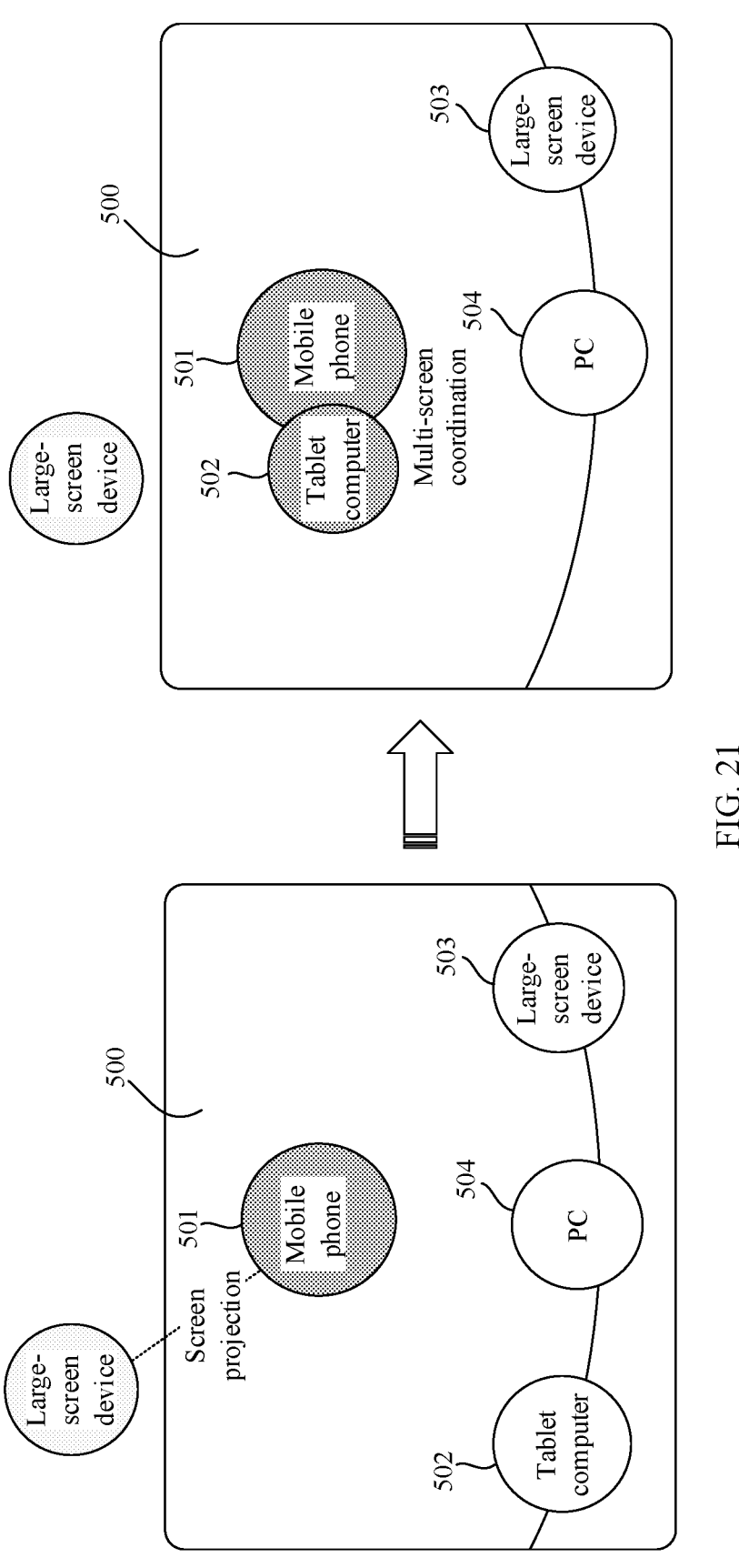
Figure 22:
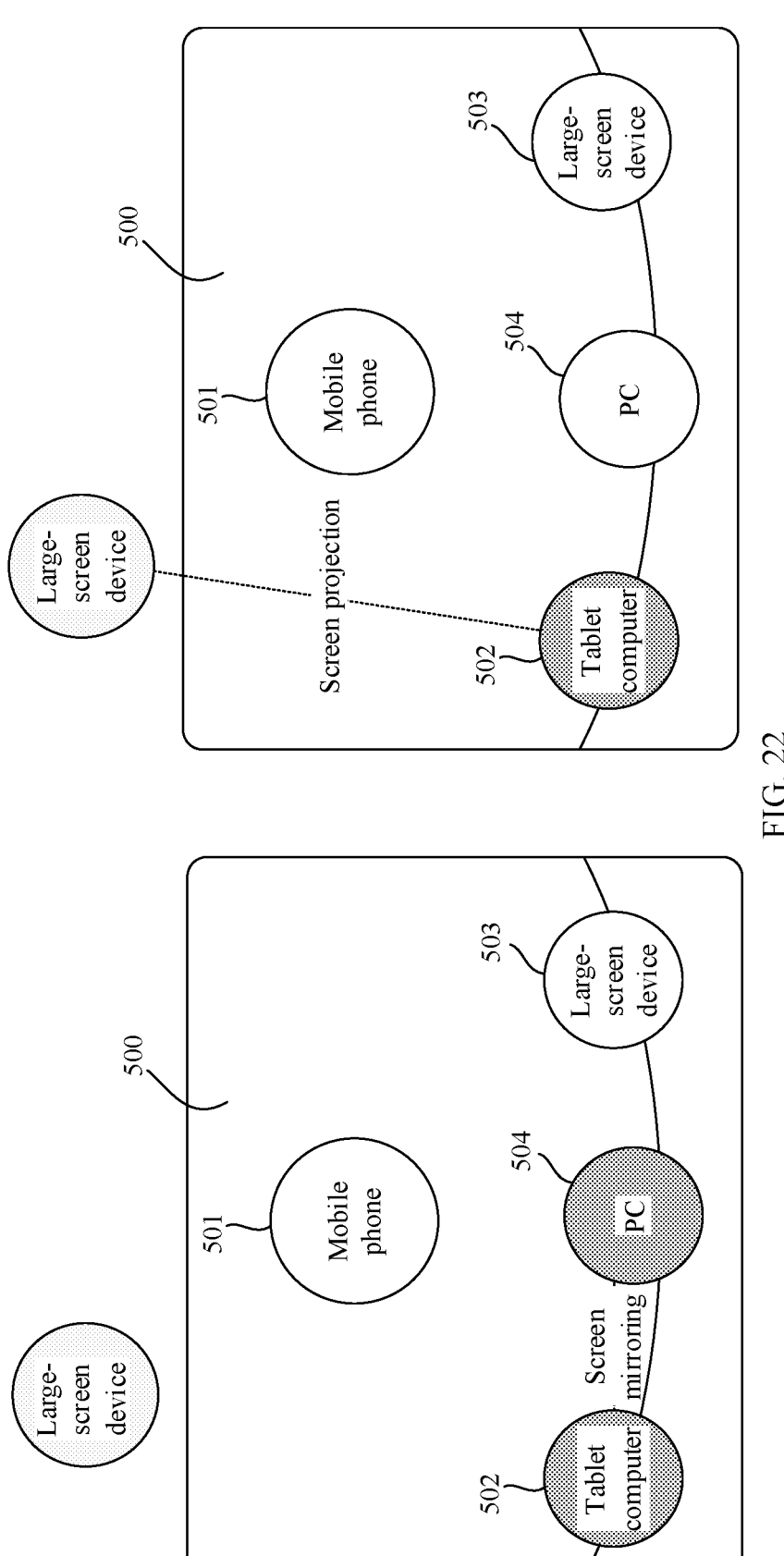
Figure 23A:
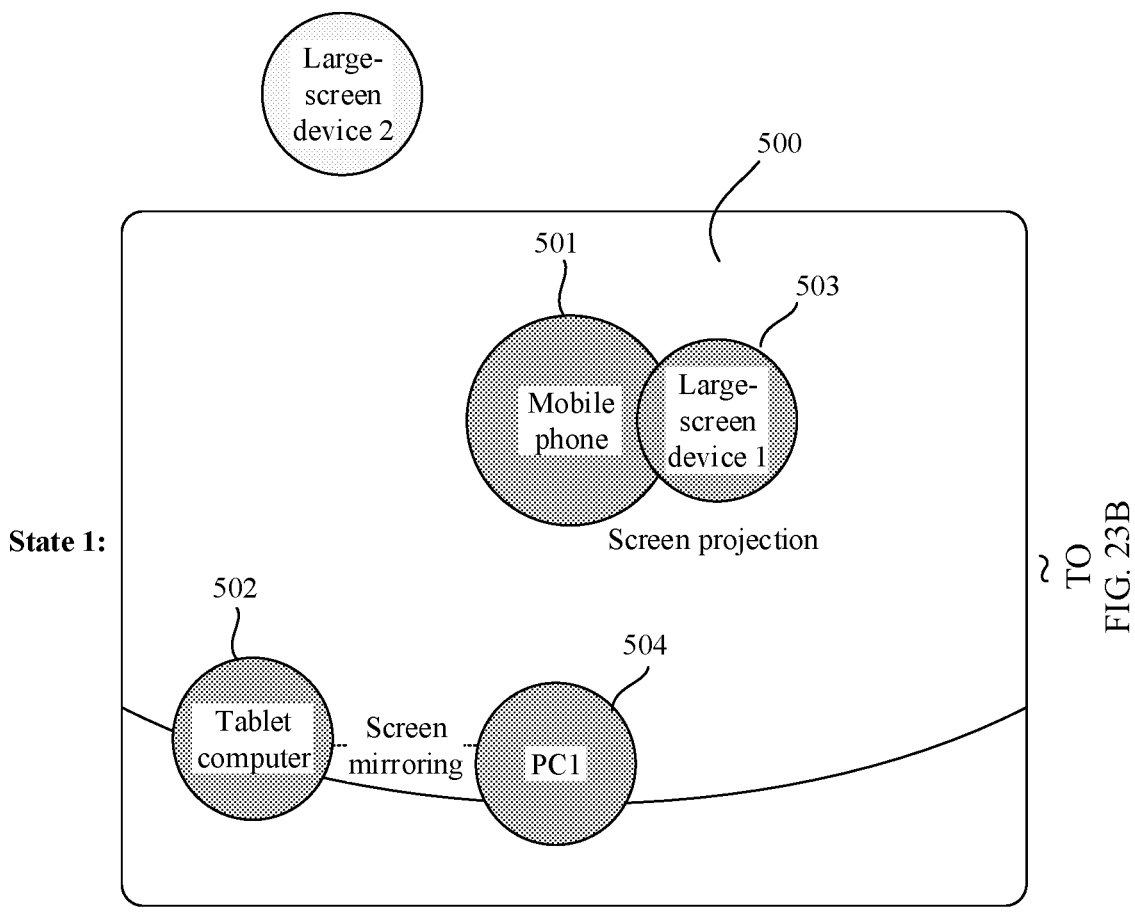
Figure 23B:
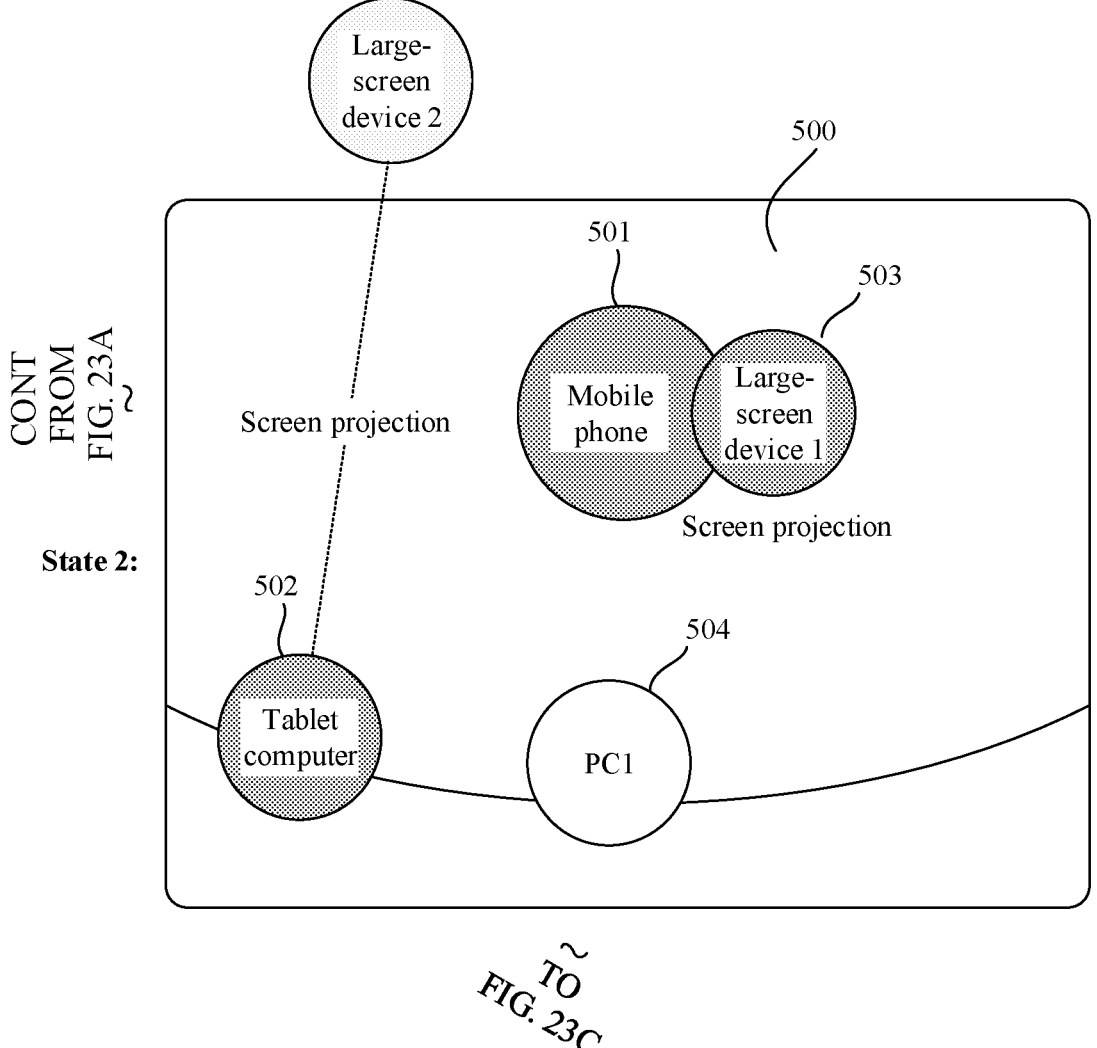
Figure 23C:
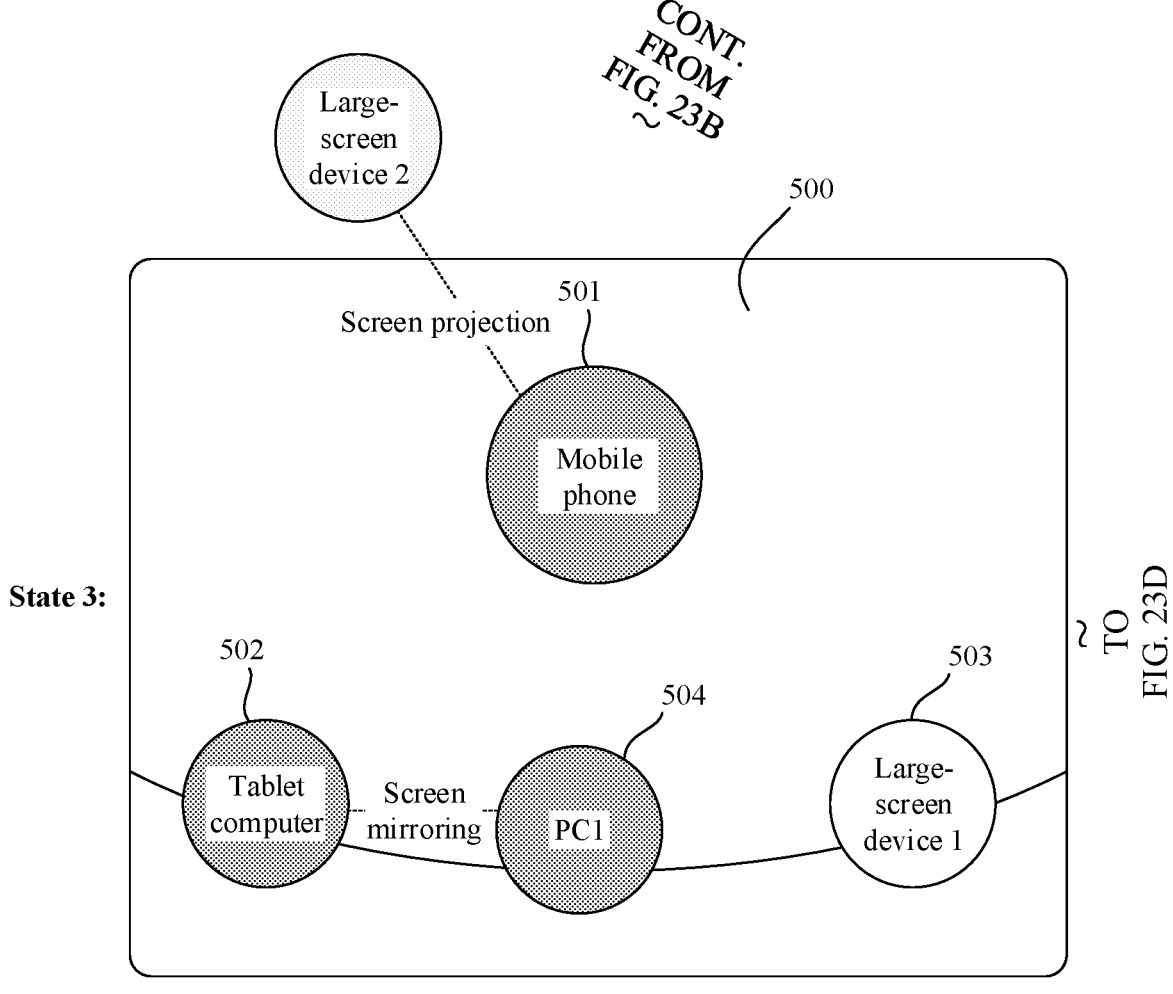
Figure 23D:
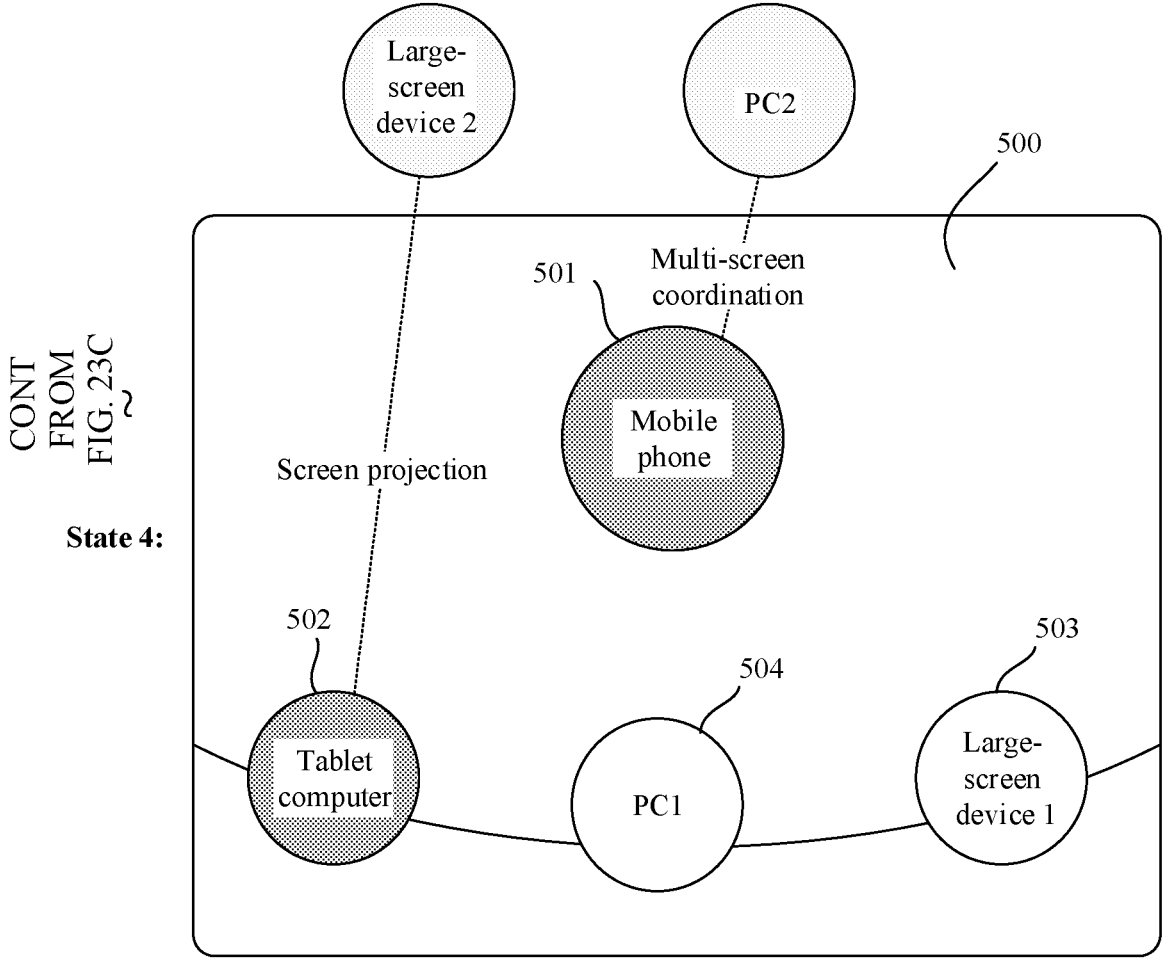
Figure 24:
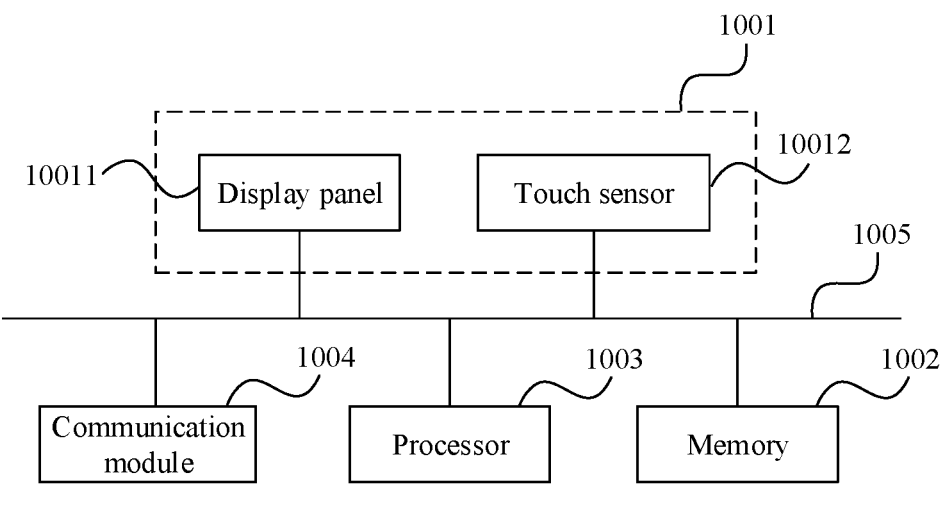
Figure 25:
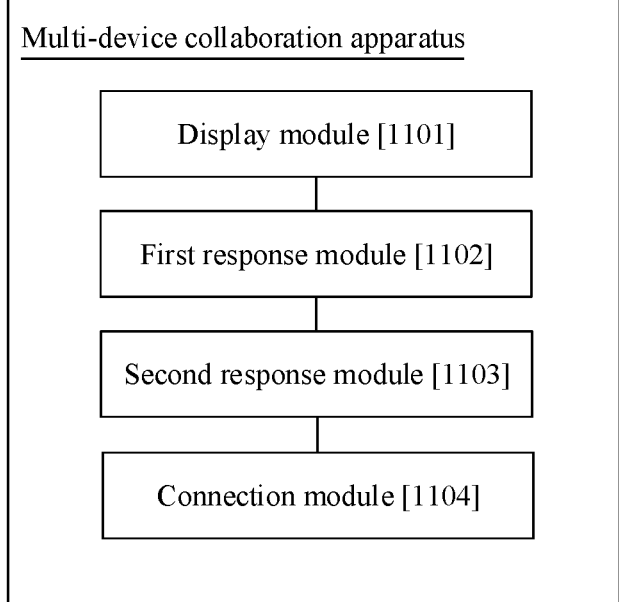

FIG. 2 is a schematic diagram of a hardware structure of an electronic device according to an embodiment of this application;

FIG. 3 is a block diagram of a software structure of an electronic device according to an embodiment of this application;

FIG. 4 is an example view of a first page according to an embodiment of this application;

FIG. 5A-FIG. 5C are a first group of example diagrams of interaction of a multi-device collaboration method according to an embodiment of this application;

FIG. 6 is a flowchart of a multi-device collaboration method according to an embodiment of this application;

FIG. 7A-FIG. 7D are a second group of example diagrams of interaction of a multi-device collaboration method according to an embodiment of this application;

FIG. 8A-FIG. 8D are a third group of example diagrams of interaction of a multi-device collaboration method according to an embodiment of this application;

FIG. 9A-FIG. 9D are a fourth group of example diagrams of interaction of a multi-device collaboration method according to an embodiment of this application;

FIG. 10 is another flowchart of a multi-device collaboration method according to an embodiment of this application;

FIG. 11A-FIG. 11E are a fifth group of example diagrams of interaction of a multi-device collaboration method according to an embodiment of this application;

FIG. 12A-FIG. 12D are a sixth group of example diagrams of interaction of a multi-device collaboration method according to an embodiment of this application;

FIG. 13A-FIG. 13C are example diagrams of turn-on and turn-off manners of an automatic collaboration service according to an embodiment of this application;

FIG. 14A-FIG. 14D are example diagrams of a demonstration function of an automatic collaboration service according to an embodiment of this application;

FIG. 15A and FIG. 15B are a seventh group of example diagrams of interaction of a multi-device collaboration method according to an embodiment of this application;

FIG. 16A, FIG. 16B, and FIG. 16C are an eighth group of example diagrams of interaction of a multi-device collaboration method according to an embodiment of this application;

FIG. 17A, FIG. 17B, and FIG. 17C are a ninth group of example diagrams of interaction of a multi-device collaboration method according to an embodiment of this application;

FIG. 18A, FIG. 18B, FIG. 18C, and FIG. 18D are a tenth group of example diagrams of interaction of a multi-device collaboration method according to an embodiment of this application;

FIG. 19A, FIG. 19B, FIG. 19C, FIG. 19D, FIG. 19E, and FIG. 19F are an eleventh group of example diagrams of interaction of a multi-device collaboration method according to an embodiment of this application;

FIG. 20A, FIG. 20B, and FIG. 20C are a first example diagram of a color of a device identifier according to an embodiment of this application;

FIG. 21 is a second example diagram of a color of a device identifier according to an embodiment of this application;

FIG. 22 is a third example diagram of a color of a device identifier according to an embodiment of this application;

FIG. 23A, FIG. 23B, FIG. 23C, and FIG. 23D are a fourth example diagram of a color of a device identifier according to an embodiment of this application;

FIG. 24 is a schematic diagram of a structure of a multi-device collaboration apparatus according to an embodiment of this application; and FIG. 25 is a schematic diagram of a structure of another multi-device collaboration apparatus according to an embodiment of this application.

DETAILED DESCRIPTION OF ILLUSTRATIVE EMBODIMENTS

Multi-device collaboration is a distribution technology applied to a plurality of electronic devices. By using the multi-device collaboration technology, cross-system and cross-device collaboration can be performed between two or more electronic devices, so as to implement resource sharing and collaborative operations.

Multi-device collaboration may be applied to electronic devices of a same type or different types. Types of electronic devices include but are not limited to devices such as a mobile phone, a tablet computer, a notebook computer, a large-screen device (for example, a smart television or a smart screen), a personal computer (personalcomputer, PC), a handheld computer, a netbook, a personal digital assistant (personal digital assistant, PDA), a wearable electronic device, an in-vehicle device, and a virtual reality device.

Multi-device collaboration needs to be implemented based on a communication connection between devices. The communication connection may be a wired communication connection, or may be a wireless communication connection. Solutions for the wired communication connection may include, for example, a USB On-The-Go (OTG) technology. Solutions for wireless communication may include, for example, wireless fidelity (wireless fidelity, Wi-Fi), Wi-Fi direct (Wi-Fi Direct), Bluetooth (bluetooth, BT), a near field communication technology (near field communication, NFC), and an infrared technology (infrared, IR).

With continuous development of terminal technologies, a plurality of different collaboration modes (also referred to as collaboration services) have emerged for multi-device collaboration, for example, screen extension, screen projection, Connected Call, screen mirroring, multi-screen coordination, Connected Notification, keyboard and mouse sharing, and Connected Input.

Screen extension: A screen of an electronic device B is used as a secondary screen of an electronic device A, and the electronic device A may transfer some content that needs to be displayed by the electronic device A to the secondary screen for display. A screen of the electronic device A and the screen of the electronic device B can jointly display content, thereby extending a display capability of the electronic device A.

Screen projection: Content (for example, a video or a photo) on the screen of the electronic device A is delivered to the screen of the electronic device B for display. During screen projection, a user may select some or all content on the screen of the electronic device A and deliver the content to the screen of the electronic device B for display. Some screen projection manners further allow the user to switch the screen to another page during screen projection, without affecting continued play of the delivered content by the electronic device B.

Connected Call: When the electronic device A receives an incoming voice call or an incoming video call, an incoming call interface may be synchronously displayed on the electronic device B. In this way, the user may choose to answer or hang up the call on the electronic device B.

Screen mirroring: All content on the screen of the electronic device A is completely mirrored and displayed on the screen of the electronic device B. The content of the electronic device A that is displayed on the electronic device B is the same as the content displayed on the electronic device A, and changes with the content displayed on the electronic device A.

Multi-screen coordination: A user interface of the electronic device A is projected to the screen of the electronic device B for display. In addition, the user is allowed to perform, on the electronic device B, an operation on the user interface of the electronic device A, and to perform a specific operation (for example, dragging a file from a user interface of the electronic device B to a user interface of the electronic device A) on the electronic device B to transmit a file in the electronic device B to the electronic device A, thereby implementing a cross-device operation and cross-device file transmission between the electronic device A and the electronic device B, and the like. The user interface of the electronic device A may be displayed in any region of the screen of the electronic device B, or may be displayed in full screen.

Connected Notification: When the electronic device A receives a notification message, the notification message may be synchronously displayed on the electronic device B, and the user may be further allowed to perform, on the electronic device B, operations such as reply, delete, and read on the notification message.

Keyboard and mouse sharing: The electronic device A and the electronic device B may share original input devices with each other, for example, a mouse and a keyboard. A shared input device may perform input on the electronic device A or the electronic device B. In addition, in a keyboard and mouse sharing mode, file transmission may be further performed between the electronic device A and the electronic device B.

Connected Apps: The user may transfer an uncompleted operation on the electronic device A to the electronic device B to perform a connection operation, for example, transfer a document being edited on the electronic device A to the electronic device B for further editing.

Among the plurality of collaboration modes enumerated above, some collaboration modes are initiated by a master device (an initiator of multi-device collaboration) to a slave device (a participant of the multi-device collaboration) in response to a user's operation, and therefore may be referred to as manual collaboration services or manual collaboration businesses, for example, screen extension, screen projection, screen mirroring, multi-screen coordination, and keyboard and mouse sharing; and some other collaboration modes are automatically triggered when a triggering rule is met in a state in which the user has enabled the function, and therefore may be referred to as automatic collaboration services or automatic collaboration businesses, for example, Connected Call, Connected Notification, and Connected Apps.

For the two electronic devices, a collaboration mode supported by the two electronic devices is generally related to factors such as a device type, a screen size, and a device capability. Therefore, the two electronic devices may support only one collaboration mode, or may support a plurality of collaboration modes.

A manual collaboration service is used as an example.

If the master device is a mobile phone and the slave device is a tablet computer, a collaboration mode supported by the master device and the slave device may include multi-screen coordination.

If the master device is a mobile phone and the slave device is a PC, a collaboration mode supported by the master device and the slave device may include screen mirroring, screen extension, keyboard and mouse sharing, and multi-screen coordination.

If the master device is a mobile phone and the slave device is a large-screen device, a collaboration mode supported by the master device and the slave device may include screen projection.

If the master device is a tablet computer and the slave device is a mobile phone, a collaboration mode supported by the master device and the slave device may include multi-screen coordination.

If the master device is a tablet computer and the slave device is a PC, a collaboration mode supported by the master device and the slave device may include screen mirroring, screen extension, and keyboard and mouse sharing.

If the master device is a tablet computer and the slave device is a large-screen device, a collaboration mode supported by the master device and the slave device may include screen projection.

If the master device is a PC and the slave device is a mobile phone, a collaboration mode supported by the master device and the slave device may include screen mirroring, screen extension, keyboard and mouse sharing, and multi-screen coordination.

If the master device is a PC and the slave device is a tablet computer, a collaboration mode supported by the master device and the slave device may include screen mirroring, screen extension, and keyboard and mouse sharing.

If the master device is a PC and the slave device is a large-screen device, a collaboration mode supported by the master device and the slave device may include screen projection.

The automatic collaboration service is used as an example.

Electronic devices that support Connected Call may include a mobile phone, a tablet computer, a PC, a large-screen display device, and the like.

Electronic devices that support Connected Notification may include a mobile phone, a tablet computer, a PC, and the like.

Electronic devices that support Connected Apps may include a mobile phone, a tablet computer, a PC, a large-screen display device, and the like.

The following uses a manual collaboration service as an example to describe a current process in which a master device and a slave device establish multi-device collaboration.

Figure 1A:
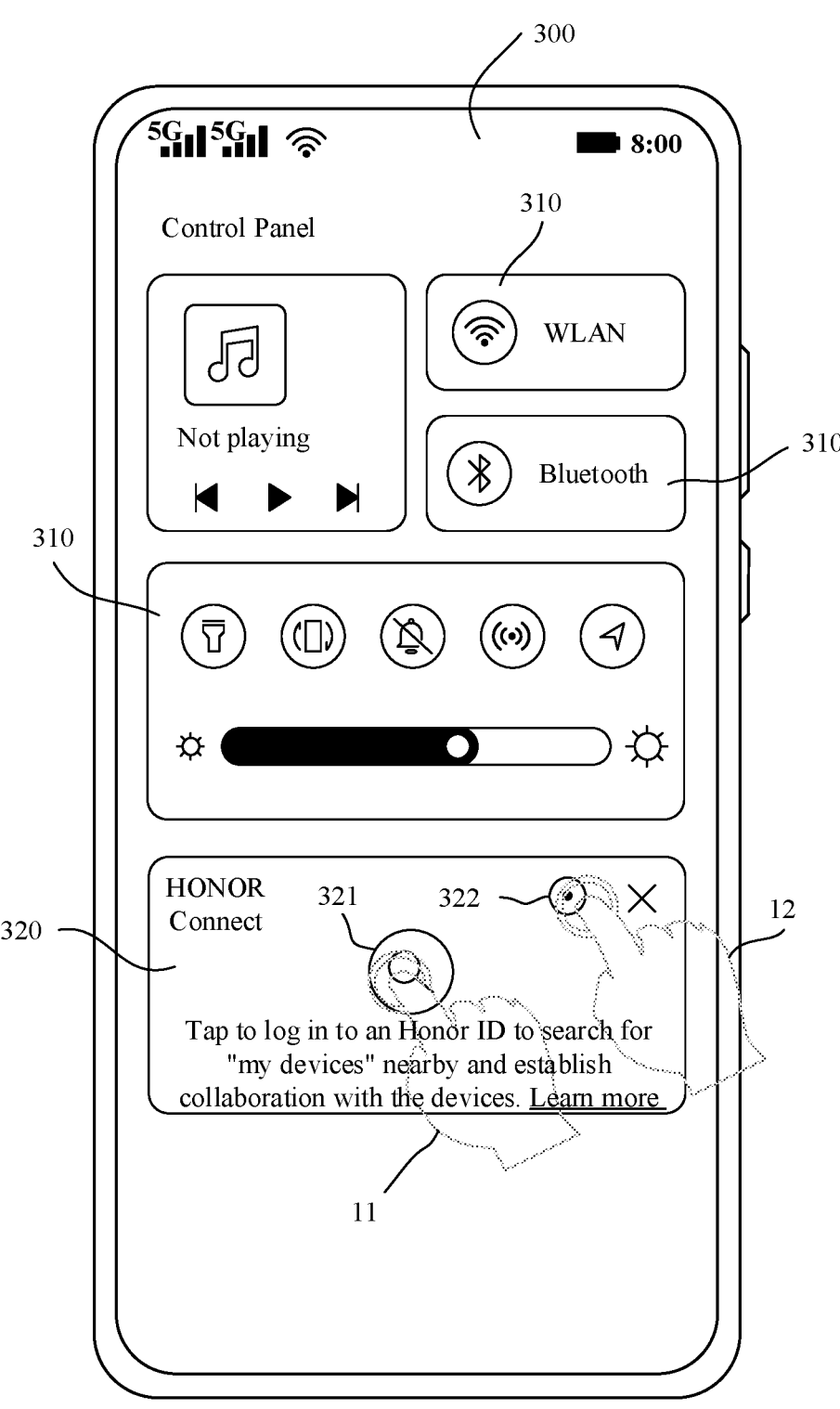
FIG. 1A-FIG. 1C are schematic diagrams of a process in which a master device and a slave device establish multi-device collaboration.
Figure 1B:
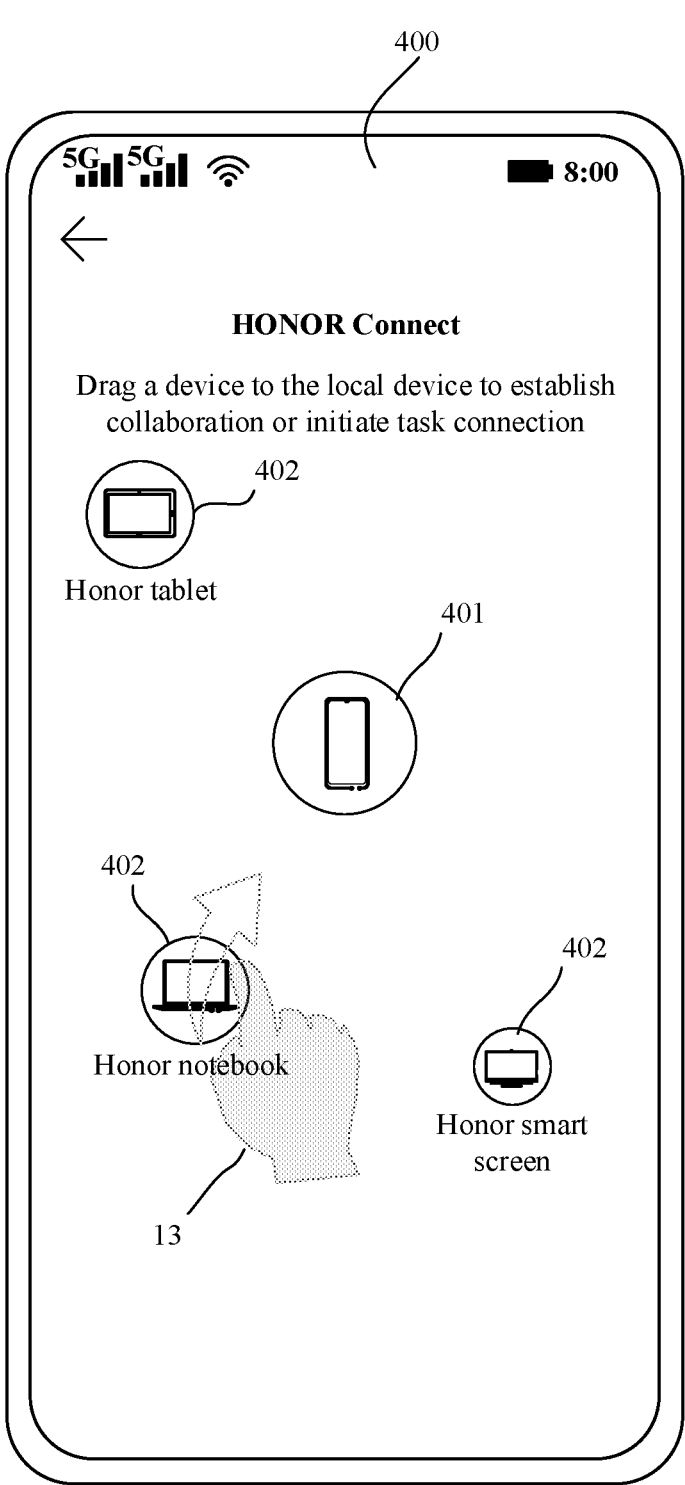
Figure 1C:
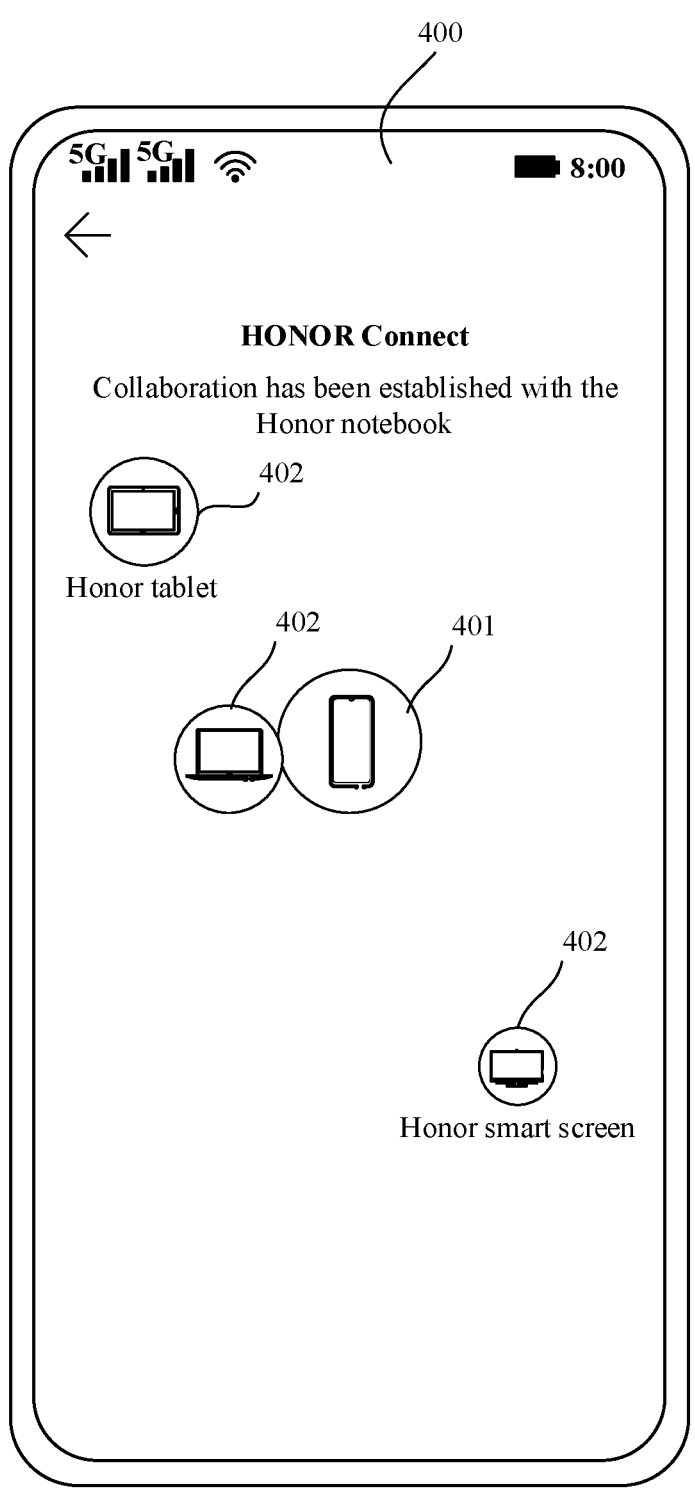

FIG. 1A-FIG. 1C are schematic diagrams of a process in which a master device and a slave device establish multi-device collaboration.

As shown in FIG. 1A, an example in which the master device is a mobile phone is used. In a conventional solution, when a user wants to use a multi-device collaboration service, the user may open a control center page 300 of the master device. The control center page 300 may include one or more function switches 310 and a multi-device collaboration panel 320. The multi-device collaboration panel 320 may include one or more elements that can be tapped, for example, a search icon 321 and an entry icon 322 of a multi-device collaboration connection page 400. Next, the master device may search for a near field device near the master device in response to that the user taps 11 the search icon 321. The near field device may include, for example, a device that is near the master device and that is bound to the master device. If a near field device is found, an icon of the near field device may be displayed in the multi-device collaboration panel. Next, the master device may open the multi-device collaboration connection page 400 in response to that the user taps 12 the entry icon 322.

As shown in FIG. 1B and FIG. 1C, the connection page 400 may include an icon 401 of the master device and an icon 402 of one or more found near field devices. The icon 401 of the master device may be located in a central region of the connection page 400, and the icon 402 of the one or more near field devices may be distributed around the icon 401 of the master device. Next, the user may select one slave device from the one or more near field devices, and drag 13 an icon 402 of the slave device in a direction towards the icon 401 of the master device. When the icon 401 of the master device comes into contact with the icon 402 of the slave device, the master device may trigger establishment of multi-device collaboration with the slave device.

In a conventional solution, if the master device and the slave device support only one collaboration mode, the master device and the slave device establish multi-device collaboration based on the collaboration mode. If the master device and the slave device support a plurality of collaboration modes, when the master device and the slave device establish multi-device collaboration for the first time, a default collaboration mode of the two parties is used. If it is not the first time that the master device and the slave device establish multi-device collaboration, a collaboration mode used when the two parties previously established multi-device collaboration is selected.

However, when the user uses the master device and the slave device to perform multi-device collaboration, a collaboration mode expected to be used is probably different from the previously used collaboration mode. In this state, if the user wants to change the collaboration mode, the user needs to change the collaboration mode by using an entry of another application in the master device or the slave device. For example, the user needs to change the collaboration mode in a settings application in the master device, or in a specific application in the slave device. The user cannot select, in a process of establishing multi-device collaboration, a collaboration mode that the user expects to use. This affects user experience.

To resolve the foregoing technical problem, an embodiment of this application provides a multi-device collaboration method.

The multi-device collaboration method in this embodiment of this application may be applied to various types of electronic devices that have a display function.

FIG. 2 is a schematic diagram of a hardware structure of an electronic device according to an embodiment of this application. The device may be used as a master device in multi-device collaboration, or may be used as a slave device in multi-device collaboration. As shown in FIG. 2, an electronic device 100 may include a processor 110, a memory 120, a universal serial bus (universal serial bus, USB) interface 130, a radio frequency circuit 140, a mobile communication module 150, a wireless communication module 160, a camera 170, a display 180, a touch sensor 190, a barometric pressure sensor 210, a key 220, and the like.

The processor 110 may include one or more processing units. For example, the processor 110 may include an application processor (application processor, AP), a modem processor, a graphics processing unit (graphics processing unit, GPU), an image signal processor (image signal processor, ISP), a video codec, a digital signal processor (digital signal processor, DSP), a baseband processor, and/or a neural-network processing unit (neural-network processing unit, NPU). Different processing units may be independent devices, or may be integrated in one or more processors such as a system on a chip (system on a chip, SoC). A memory may be further disposed in the processor 110 to store instructions and data. In some embodiments, the memory in the processor 110 is a cache. The memory may store instructions or data just used or cyclically used by the processor 110.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The memory 120 may be configured to store computer-executable program code, and the executable program code includes instructions. The memory 120 may include a program storage area and a data storage area. The program storage area may store an operating system, an application program required by at least one function (for example, a sound playing function or an image playing function), and the like. The data storage area may store data (such as audio data and a phone book) and the like created during use of the electronic device 100. In addition, the memory 120 may include one or more storage units. For example, the storage unit may include a volatile memory (volatile memory) such as a dynamic random access memory (dynamic random access memory, DRAM) or a static random access memory (static random access memory, SRAM), or may include a non-volatile memory (non-volatile memory, NVM) such as a read-only memory (read-only memory, ROM) or a flash memory (flash memory). The processor 110 executes various function applications and data processing of the electronic device 100 by running the instructions stored in the memory 120 and/or the instructions stored in the memory disposed in the processor.

Herein, it should be additionally noted that, the operating system in this embodiment of this application includes but is not limited to an Android operating system, an IOS operating system, an iPad OS, a Harmony operating system (HarmonyOS), a Windows operating system, a Linux operating system, a MAC OS operating system, an embedded system, and the like.

A wireless communication function of the electronic device 100 may be implemented by using the radio frequency circuit 140, the mobile communication module 150, the wireless communication module 160, the modem processor, the baseband processor, and the like.

The radio frequency circuit 140 may include at least one antenna 141, configured to transmit and receive an electromagnetic wave signal. Each antenna in the electronic device 100 may be configured to cover one or more communication bands. In some embodiments, the antenna may be used in combination with a tuning switch.

The mobile communication module 150 may provide a wireless communication solution including 2G/3G/4G/5G or the like, of an application, that is on the electronic device 100. The mobile communication module 150 may include at least one filter, switch, power amplifier, low noise amplifier (low noise amplifier, LNA), and the like. The mobile communication module 150 may receive an electromagnetic wave by using the antenna 141, perform processing such as filtering and amplification on the received electromagnetic wave, and transfer the electromagnetic wave to the modem processor for demodulation. The mobile communication module 150 may further amplify a signal modulated by the modem processor, and convert the signal into an electromagnetic wave through the antenna 141 for radiation. In some embodiments, at least some functional modules in the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. Then, the demodulator transfers, to the baseband processor for processing, the low-frequency baseband signal obtained through demodulation. The low-frequency baseband signal is transmitted to the application processor after being processed by the baseband processor. The application processor outputs a sound signal by using an audio device (including but not limited to a speaker, a receiver, and the like), or displays an image or a video on the display 180. In some embodiments, the modem processor may be an independent device. In some other embodiments, the modem processor may be independent of the processor 110, and be disposed in a same device as the mobile communication module 150 or another functional module.

The wireless communication module 160 may include a wireless fidelity (wireless fidelity, Wi-Fi) module, a Bluetooth (bluetooth, BT) module, a GNSS module, a near field communication (near field communication, NFC) module, an infrared (infrared, IR) module, and the like. The wireless communication module 160 may be one or more devices into which at least one of the foregoing modules is integrated. The wireless communication module 160 receives an electromagnetic wave by using the antenna 141, modulates and filters an electromagnetic wave signal, and transmits the processed signal to the processor 110. The wireless communication module 160 may further receive a to-be-sent signal from the processor 110, modulate and amplify the signal, and convert the signal into an electromagnetic wave through the antenna 141 for radiation.

In this embodiment of this application, the wireless communication function of the electronic device 100 may include, for example, functions such as a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), 5th generation mobile networks new radio (5th generation mobile networks new radio, 5G NR), BT, a GNSS, a WLAN, NFC, FM, and/or IR. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The camera 170 is configured to capture a still image or a video. The camera 170 includes a lens and a photosensitive element. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it into a digital image signal. The ISP outputs the digital image signal to the DSP for processing. The DSP converts the digital image signal into an image signal in a standard format such as RGB, YUV, or RYYB. In some embodiments, the electronic device 100 may include 1 or N cameras 170, where N is a positive integer greater than 1.

As a neural-network (neural-network, NN) computing processor, the NPU may quickly process input information by using a biological neural network structure such as a mode of transmission between human-brain neurons, and may further constantly perform self-learning. Applications such as intelligent cognition of the electronic device 100 may be implemented by using the NPU, for example, image recognition, facial recognition, voice recognition, and text understanding.

The display 180 is configured to display an image, a video, or the like. The display 180 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a MiniLED, a MicroLED, a Micro-OLED, a quantum dot light emitting diode (quantum dot light emitting diodes, QLED), or the like. In some embodiments, the electronic device 100 may include 1 or N displays 180, where N is a positive integer greater than 1.

The touch sensor 190 is also referred to as a "touch device". The touch sensor 190 may be disposed on the display 180. The touch sensor 190 and the display 180 form a touchscreen, which is also referred to as a "touch screen". The touch sensor 190 is configured to detect a touch operation performed on or near the touch sensor 190. The touch sensor may transmit the detected touch operation to the application processor, to determine a type of a touch event. A visual output related to the touch operation may be provided by using the display 180. In some other embodiments, the touch sensor 190 may be alternatively disposed on a surface of the electronic device 100, at a position different from that of the display 180.

The barometric pressure sensor 210 is configured to measure barometric pressure. In some embodiments, the electronic device 100 calculates an altitude by using a barometric pressure value measured by the barometric pressure sensor 210, to assist in positioning and navigation.

The key 220 includes an on/off key, a volume key, or the like. The key 220 may be a mechanical key, or may be a touch key. The electronic device 100 may receive a key input and generate a key signal input related to user settings and function control of the electronic device 100.

It may be understood that the structure illustrated in this embodiment of this application constitutes no specific limitation on the electronic device 100. In some other embodiments of this application, the electronic device may include more or fewer components than those shown in the figure, or combine some components, or split some components, or have different component arrangements. The component shown in the figure may be implemented by hardware, software, or a combination of software and hardware.

The following provides example descriptions of method steps of a multi-device collaboration method provided in the embodiments of this application.

A software system of the electronic device 100 may use a layered architecture, an event-driven architecture, a micro-kernel architecture, a microservice architecture, or a cloud architecture. In the embodiments of the present invention, an Android system with a layered architecture is used as an example to describe a software structure of the electronic device 100.

FIG. 3 is a block diagram of a software structure of the electronic device 100 according to an embodiment of this application.

The layered architecture divides software into several layers, and each layer has a clear role and task. The layers communicate with each other by using software interfaces. In some embodiments, the Android system is divided into four layers: an application layer, an application framework layer, an Android runtime (Android runtime) and system library, and a kernel layer from top to down.

The application layer may include a series of application packages.

As shown in FIG. 3, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for applications at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether a status bar exists, lock a screen, take a screenshot, and the like.

The content provider is configured to store and obtain data, and enable the data to be accessible to an application. The data may include a video, an image, audio, calls that are made and answered, a browsing history and bookmarks, a phone book, and the like.

The view system includes visual controls such as a text display control and a picture display control. The view system may be configured to construct an application. A display interface may include one or more views. For example, a display interface including a short message notification icon may include a view for displaying text and a view for displaying a picture.

The phone manager is configured to provide a communication function for the electronic device 100, for example, management of a call status (including an answered state, a declined state, or the like).

The resource manager provides various resources for the application, for example, a localized string, an icon, a picture, a layout file, and a video file.

The notification manager enables the application to display notification information in the status bar, and may be configured to convey a notification-type message. The displayed notification information may automatically disappear after a short pause without a need to perform user interaction. For example, the notification manager is configured to provide a notification of download completion, a message reminder, and the like. The notification manager may further be a notification that appears in the status bar at the top of the system in a form of a graph or scroll bar text, for example, a notification of an application running in the background, or a notification that appears on a screen in a form of a dialog window. For example, text information is prompted in the status bar, an alert tone is produced, the electronic device vibrates, or an indicator blinks.

The Android Runtime includes a kernel library and a virtual machine. The Android runtime is responsible for scheduling and management of the Android system.

The kernel library includes two parts: One part is a functional function that needs to be invoked in a java language, and the other part is an Android kernel library.

The application layer and the application framework layer run on the virtual machine. The virtual machine executes java files at the application layer and the application framework layer as binary files. The virtual machine is configured to perform functions such as lifecycle management of an object, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a two-dimensional graphics engine (for example, SGL).

The surface manager is configured to manage a display subsystem and provide fusion of 2D and 3D layers for a plurality of applications.

The media library supports various commonly used audio, playback and recording in a video format, still image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering and synthesis, layer processing, and the like.

The two-dimensional graphics engine is a drawing engine for two-dimensional drawings.

The kernel layer is a layer between hardware and software. The kernel layer includes at least a display driver, a camera driver, an audio driver, and a sensor driver.

The multi-device collaboration method provided in the embodiments of this application may be implemented in a master device. For example, the master device may perform the steps of the multi-device collaboration method in response to one or more operations performed by a user on a multi-device collaboration connection page. In some implementations, the multi-device collaboration connection page may also be referred to as an "HONOR Connect" page, a "Super Terminal" page, an "Internet of Everything" page, or the like.

For ease of description, the multi-device collaboration connection page is briefly referred to as a first page below.

FIG. 4 is an example view of a first page according to an embodiment of this application. A first page 500 is generated by the master device in response to that a user taps an entry icon on a multi-device collaboration panel, or may be generated in another manner. This is not limited in this embodiment of this application.

In an implementation, the first page 500 may include a device identifier 510 of the master device. The device identifier 510 of the master device may be located in a central region of the first page 500, a top of the first page 500, another region, or the like. The device identifier 510 of the master device may be a graphical identifier, such as an icon or another skeuomorphic element. For example, a water-bead element wrapping a master device icon may be used as the device identifier 510 of the master device, or a bubble-shape element including the master device icon may be used as the device identifier 510 of the master device. This is not limited in this embodiment of this application.

After generating the first page 500, the master device may search for a near field device nearby, and display, on the first page 500, a device identifier of a found near field device (for example, a tablet computer, a large-screen device, and a PC). The device identifier of the near field device may be distributed around the device identifier 510 of the master device. For example, in FIG. 4, the device identifier 510 of the master device is located in the central region of the first page 500, and a device identifier 502 of the tablet computer, a device identifier 503 of the large-screen device, and a device identifier 504 of the PC are located below the device identifier 510 of the master device and are distributed on an arc 505. In addition, the device identifier of the near field device may alternatively be distributed above the device identifier 510 of the master device, or distributed around the device identifier 510 of the master device in a planetary manner. The device identifier of the near field device is similar to the device identifier 510 of the master device, and may also be a graphical identifier, such as an icon or another skeuomorphic element. The device identifier 510 of the master device and the device identifier of the near field device may use different colors or sizes, so that the user can distinguish between them.

Next, the master device may determine at least one slave device from the near field device based on one or more operations performed by the user on the first page 500, and establish multi-device collaboration with the slave device based on the device collaboration method provided in the embodiments of this application. The following separately provides example description on the steps of the device collaboration method in two scenarios that "the master device and the slave device support only one collaboration mode" and "the master device and the slave device support a plurality of collaboration modes."

In the scenario that the master device and the slave device support only one collaboration mode:

FIG. 5A-FIG. 5C are a first group of example diagrams of interaction of a multi-device collaboration method according to an embodiment of this application. For example, the master device is a mobile phone, the slave device is a tablet computer, and only multi-screen coordination is supported between the mobile phone and the tablet computer. As shown in FIG. 5A, if the user wants to establish multi-device collaboration between the mobile phone and the tablet computer, the user may drag 14 the device identifier 502 of the tablet computer in a direction towards the device identifier 501 of the mobile phone. As shown in FIG. 5B, when the device identifier 501 of the mobile phone comes into contact with the device identifier 502 of the tablet computer, the mobile phone may initiate a multi-screen coordination connection to the tablet computer. As shown in FIG. 5C, if the mobile phone and the tablet computer establish multi-screen coordination successfully, the mobile phone may combine the device identifier 501 of the mobile phone and the device identifier 502 of the tablet computer into a multi-screen coordination identifier 601, and display the multi-screen coordination identifier 601. The multi-screen coordination identifier 601 is similar to the device identifier 510 of the master device, and may also be a graphical identifier, such as an icon or another skeuomorphic element. In this way, the mobile phone may convey a result of successful establishment of multi-screen coordination between the mobile phone and the tablet computer to the user by displaying the multi-screen coordination identifier.

In the scenario that the master device and the slave device support a plurality of collaboration modes:

FIG. 6 is a flowchart of a multi-device collaboration method according to an embodiment of this application.

As shown in FIG. 6, in an implementation, when the master device and the slave device support a plurality of collaboration modes, the method may include the following steps S101-S103.

Step S101: In response to a user operation, display the plurality of collaboration modes supported by the master device and the slave device.

The user operation may include one or more operations performed by a user on a first page. A manner of implementing the user operation may vary with a type of the master device. For example, when the master device is an electronic device that supports a touch operation, such as a mobile phone or a tablet computer, the user operation may include a touch operation, such as tap or slide, that is performed by a finger of the user on one or more device identifiers on the first page. When the master device is a large-screen device, the user operation may include an operation, such as select or confirm, that is performed by the user on one or more device identifiers on the first page by sending an instruction to the large-screen device over a remote control. When the master device is a PC, the user operation may include an operation performed by the user on the first page by using an input device such as a keyboard or a mouse, for example, selecting or dragging one or more device identifiers by using the mouse.

The master device may pre-store collaboration modes supported by the master device and various types of electronic devices. For example, the master device may store the collaboration modes locally on the master device or on a cloud.

In an implementation, if the master device and the slave device support a plurality of collaboration modes, the master device may display, on the first page, a mode identifier of at least one supported collaboration mode in response to a user operation. The master device may display mode identifiers of some collaboration modes supported by the master device and the slave device, or may display mode identifiers of all collaboration modes supported by the master device and the slave device. A mode identifier is similar to a device identifier, and may also be a graphical identifier, such as an icon or another skeuomorphic element. For example, when the collaboration modes supported by the master device and the slave device include screen mirroring, keyboard and mouse sharing, multi-screen coordination, and screen extension, the master device may display, on the first page, a screen mirroring identifier, a keyboard and mouse sharing identifier, a multi-screen coordination identifier, and a screen extension identifier. In this way, the user can intuitively learn, based on the mode identifiers, collaboration modes that can be selected by the user.

Step S102: Determine, from the plurality of collaboration modes, a target collaboration mode selected by the user.

Based on different types of the master device, the user may select, from the plurality of collaboration modes in different manners, a collaboration mode expected to be used. The master device uses, as the target collaboration mode, the collaboration mode selected by the user. For example, when the master device is an electronic device that supports a touch operation, such as a mobile phone or a tablet computer, the user may tap a mode identifier of any collaboration mode on the first page by using a finger, to determine the collaboration mode as the target collaboration mode. When the master device is a large-screen device, the user selects a mode identifier of any collaboration mode by using a remote control, and performs a confirm operation, to determine the collaboration mode as the target collaboration mode. When the master device is a PC, the user may click a mode identifier of any collaboration mode by using a mouse, to determine the collaboration mode as the target collaboration mode.

Step S103: Establish multi-device collaboration with the slave device based on the target collaboration mode.

In specific implementation, after the user selects the target collaboration mode, the master device may initiate multi-device collaboration to the slave device based on the target collaboration mode. After establishing multi-device collaboration with the slave device, the master device may hide a mode identifier of a remaining collaboration mode other than the target collaboration mode, and display only the mode identifier of the target collaboration mode.

With reference to some examples, the following provides illustrative description on user interaction content in step S101-step S103 of the multi-device collaboration method shown in FIG. 6.

FIG. 7A-FIG. 7D are a second group of example diagrams of interaction of a multi-device collaboration method according to an embodiment of this application.

Figure 7A:
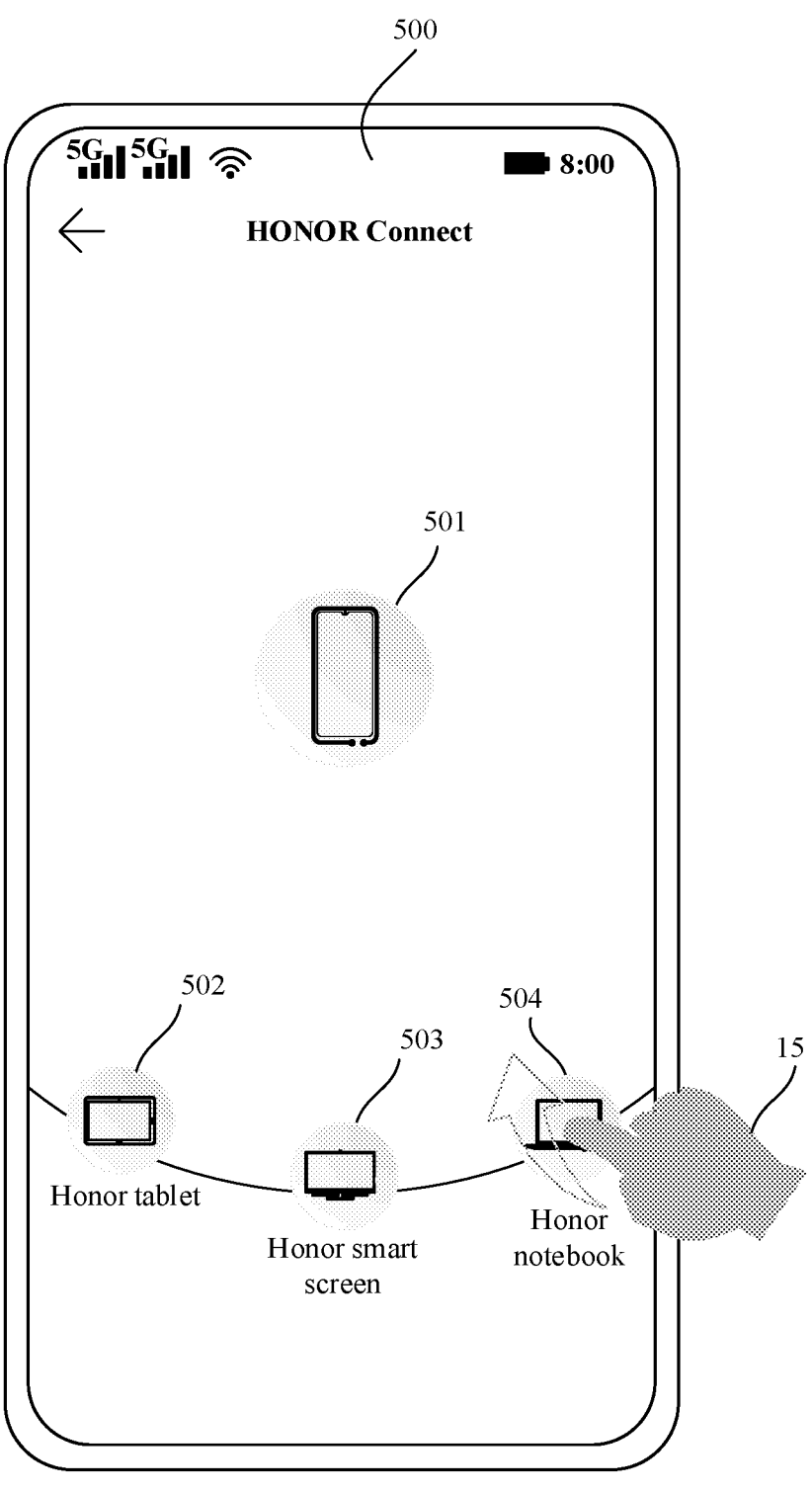

As shown in FIG. 7A, for example, the master device is a mobile phone. When the user wants to establish multi-device collaboration between the mobile phone and a PC, the user may use a finger to drag 15 a device identifier 504 of the PC in a direction towards a device identifier 501 of the mobile phone.

Figure 7B:
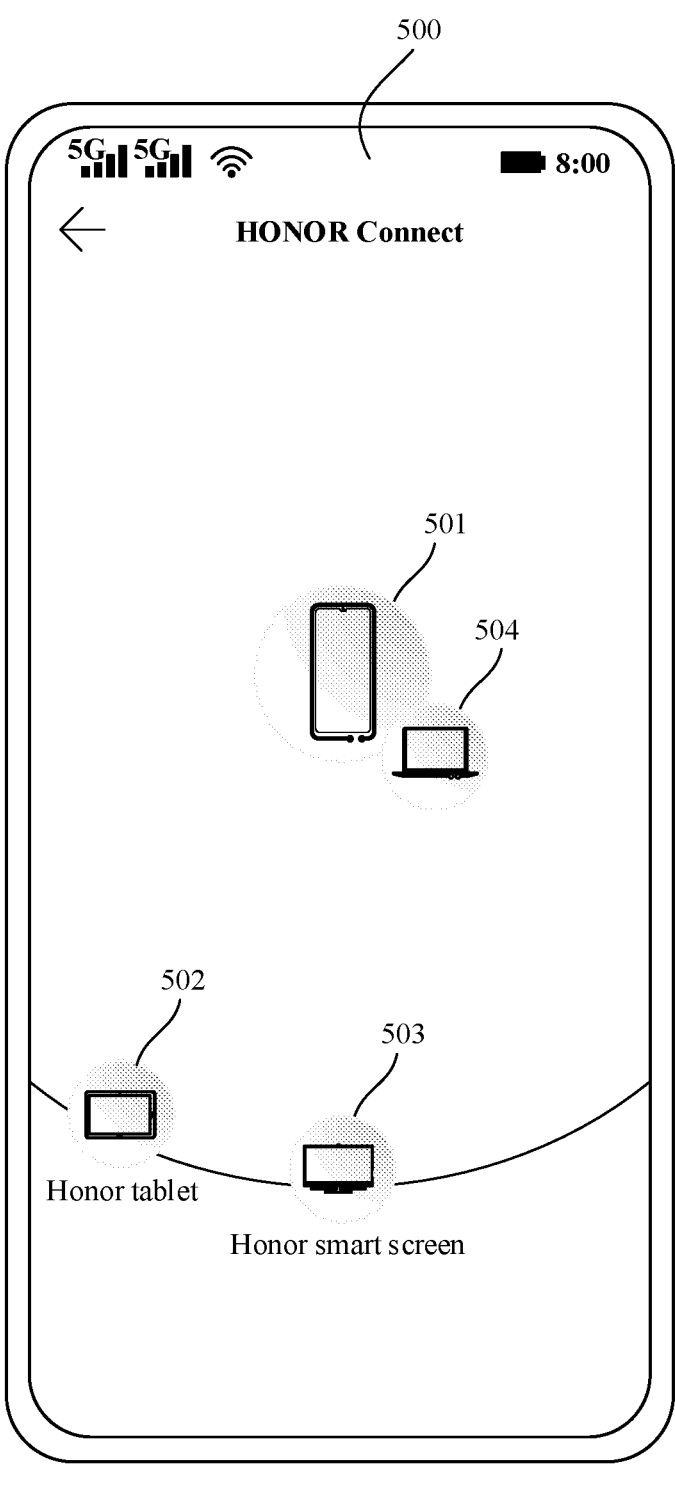
Figure 7C:
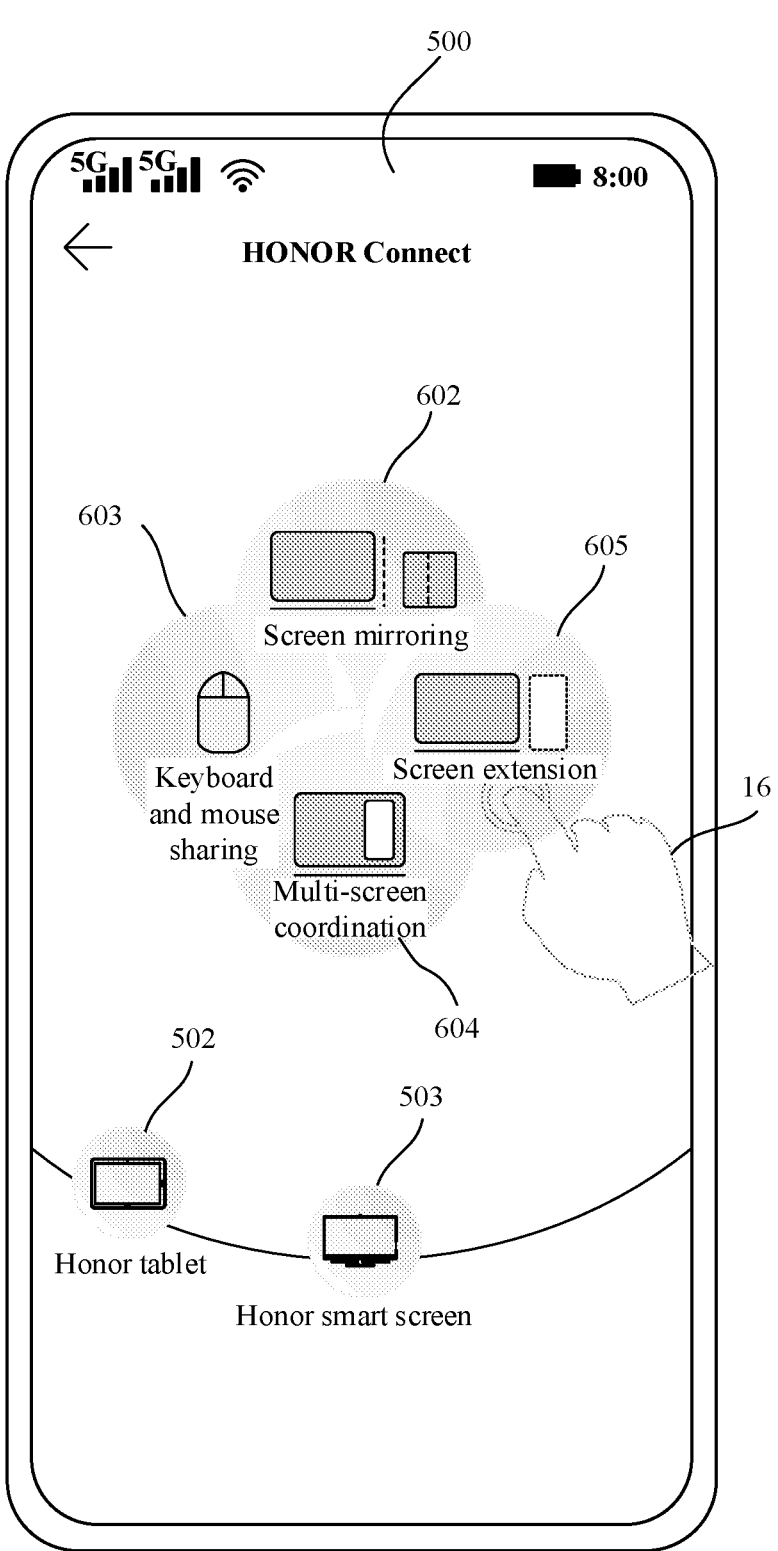

As shown in FIG. 7B and FIG. 7C, when the device identifier 501 of the mobile phone comes into contact with the device identifier 504 of the PC, the mobile phone may determine the PC as the slave device, and display mode identifiers of a plurality of collaboration modes supported by the mobile phone and the PC, for example, a screen mirroring identifier 602, a keyboard and mouse sharing identifier 603, a multi-screen coordination identifier 604, and a screen extension identifier 605.

For example, both a device identifier and a mode identifier are water-bead elements. When the water-bead element of the mobile phone comes into contact with the water-bead element of the PC, the first page may play an animation effect of combining the two water-bead elements. In a combining process, water-bead elements of screen mirroring, keyboard and mouse sharing, multi-screen coordination, and screen extension are gradually presented, and are finally displayed on the first page 500 in a semi-combined state.

Next, the user may use a finger to tap 16 a mode identifier of any collaboration mode, for example, the screen extension identifier 605. The mobile phone may determine the collaboration mode as a target collaboration mode in response to the user's tap 16 operation, and initiate multi-device collaboration to the slave PC based on the target collaboration mode.

Figure 7D:
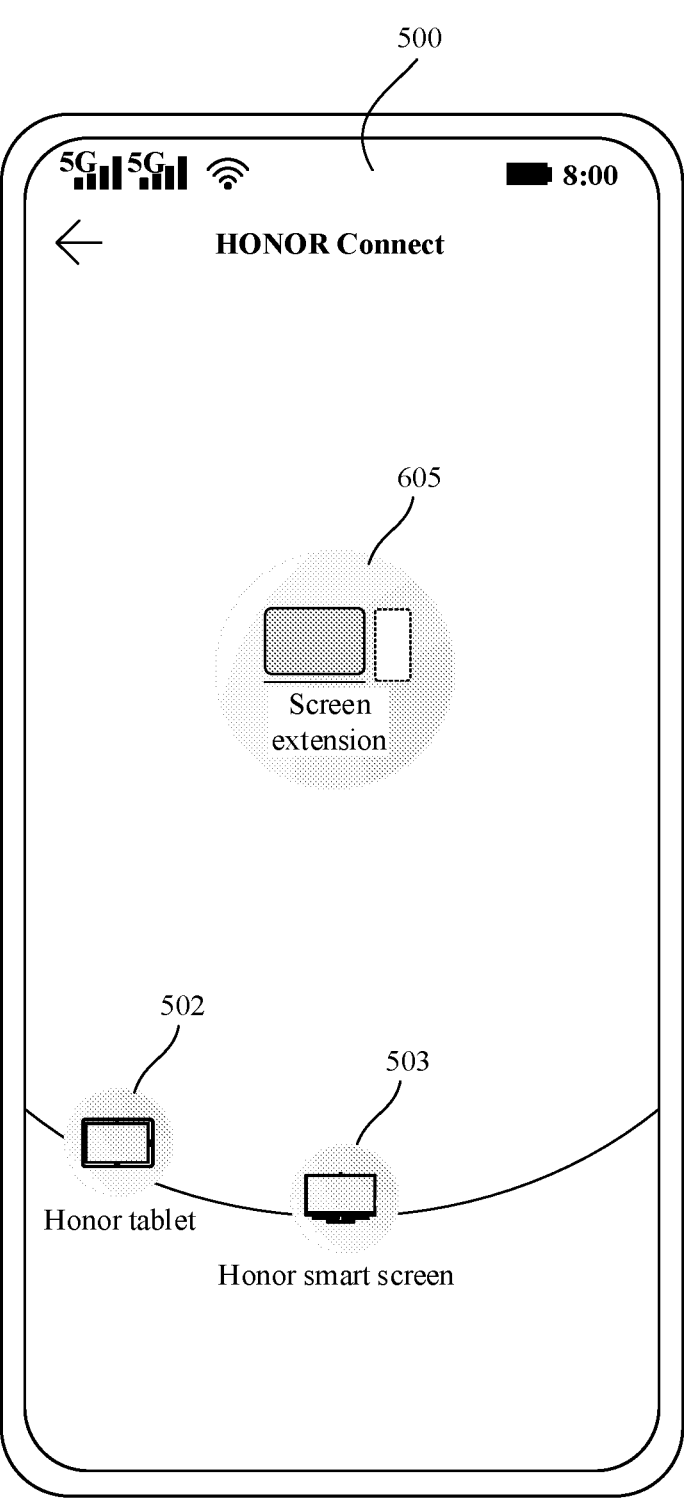

As shown in FIG. 7D, after the mobile phone and the PC establish multi-device collaboration based on the target collaboration mode, the mobile phone may hide a mode identifier of a remaining collaboration mode other than the target collaboration mode, and display only the mode identifier of the target collaboration mode, for example, the screen extension identifier 605.

For example, both a device identifier and a mode identifier are water-bead elements. When detecting that the user taps a water-bead element of screen extension, the mobile phone determines screen extension as the target collaboration mode, and initiates screen extension to the PC. After the mobile phone and the PC establish screen extension, the mobile phone may gradually hide water-bead elements of screen mirroring, multi-screen coordination, and keyboard and mouse sharing on the first page, gradually enlarge the water-bead element of screen extension, and finally display the enlarged water-bead element of screen extension at an original position of the water-bead element on the mobile phone.

FIG. 8A-FIG. 8D are a third group of example diagrams of interaction of a multi-device collaboration method according to an embodiment of this application.

Figure 8A:
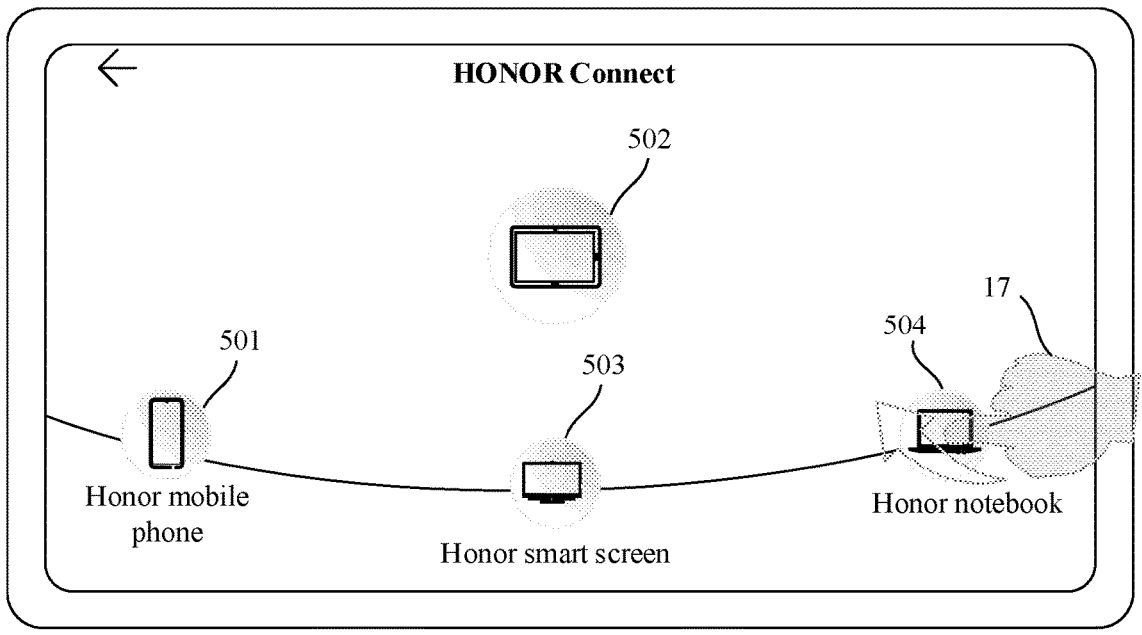

As shown in FIG. 8A, for example, the master device is a tablet computer. When the user wants to establish multi-device collaboration between the tablet computer and a PC, the user may drag 17 a device identifier 504 of the PC in a direction towards a device identifier 502 of the tablet computer.

Figure 8B:
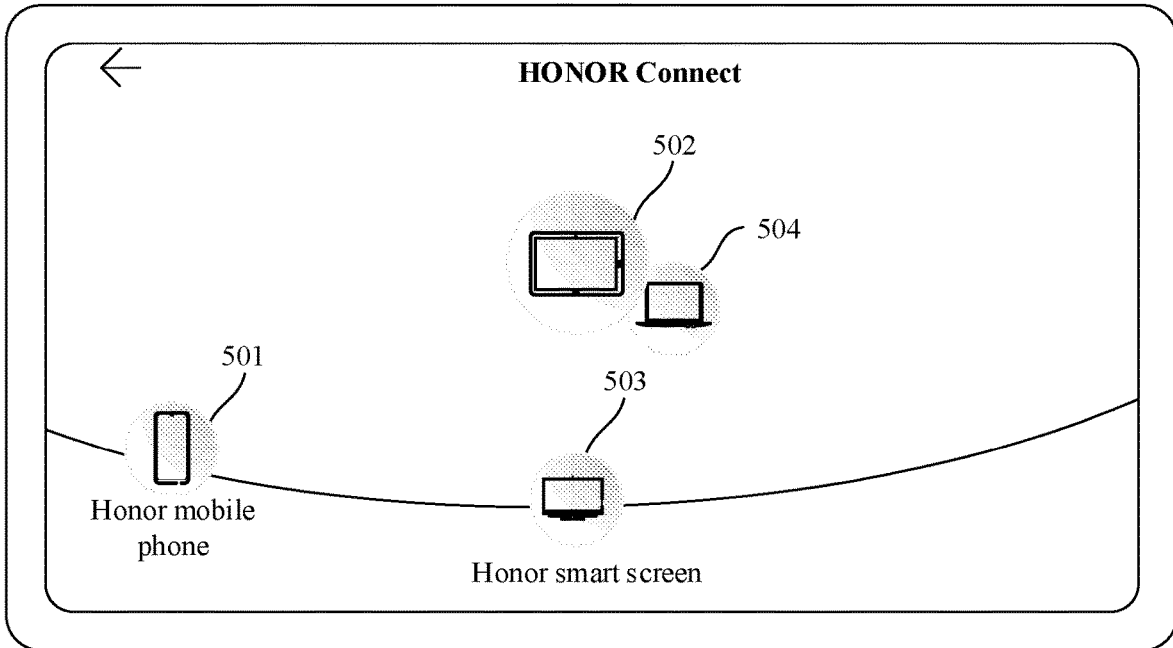
Figure 8C:
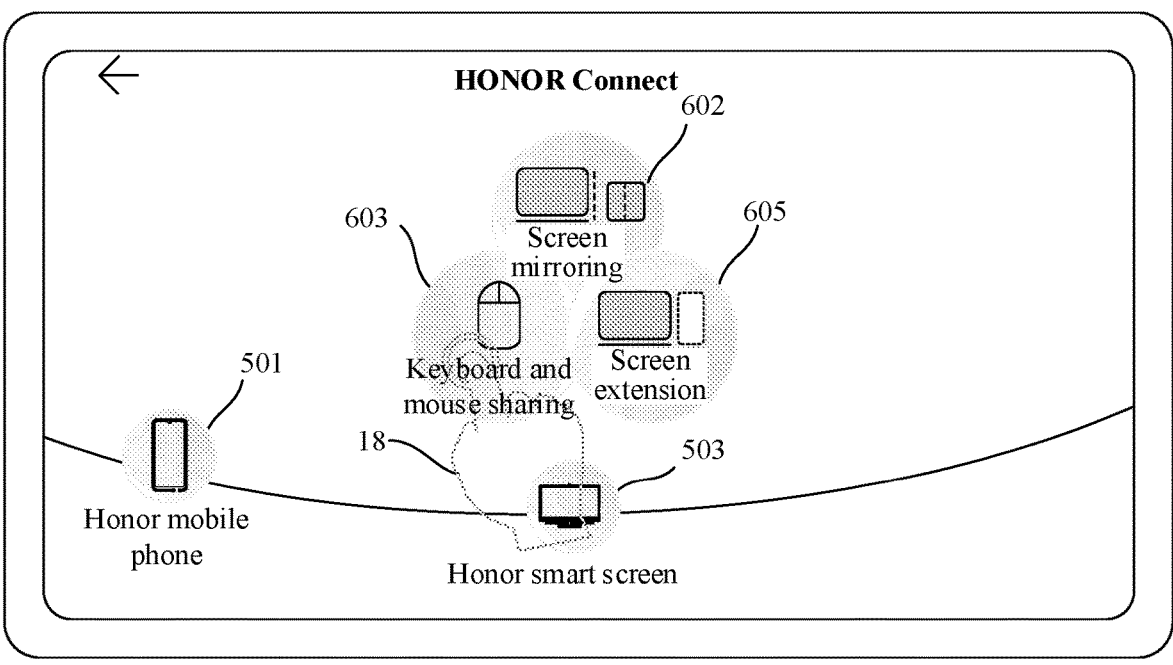

As shown in FIG. 8B and FIG. 8C, when the device identifier of the tablet computer comes into contact with the device identifier of the PC, the tablet computer may determine the PC as a slave device, and display mode identifiers of a plurality of collaboration modes supported by the tablet computer and the PC, for example, a screen mirroring identifier 602, a keyboard and mouse sharing identifier 603, and a screen extension identifier 605.

Next, the user may use a finger to tap 18 a mode identifier of any collaboration mode, for example, the keyboard and mouse sharing identifier 603. The mobile phone may determine the collaboration mode as a target collaboration mode in response to the user's tap 18 operation, and initiate multi-device collaboration to the slave PC based on the target collaboration mode.

Figure 8D:
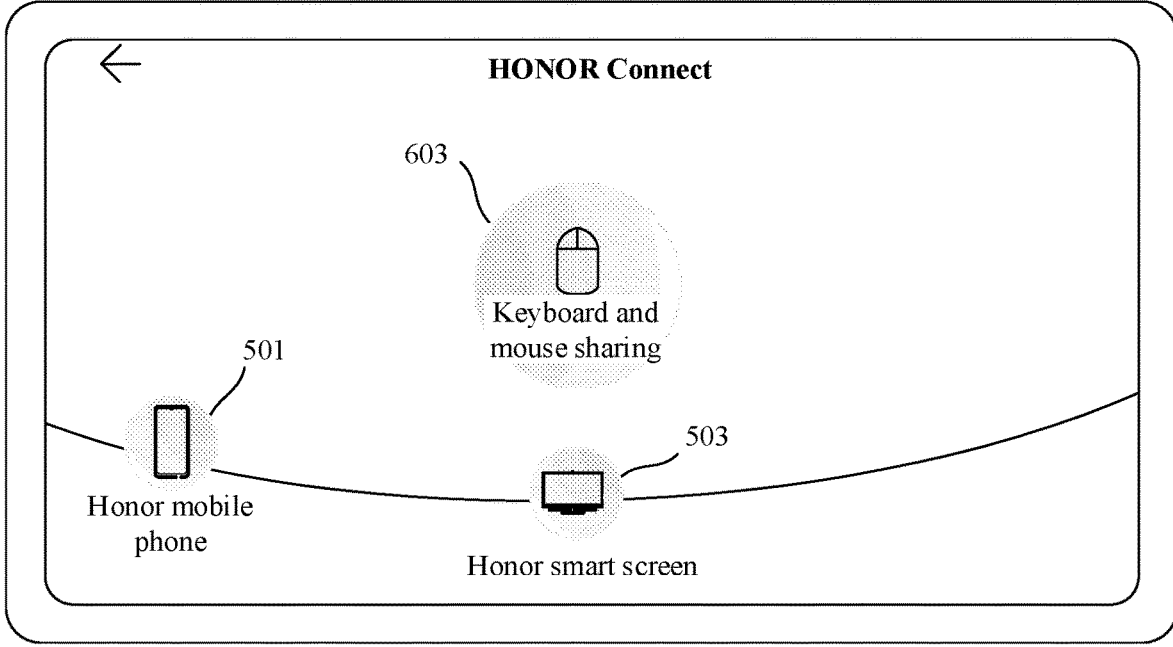

As shown in FIG. 8D, after the tablet computer and the PC establish multi-device collaboration, the tablet computer may hide a mode identifier of a remaining collaboration mode other than the target collaboration mode, and display only the mode identifier of the target collaboration mode, for example, the keyboard and mouse sharing identifier 603.

FIG. 9A-FIG. 9D are a fourth group of example diagrams of interaction of a multi-device collaboration method according to an embodiment of this application.

Figure 9A:
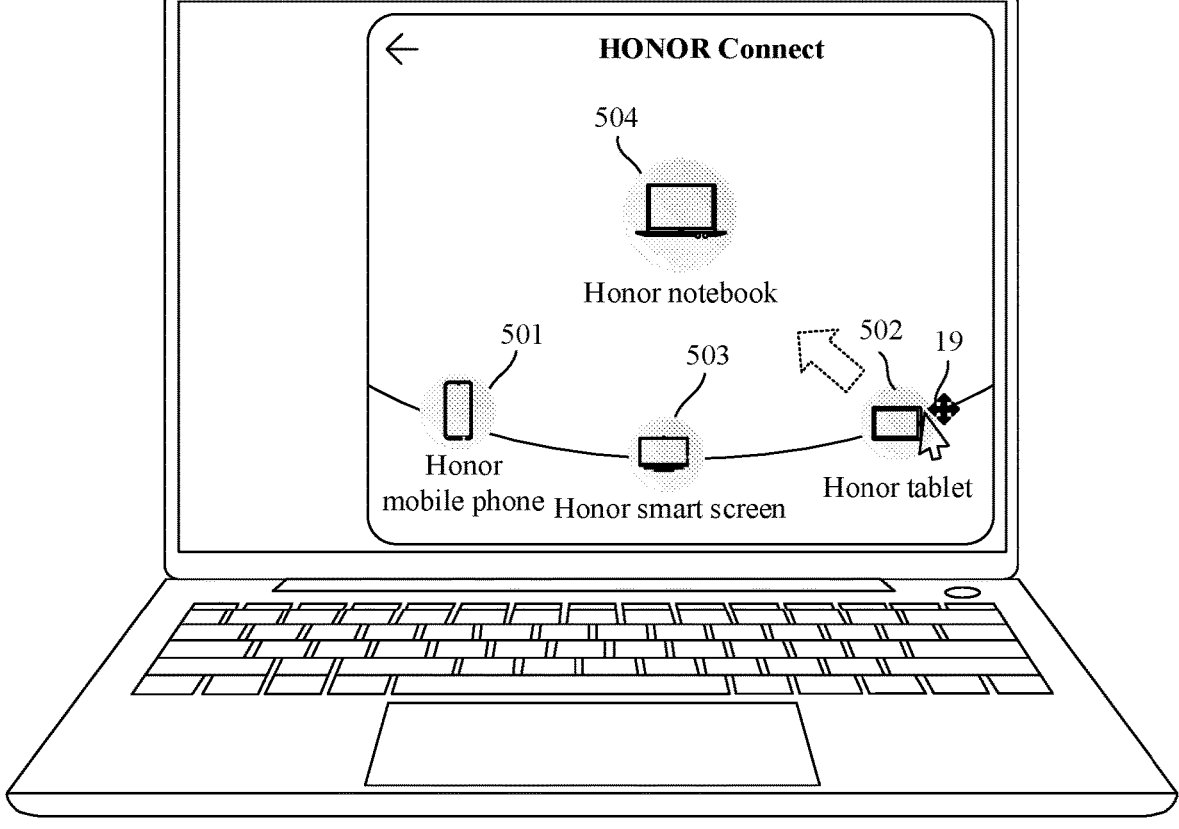
Figure 9B:
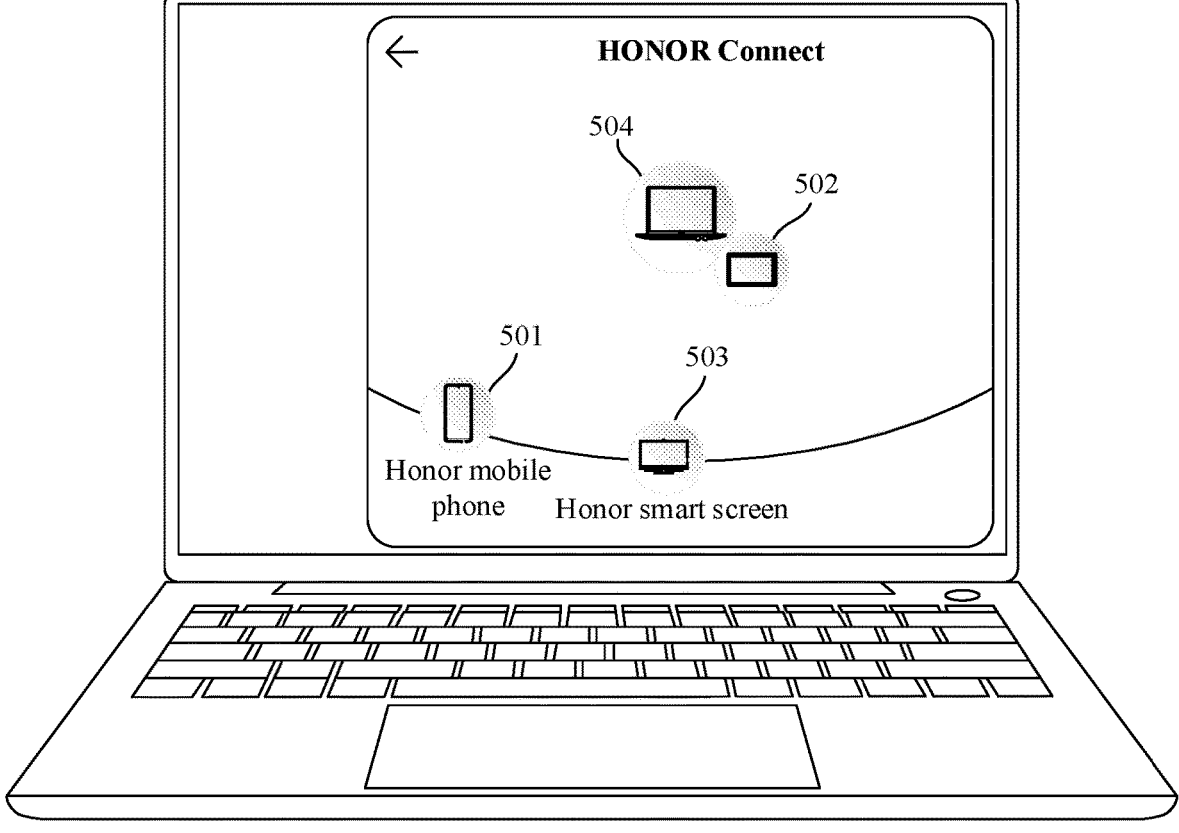
Figure 9C:
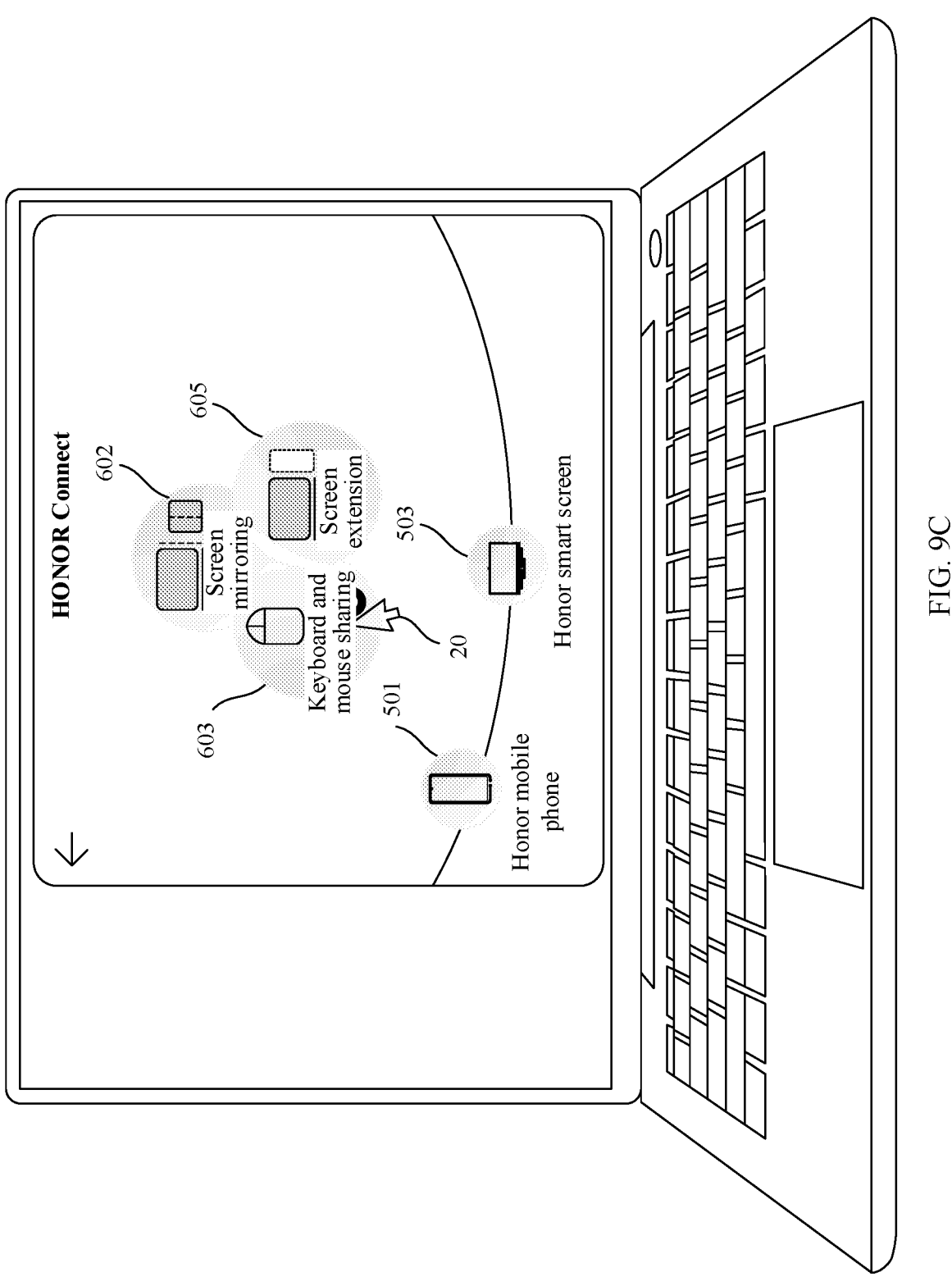

As shown in FIG. 9A, for example, the master device is a PC. When the user wants to establish multi-device collaboration between the PC and a tablet computer, the user may drag 19 a device identifier 502 of the tablet computer in a direction towards a device identifier 504 of the PC by using a drag operation of a mouse. When the device identifier 502 of the PC comes into contact with the device identifier 504 of the tablet computer, the PC may determine the tablet computer as a slave device, and display mode identifiers of a plurality of collaboration modes supported by the PC and the tablet computer, for example, a screen mirroring identifier 602, a keyboard and mouse sharing identifier 603, and a screen extension identifier 605. Next, the user may click 20 a mode identifier of any collaboration mode by using the mouse, for example, the keyboard and mouse sharing identifier 603. The PC may determine the collaboration mode as a target collaboration mode in response to the user's click 20 operation on the mouse, and initiate multi-device collaboration to the tablet computer based on the target collaboration mode.

Figure 9D:
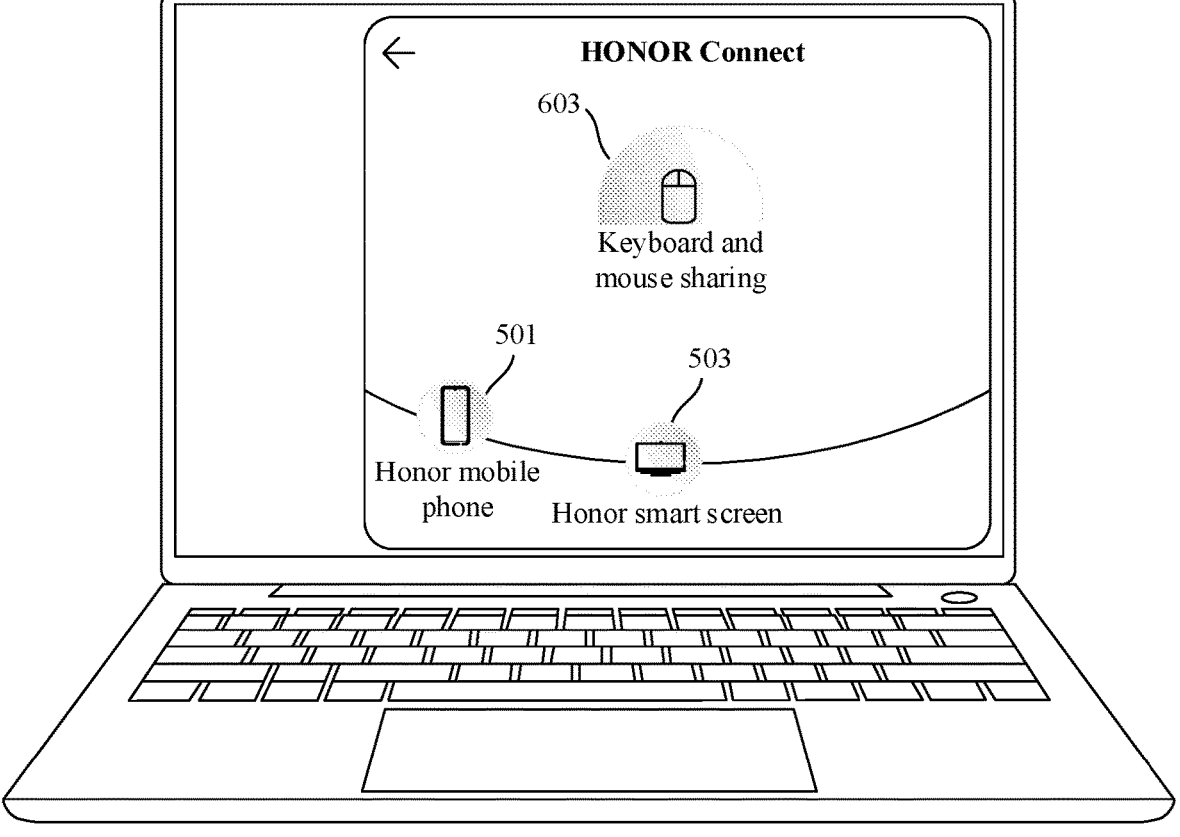

As shown in FIG. 9D, after the PC and the tablet computer establish multi-device collaboration, the PC may hide a mode identifier of a remaining collaboration mode other than the target collaboration mode, and display only the mode identifier of the target collaboration mode, for example, the keyboard and mouse sharing identifier 603.

According to the method provided in this embodiment of this application, when the master device and the slave device support a plurality of collaboration modes, the user may select, on the master device, the target collaboration mode that the user expects to use. In this way, the master device and the slave device can establish multi-device collaboration based on the target collaboration mode, thereby improving user experience.

FIG. 10 is another flowchart of a multi-device collaboration method according to an embodiment of this application.

As shown in FIG. 10, in an implementation, when the master device and the slave device support a plurality of collaboration modes, the method may include the following steps S201-S204.

Step S201: In response to a user operation, establish multi-device collaboration with the slave device based on a preset collaboration mode.

The user operation may include one or more operations performed by a user on a first page. The user operation may be the same as the user operation in step S101. For details, refer to the implementation of step S101. Details are not described herein again. After establishing multi-device collaboration with the slave device based on the preset collaboration mode, the master device may display a mode identifier of the preset collaboration mode on the first page.

The preset collaboration mode may be one of the plurality of collaboration modes supported by the master device and the slave device. For example, if the master device and the slave device establish multi-device collaboration for the first time, the preset collaboration mode may be a default collaboration mode of the two parties. If it is not the first time that the master device and the slave device establish multi-device collaboration, the preset collaboration mode may be a collaboration mode used when the two parties previously established multi-device collaboration, or may be the default collaboration mode of the two parties.

Generally, a default collaboration mode may be preset between the master device and each type of electronic device, and different default collaboration modes may exist between the master device and different types of slave devices. For example, if the master device is a mobile phone and the slave device is a tablet computer, the default collaboration mode may be multi-screen coordination; if the master device is a mobile phone and the slave device is a large-screen device, the default collaboration mode may be screen projection; or if the master device is a notebook computer and the slave device is a notebook computer, the default collaboration mode may be screen mirroring. The master device may pre-store default collaboration modes of the master device and various types of electronic devices. For example, the master device may store the default collaboration modes locally on the master device or on a cloud.

Step S202: Display the plurality of collaboration modes supported by the master device and the slave device.

After establishing multi-device collaboration with the slave device based on the preset collaboration mode, the master device may display, on the first page in response to one or more operations performed by the user on the first page, a mode identifier of at least one collaboration mode supported by the master device and the slave device. A manner of implementing the user operation may vary with a type of the master device. For example, when the master device is an electronic device that supports a touch operation, such as a mobile phone or a tablet computer, the user operation may include a touch operation, such as tap or touch and hold, that is performed by a finger of the user on the mode identifier of the preset collaboration mode on the first page. When the master device is a large-screen device, the user operation may include an operation, such as select or confirm, that is performed by the user on the mode identifier of the preset collaboration mode on the first page by sending an instruction to the large-screen device over a remote control. When the master device is a PC, the user operation may include an operation performed by the user on the first page by using an input device such as a keyboard or a mouse, for example, clicking the mode identifier of the preset collaboration mode by using the mouse.

In specific implementation, the master device may display, on the first page, mode identifiers of all collaboration modes supported by the master device and the slave device, or may display, on the first page, mode identifiers of some collaboration modes supported by the master device and the slave device. For example, the master device displays only a mode identifier of another collaboration mode other than a mode identifier of a currently used collaboration mode.

For example, when the master device is a mobile phone and the slave device is a PC, the collaboration modes supported by the master device and the slave device may include keyboard and mouse sharing, screen mirroring, screen extension, and multi-screen coordination. Therefore, if the master device and the slave device currently establish multi-screen coordination, in response to a tap operation on a multi-screen coordination identifier by a finger of the user, the master device may display mode identifiers of keyboard and mouse sharing, screen mirroring, screen extension, and multi-screen coordination, or may display only the mode identifiers of keyboard and mouse sharing, screen mirroring, and screen extension, but not continue to display the multi-screen coordination identifier.

Step S203: Determine, from the plurality of collaboration modes, a target collaboration mode selected by the user.

Step S203 is similar to step S102. For details, refer to the implementation of step S102. Details are not described herein again.

Step S204: Switch multi-device collaboration between the master device and the slave device from the preset collaboration mode to the target collaboration mode.

After the user selects the target collaboration mode, the master device may initiate multi-device collaboration to the slave device based on the target collaboration mode, to switch the collaboration mode between the master device and the slave device to the target collaboration mode. In specific implementation, the master device may first interrupt the current multi-device collaboration with the slave device, and then initiate multi-device collaboration to the slave device again based on the target collaboration mode, so that the master device and the slave device re-establish multi-device collaboration based on the target collaboration mode. In addition, the master device may directly initiate a switch request to the slave device based on the target collaboration mode in a state in which the current multi-device collaboration with the slave device is not interrupted, so that the master device and the slave device switch to the target collaboration mode. After establishing multi-device collaboration with the slave device based on the target collaboration mode, the master device may display a mode identifier of the target collaboration mode on the first page.

With reference to some examples, the following provides more detailed description on the device collaboration method shown in FIG. 10.

FIG. 11A-FIG. 11E are a fifth group of example diagrams of interaction of a multi-device collaboration method according to an embodiment of this application.

Figure 11A:
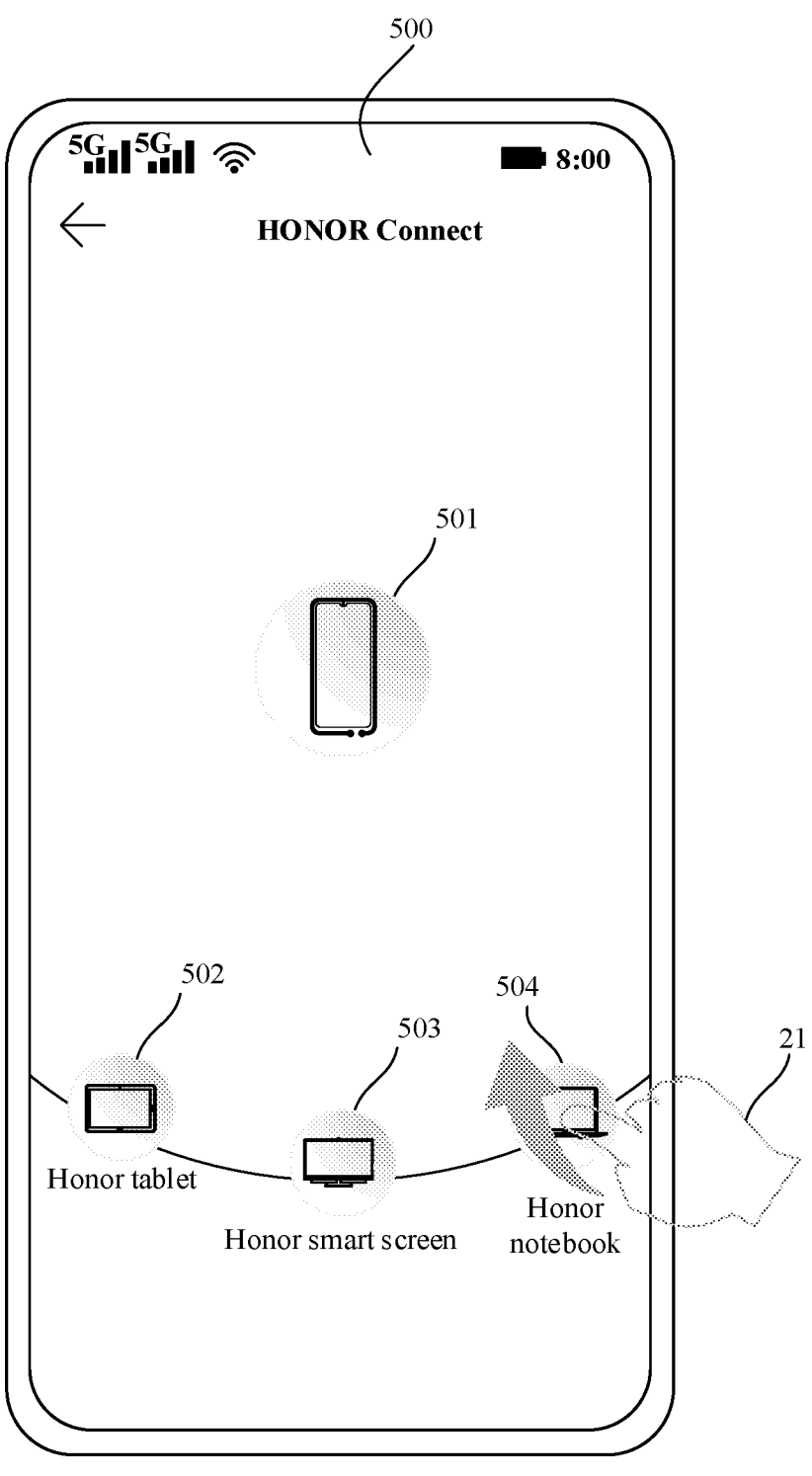

As shown in FIG. 11A, for example, the master device is a mobile phone. When the user wants to establish multi-device collaboration between the mobile phone and a PC, the user may use a finger to drag 21 a device identifier 504 of the PC in a direction towards a device identifier 501 of the mobile phone.

Figure 11B:
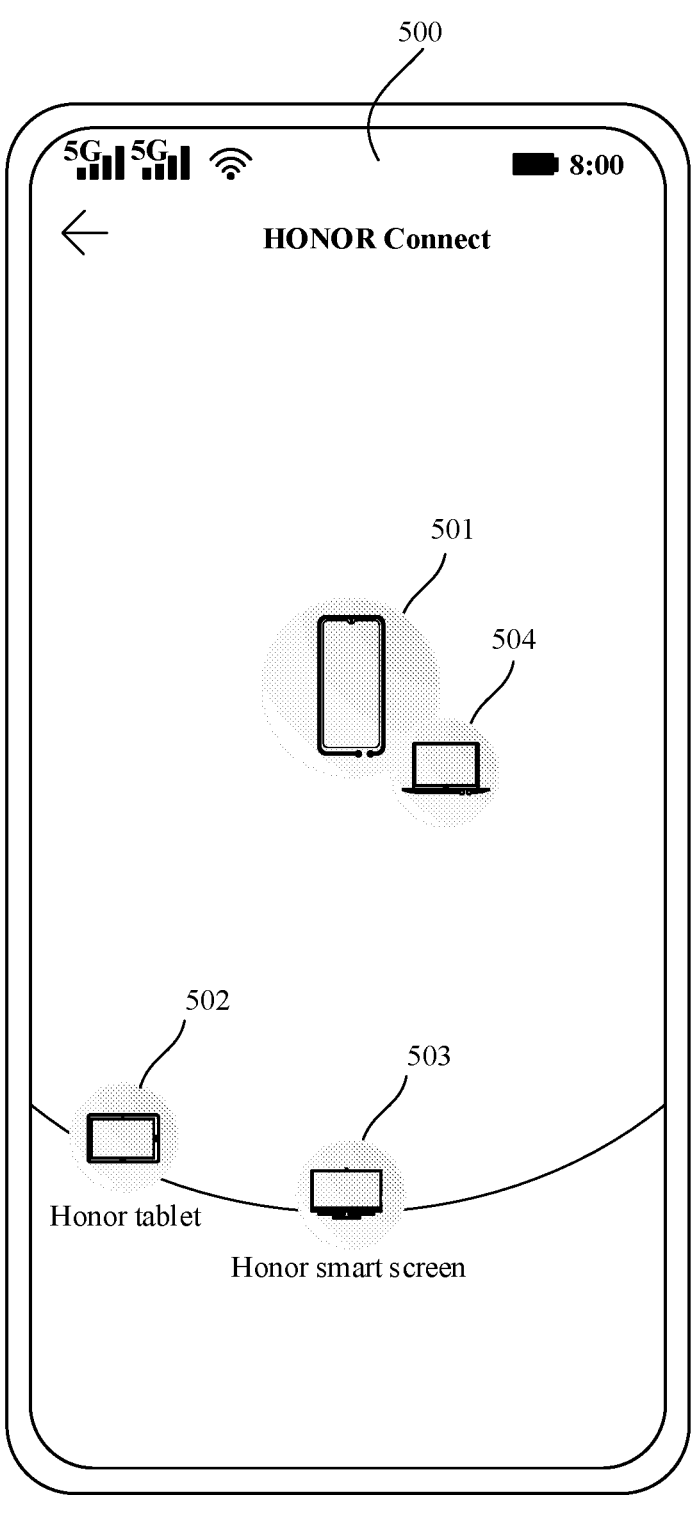
Figure 11C:
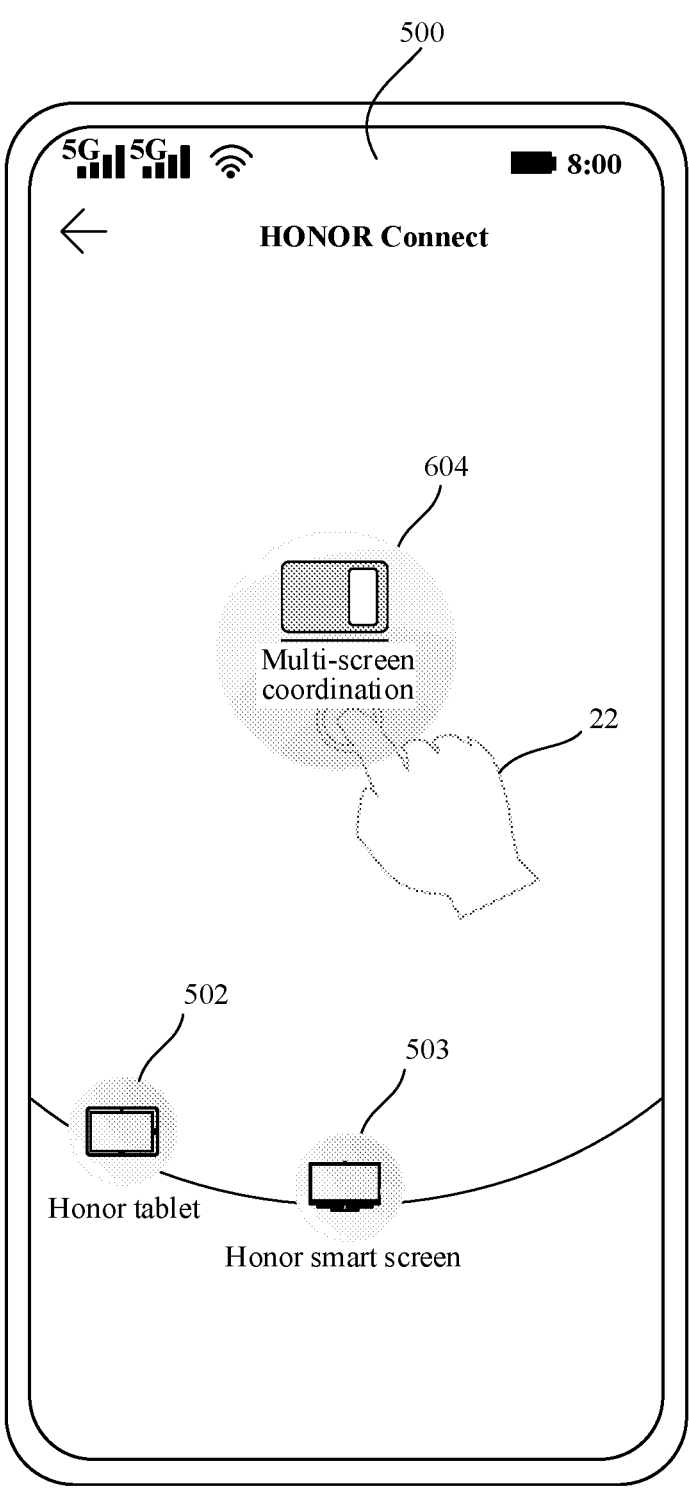

As shown in FIG. 11B and FIG. 11C, when the device identifier 501 of the mobile phone comes into contact with the device identifier 504 of the PC, the mobile phone may establish multi-device collaboration with the PC based on a default collaboration mode, for example, multi-screen coordination, and display a mode identifier of the default collaboration mode, for example, a multi-screen coordination identifier 604.

For example, both a device identifier and a mode identifier are water-bead elements, and the default collaboration mode is multi-screen coordination. When a water-bead element of the mobile phone comes into contact with a water-bead element of the PC, the first page 500 may play an animation effect of combining the two water-bead elements, and a water-bead element of multi-screen coordination is formed by combination.

Figure 11D:
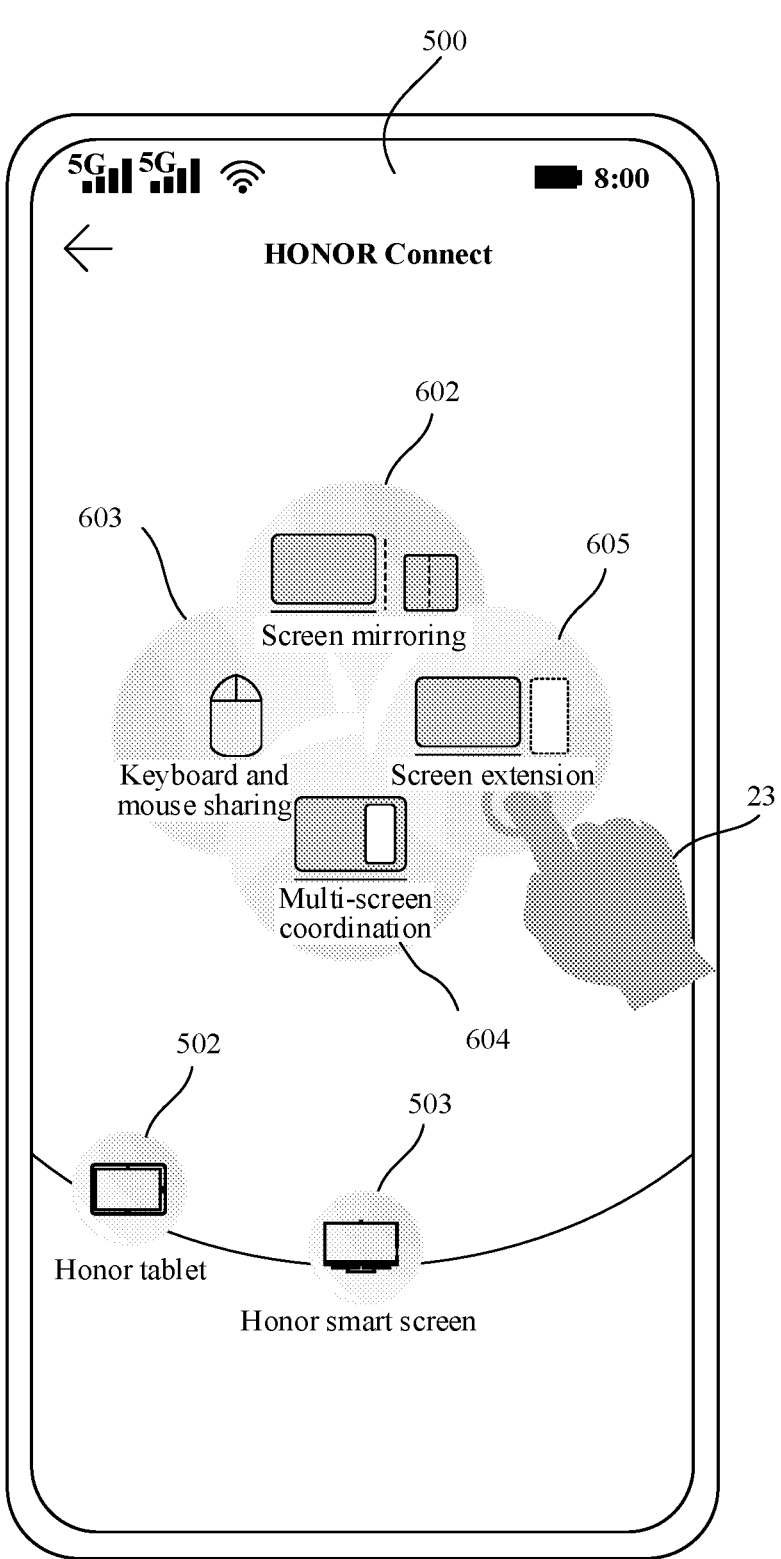

As shown in FIG. 11C and FIG. 11D, next, the user may use a finger to tap 22 the mode identifier of the default collaboration mode, for example, the multi-screen coordination identifier. In response to the tap 22 operation by the finger of the user, the mobile phone may display mode identifiers of a plurality of collaboration modes supported by the mobile phone and the PC, for example, a screen mirroring identifier 602, a keyboard and mouse sharing identifier 603, the multi-screen coordination identifier 604, and a screen extension identifier 605.

For example, both a device identifier and a mode identifier are water-bead elements, and the default collaboration mode is multi-screen coordination. When the user taps a water-bead element of multi-screen coordination, water-bead elements of screen mirroring, keyboard and mouse sharing, and screen extension may be gradually presented on the first page, and may be displayed together with the water-bead element of multi-screen coordination on the first page in a semi-combined state.

Figure 11E:
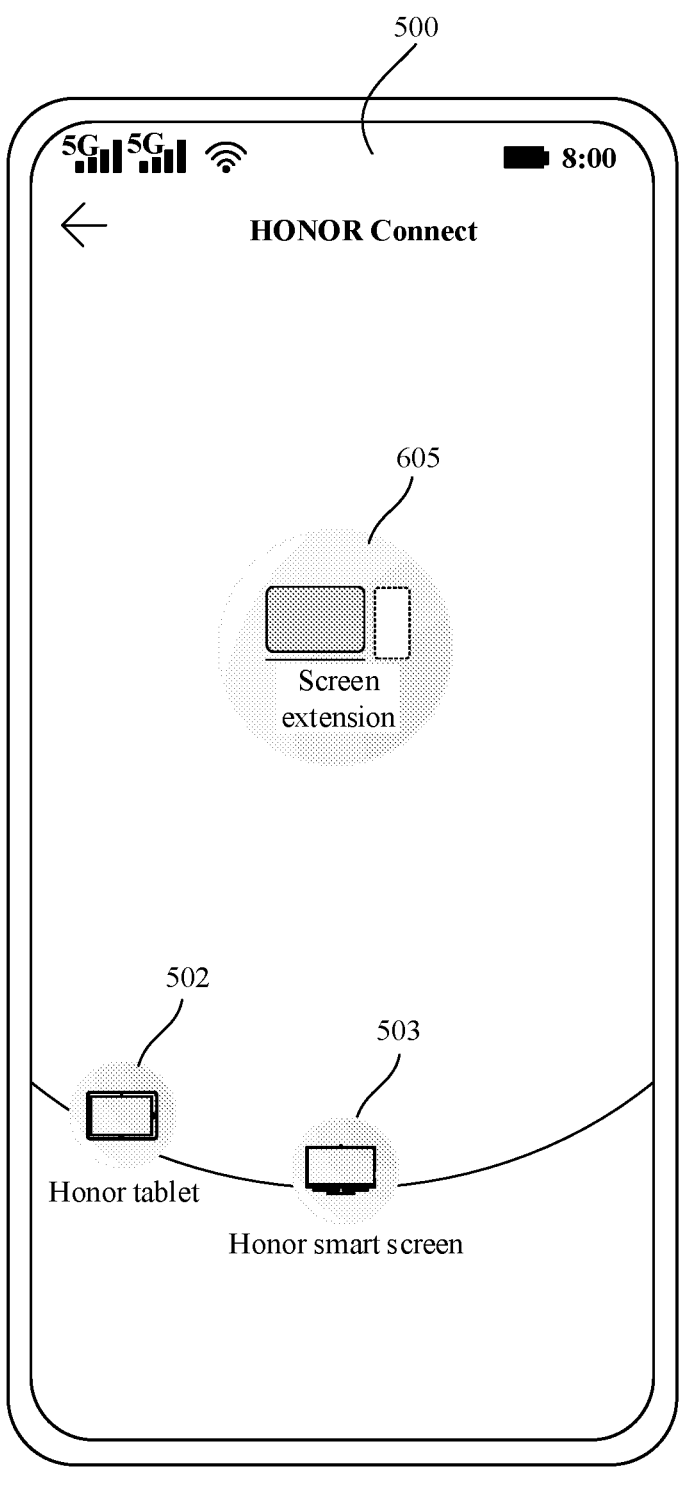

As shown in FIG. 11E, next, the user may use a finger to tap 23 a mode identifier of any collaboration mode, for example, the screen extension identifier 605. The mobile phone may determine the collaboration mode as a target collaboration mode in response to the tap 23 operation by the finger of the user, and initiate multi-device collaboration to the slave PC again based on the target collaboration mode. After the mobile phone and the PC switch to the target collaboration mode, the mobile phone may hide a mode identifier of a remaining collaboration mode other than the target collaboration mode, and display only the mode identifier of the target collaboration mode, for example, the screen extension identifier 605.

For example, both a device identifier and a mode identifier are water-bead elements. When detecting that the user taps a water-bead element of screen extension, the mobile phone determines screen extension as the target collaboration mode, and initiates multi-device collaboration to the PC in this mode. Moreover, the mobile phone may gradually hide water-bead elements of screen mirroring, multi-screen coordination, and keyboard and mouse sharing on the first page, gradually enlarge the water-bead element of screen extension, and finally display the enlarged water-bead element of screen extension at an original position of the water-bead element on the mobile phone.

According to the method provided in this embodiment of this application, when the master device and the slave device support a plurality of collaboration modes, the master device and the slave device may first establish multi-device collaboration based on the preset collaboration mode, and then the user may select, on the master device, the target collaboration mode that the user expects to use. The master device can switch from the preset collaboration mode to the target collaboration mode based on the user's selection, thereby improving user experience.

In some embodiments, after establishing multi-device collaboration with the slave device, the master device may further perform the following steps.

Step S301: Terminate multi-device collaboration with the slave device in response to a user operation.

The user operation may include one or more operations performed by the user on the mode identifier of the target collaboration mode on the first page. A manner of implementing the user operation may vary with a type of the master device. For example, when the master device is an electronic device that supports a touch operation, such as a mobile phone or a tablet computer, the user operation may include a touch and hold operation performed by a finger of the user on the mode identifier of the target collaboration mode. When the master device is a large-screen device, the user operation may include an operation, such as select or confirm, that is performed by the user on the mode identifier of the target collaboration mode by sending an instruction to the large-screen device over a remote control. When the master device is a PC, the user operation may include an operation, such as click or double-click, that is performed by the user on the mode identifier of the target collaboration mode by using an input device such as a keyboard or a mouse.

FIG. 12A-FIG. 12D are a sixth group of example diagrams of interaction of a multi-device collaboration method according to an embodiment of this application.

Figure 12A:
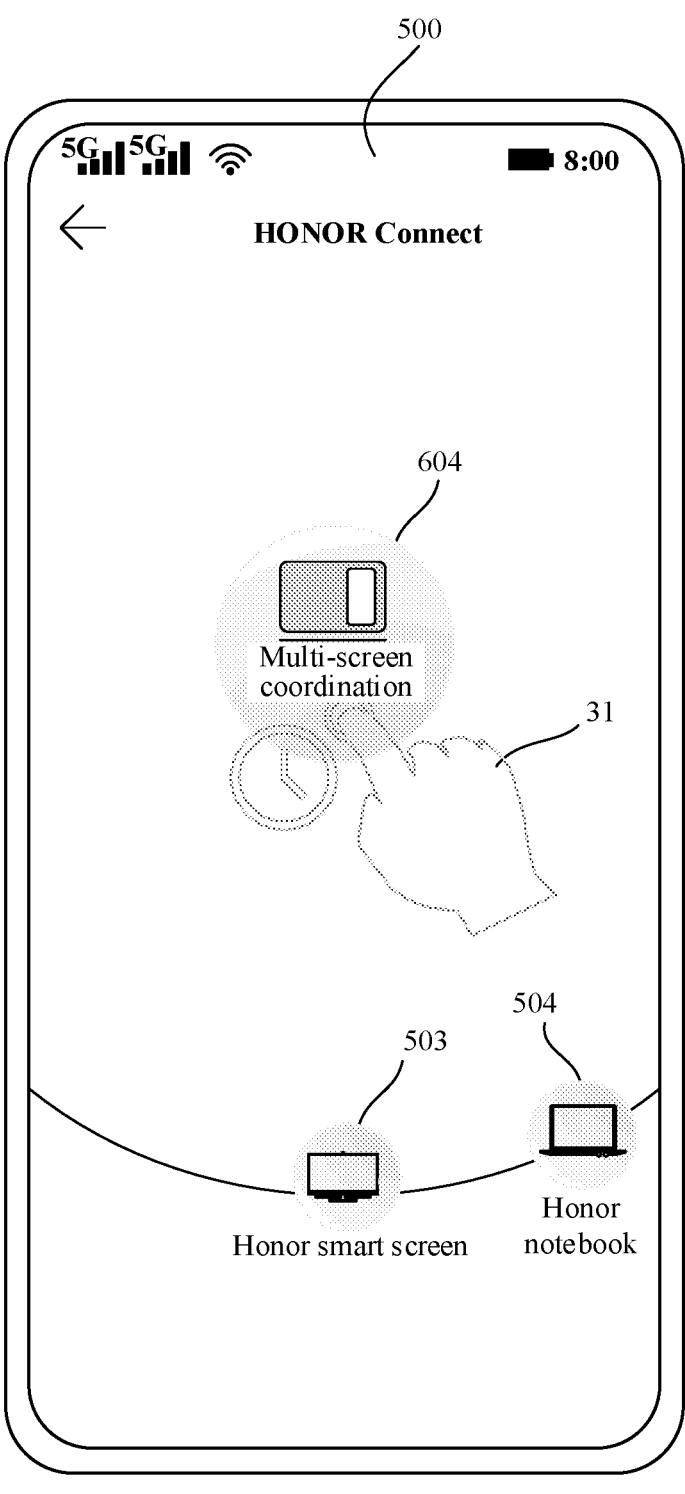
Figure 12B:
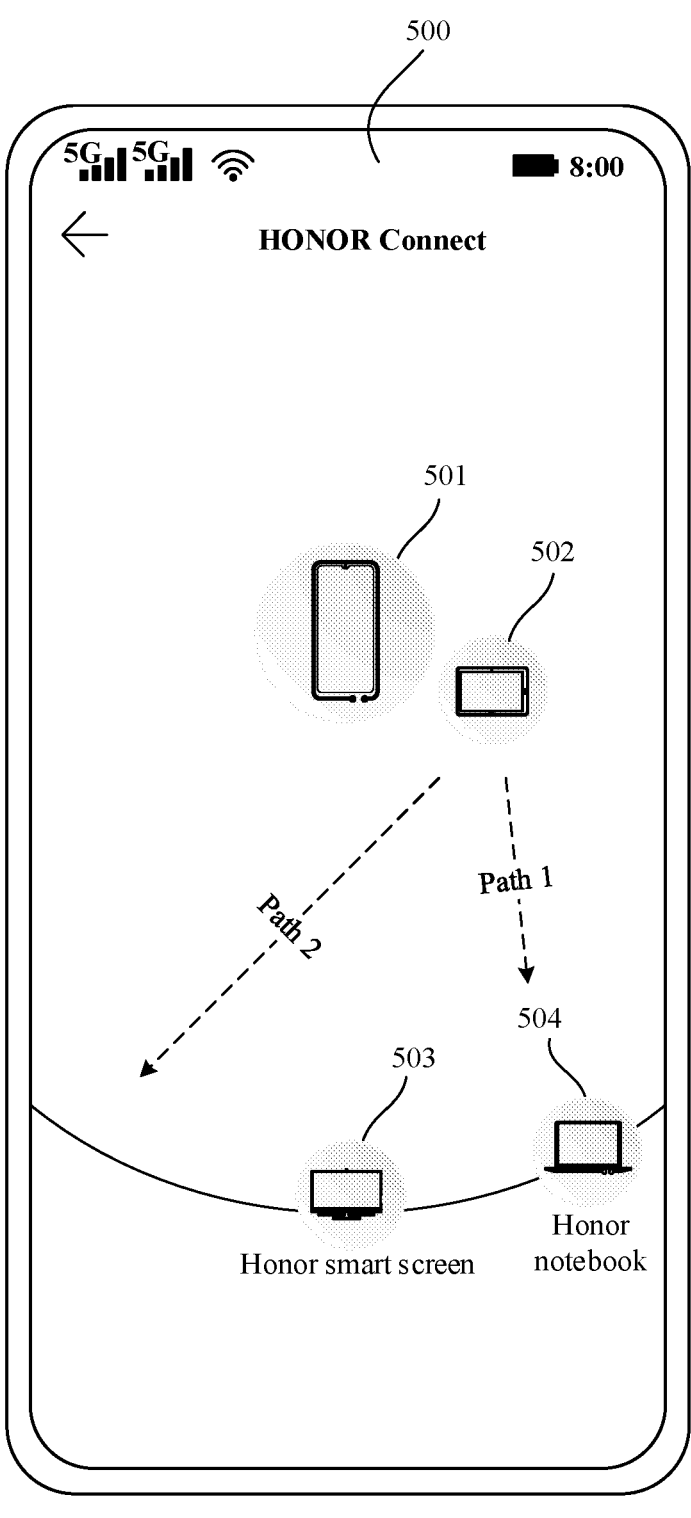
Figure 12C:
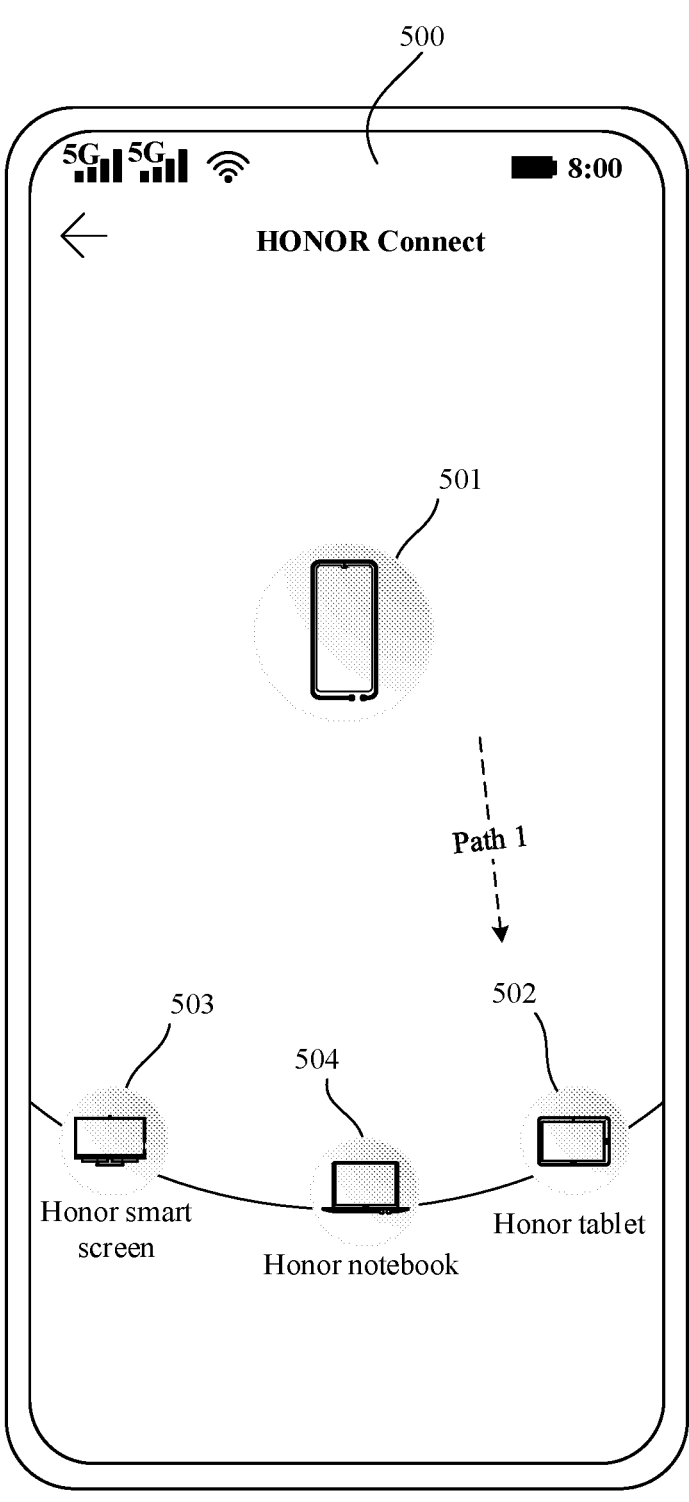

With reference to FIG. 12A-FIG. 12C, the following provides example description on user interaction in step S301 of the multi-device coordination method.

For example, the master device is a mobile phone, the slave device is a tablet computer, and the mobile phone and the tablet computer have established multi-screen coordination.

As shown in FIG. 12A-FIG. 12C, if the user wants to terminate multi-screen coordination, the user may touch and hold 31 a multi-screen coordination identifier 604 on the first page 500. In response to the user's touch and hold 31 operation, the mobile phone terminates multi-screen coordination, and separates the multi-screen coordination identifier into a device identifier 501 of the mobile phone and a device identifier 502 of the tablet computer. Then, the device identifier 502 of the tablet computer is moved to a region in which near field devices are located, so that the first page 500 is restored to a state existing before multi-screen coordination is established.

For example, both a device identifier and a mode identifier are water-bead elements. When the user touches and holds a water-bead element of multi-screen coordination on the first page, the water-bead element of multi-screen coordination may present an effect of being squeezed and separated into two water-bead elements. In the two separated water-bead elements, one becomes a water-bead element of the mobile phone and stays at an original position, while the other becomes a water-bead element of the tablet, and is first moved away from the water-bead element of the mobile phone in a direction (for example, rightward) and then moved to the region in which the near field devices are located.

There may be a plurality of moving paths for moving the device identifier of the tablet (the slave device) to the region in which the near field devices are located.

As shown in FIG. 12B and FIG. 12C, after multi-screen coordination between the mobile phone and the tablet computer is terminated, one moving path (path 1) may be as follows: The device identifier of the tablet computer may be moved, according to a proximity principle, to the region in which the near field devices are located. For example, if the device identifier of the tablet computer is separated from a right side of the multi-screen coordination identifier, the device identifier of the tablet computer may be moved, according to the proximity principle, downward to the region in which the near field devices are located. Moreover, a device identifier of a large-screen device and a device identifier of a notebook computer may be sequentially moved leftward, so that the device identifier of the tablet computer finally stays on a right side of the device identifier of the notebook computer.

Figure 12D:
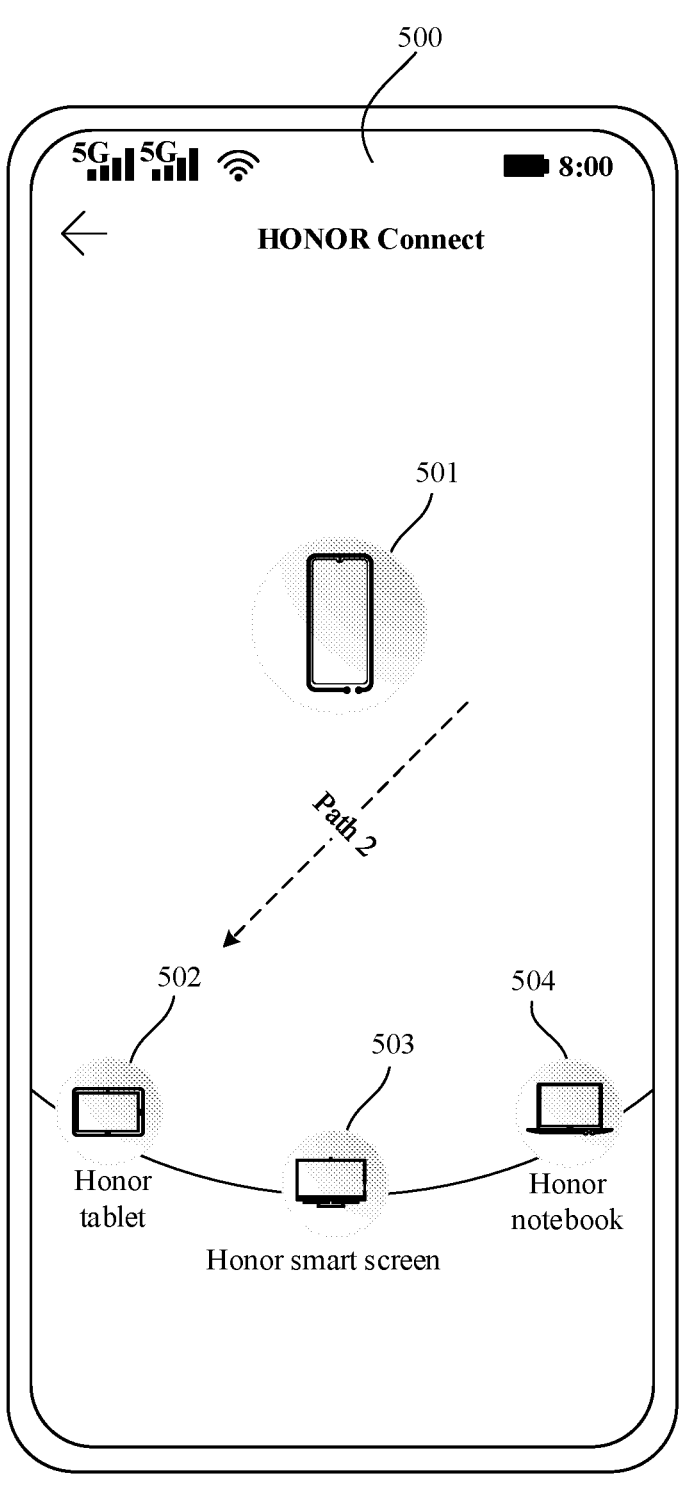

As shown in FIG. 12B and FIG. 12D, another moving path (path 2) may be as follows: The device identifier of the tablet computer is moved to its original position.

According to the method provided in this embodiment of this application, when multi-device collaboration between the master device and the slave device is terminated, the first page is restored to a state existing before the multi-screen coordination is established, so that the user continues to perform another operation on the first page, thereby improving user experience.

The method steps provided in the foregoing embodiments of this application may be preferably applied to a manual collaboration service in multi-device collaboration. For an automatic collaboration service, considering that the automatic collaboration service is usually automatically triggered when a triggering rule is met, an embodiment of this application provides a service switch for the automatic collaboration service, so that the user independently chooses whether to trigger the automatic collaboration service when the triggering rule is met.

FIG. 13A-FIG. 13C are example diagrams of turn-on and turn-off manners of an automatic collaboration service according to an embodiment of this application.

As shown in FIG. 13A and FIG. 13B, in an implementation, the first page 500 may further include a settings button 701 for multi-device collaboration. The settings button 701 may be disposed at any position of the first page 500, for example, an upper right corner of the first page 500.

For example, the master device is a mobile phone. If the user wants to perform settings for multi-device collaboration, the user may tap 41 the settings button 701. The mobile phone may enter a multi-device collaboration settings page 800 in response to the user's tap 41 operation. The settings page 800 may include, for example, a collaboration service list 810 and a near field device list 820.

The collaboration service list 810 may include one or more configurable collaboration service options, for example, Connected Apps, Connected Call, Connected Notification, and Connected Input; and a status of each collaboration service, for example, on or off. The near field device list 820 may include a name and a type of a nearby near field device that has been found by the mobile phone, and a name and a type of a device that has once established multi-device collaboration with the mobile phone.

As shown in FIG. 13B and FIG. 13C, next, if the user wants to set a service status of a specific collaboration service, the user may tap 42 an option of the collaboration service in the collaboration service list 810. The mobile phone may enter a subpage 900 of the collaboration service in response to the user's tap operation. The subpage 900 may include, for example, a switch button 901 of the collaboration service. Next, the user may turn on or turn off the collaboration service by tapping the switch button 901.

For example, when the user taps "Connected Call" in the collaboration service list 810, the mobile phone may enter a subpage 900 of Connected Call. The subpage 900 of Connected Call may include function description information 901 of Connected Call and a switch button 902 of Connected Call. When the switch button 902 is in an on state, if the user taps 43 the switch button 902, the Connected Call service may be turned off. When the switch button 902 is in an off state, if the user taps the switch button 902, the Connected Call service may be turned on.

According to the method provided in this embodiment of this application, the user may directly enter a multi-device collaboration settings page from a multi-device collaboration connection page, to perform control such as turn-on and turn-off on an automatic collaboration service, thereby improving user experience.

In addition, because an automatic collaboration service is usually automatically triggered when a triggering rule is met and the user does not need to actively perform settings, the user sometimes does not know which electronic device is supported by each automatic collaboration service. Therefore, in this embodiment of this application, a demonstration function of an automatic collaboration service is further provided on the first page, to present, to the user on the first page, all electronic devices supported by each automatic collaboration service.

FIG. 14A-FIG. 14D are example diagrams of a demonstration function of an automatic collaboration service according to an embodiment of this application.

Figure 14A:
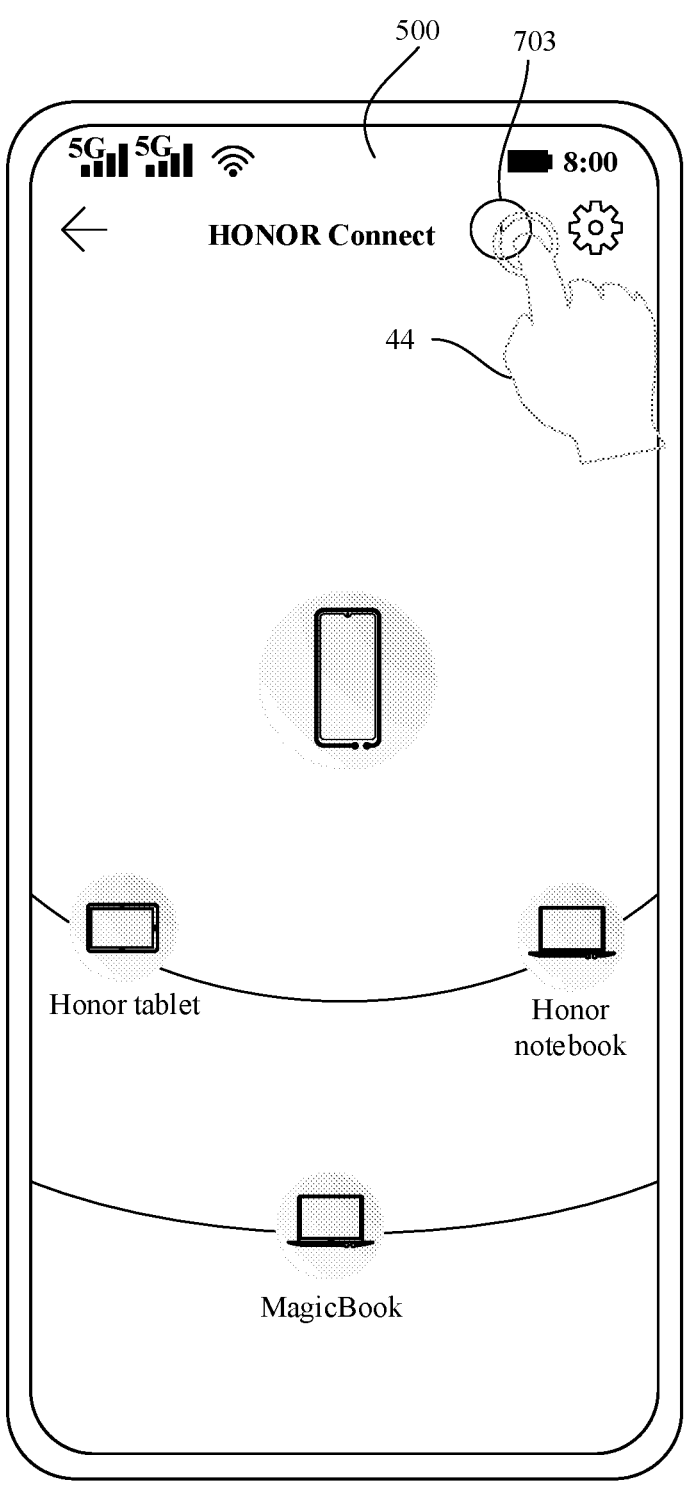
Figure 14B:
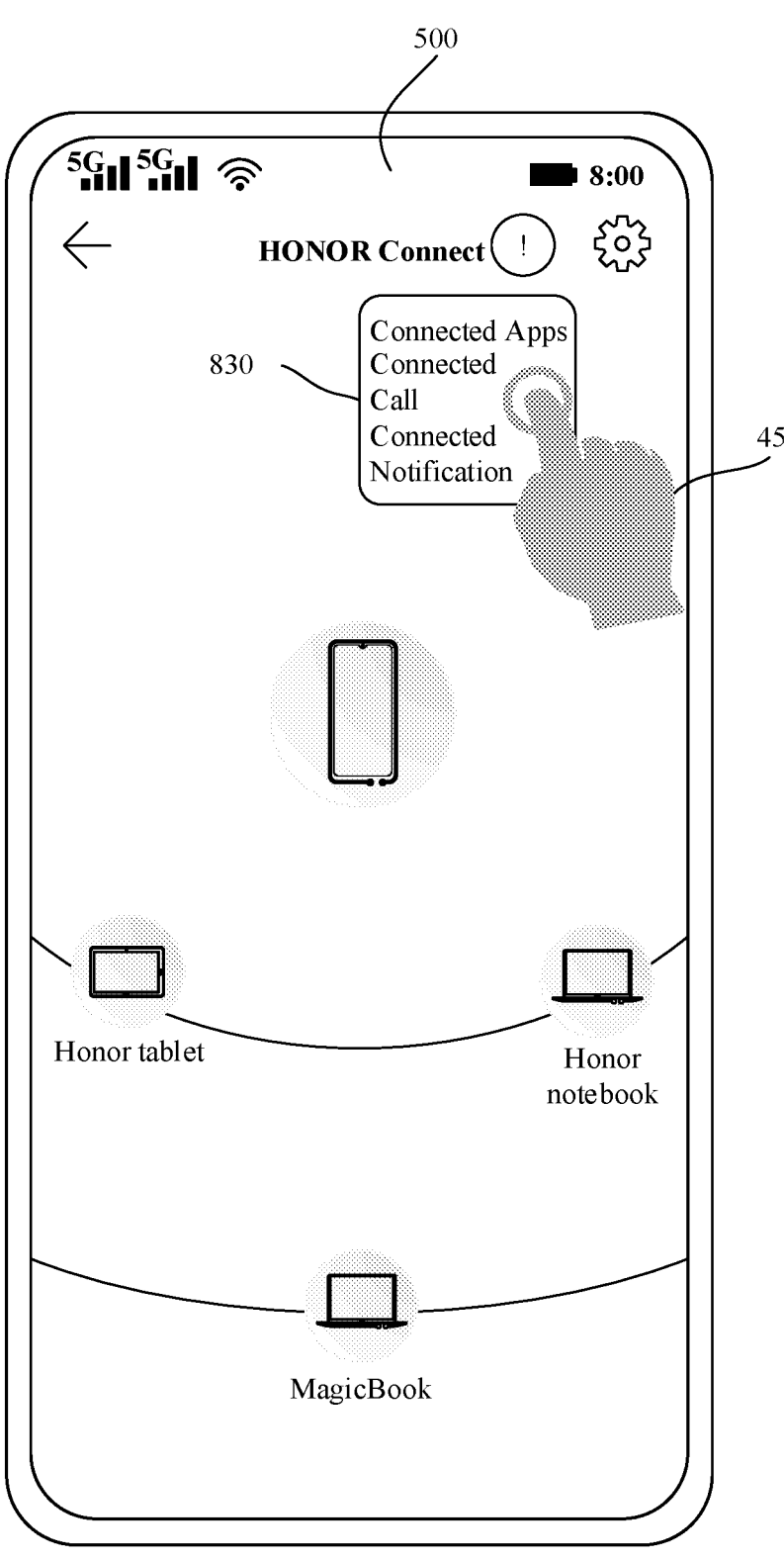

As shown in FIG. 14A and FIG. 14B, in some embodiments, the first page 500 may further include a demonstration function button 703 of an automatic collaboration service. The demonstration function button 703 may be disposed at any position of the first page 500, for example, an upper right corner of the first page 500. For example, the master device is a mobile phone. If the user wants to view an electronic device supported by a specific automatic collaboration service, the user may tap 44 the demonstration function button 703. The mobile phone may display an automatic collaboration service list 830 in response to the user's operation of tapping 44 the demonstration function button 703. The automatic collaboration service list 830 may include an option of one or more automatic collaboration services, for example, Connected Apps, Connected Call, and Connected Notification.

Figure 14C:
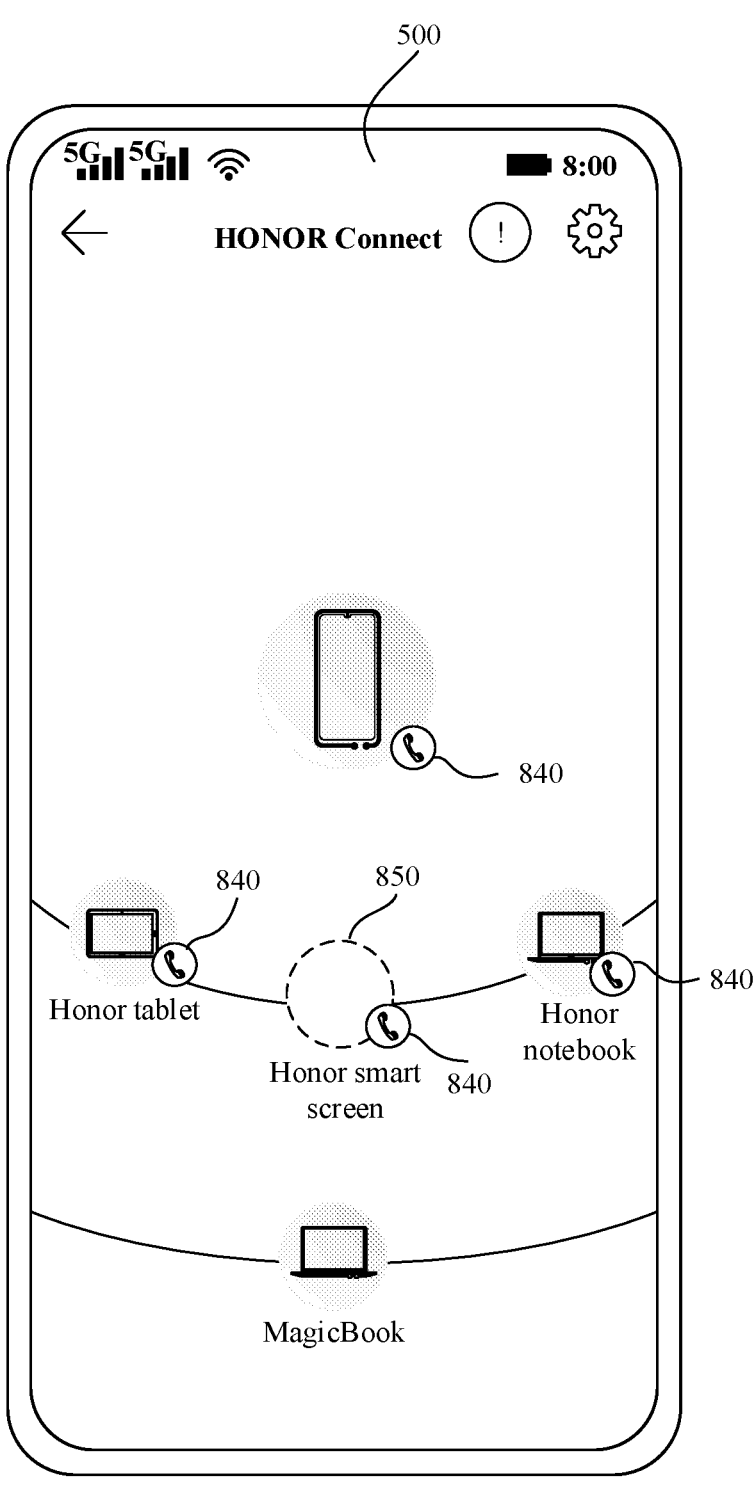

As shown in FIG. 14B and FIG. 14C, next, the user may tap 45, in the automatic collaboration service list 830, an option of an automatic collaboration service that the user wants to view. The mobile phone may display support information of the automatic collaboration service on the first page 500 in response to the user's tap 45 operation. The support information may be, for example, a preset tag added to a device identifier of an electronic device that supports the automatic collaboration service.

For example, when the user taps 45 "Connected Call" in the automatic collaboration service list, the mobile phone may add a corner label 840 of a headset pattern to device identifiers, on the first page 500, of all electronic devices that support Connected Call. In this way, the user can intuitively learn, by using the corner label 840 of the headset pattern, which electronic device supports the Connected Call service.

In addition, if the automatic collaboration service viewed by the user further supports another electronic device, but a device identifier of the electronic device is not displayed on the first page 500, the mobile phone may display the device identifier of the electronic device on the first page 500 in a form of a dashed-line box 850 and a device name or in another form, and add the corner label 840 of the headset pattern to the device identifier.

Figure 14D:
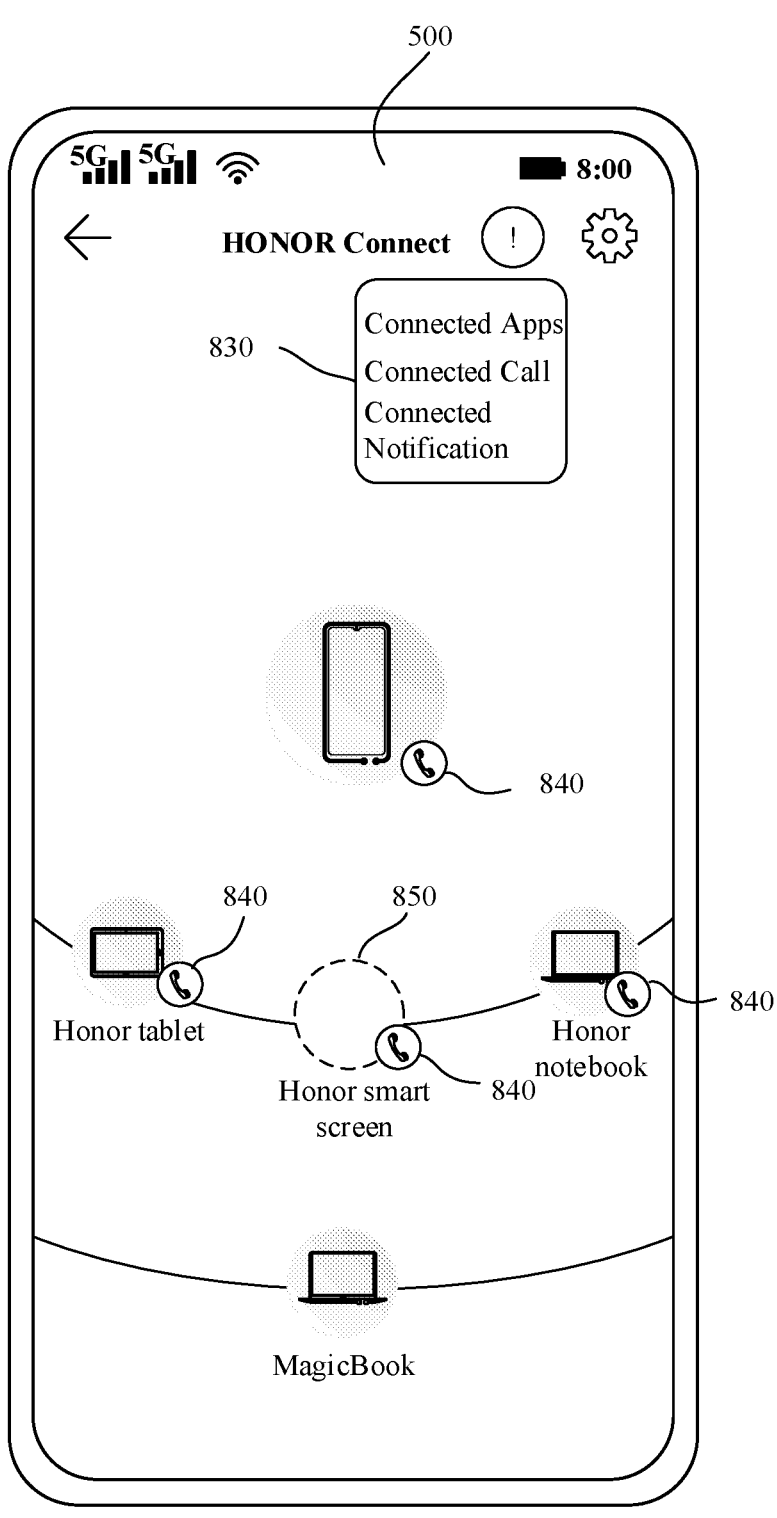

In an implementation, as shown in FIG. 14D, when displaying the automatic collaboration service list 830, the mobile phone may further directly display, on the first page 500, support information of one automatic collaboration service (for example, Connected Call) therein. When the user taps a name of another automatic collaboration service (for example, Connected Notification) in the automatic collaboration service list 500, the mobile phone switches to display support information of the another automatic collaboration service (for example, Connected Notification).

According to the method provided in this embodiment of this application, support information of an automatic collaboration service can be directly displayed on the multi-device collaboration connection page, thereby improving user experience.

When using multi-device collaboration, the user may encounter the following scenario 1: In a state in which the master device has established multi-device collaboration with one near field device, the user wants to connect another near field device to the multi-device collaboration.

For scenario 1, the multi-device collaboration method may include the following step: in a state in which the master device has established first multi-device collaboration with a first near field device, connecting a second near field device to the first multi-device collaboration in response to a user operation, where the first multi-device collaboration is multi-device collaboration established based on a first collaboration mode, and the second near field device is a near field device that supports the first collaboration mode.

The first collaboration mode may be a collaboration mode that supports simultaneous connection of three electronic devices, for example, Connected Input.

FIG. 15A and FIG. 15B are a seventh group of example diagrams of interaction of a multi-device collaboration method according to an embodiment of this application.

As shown in FIG. 15A and FIG. 15B, for example, the master device is a mobile phone, the first near field device is a PC, and the second near field device is a tablet computer. When Connected Input is established between the mobile phone and the PC, the first page 500 may display a device identifier 501 of the mobile phone and a device identifier 504 of the PC in a combined state. In this state, if the user drags 51 a device identifier 502 of the tablet computer in a direction towards the device identifier 501 of the mobile phone, and the device identifier 502 of the tablet computer comes into contact with the device identifier 501 of the mobile phone, the mobile phone may also connect the tablet computer to Connected Input when the tablet computer also supports Connected Input. In this way, the mobile phone, the PC, and the tablet computer can all be connected to Connected Input, thereby implementing collaboration of three devices. When the tablet computer is connected to Connected Input, the first page 500 may display the device identifiers of the mobile phone, the PC, and the tablet computer in a combined state, so that the user can intuitively learn a current state of collaboration of the three devices.

For scenario 1, the multi-device collaboration method may further include the following steps: in a state in which the master device has established second multi-device collaboration with a first near field device, terminating the second multi-device collaboration, and establishing multi-device collaboration between the master device and the second near field device in response to a user operation, where the second multi-device collaboration is multi-device collaboration established based on a second collaboration mode.

The second collaboration mode may be a collaboration mode that does not support simultaneous connection of three electronic devices, for example, multi-screen coordination.

FIG. 16A, FIG. 16B, and FIG. 16C are an eighth group of example diagrams of interaction of a multi-device collaboration method according to an embodiment of this application.

As shown in FIG. 16A, FIG. 16B, and FIG. 16C, for example, the master device is a mobile phone, the first near field device is a PC, and the second near field device is a tablet computer. When multi-screen coordination is established between the mobile phone and the PC, the first page may display a device identifier 501 of the mobile phone and a device identifier 504 of the PC in a combined state. In this state, if the user drags 52 a device identifier 502 of the tablet computer in a direction towards the device identifier 501 of the mobile phone, and the device identifier 502 of the tablet computer comes into contact with the device identifier 501 of the mobile phone, the mobile phone may display a pop-up window 520 on the first page 500. The pop-up window 520 may ask the user whether to perform a device switch, and may include two option buttons: "Yes" and "No". If the user taps 53 "Yes", multi-screen coordination between the mobile phone and the PC can be terminated, and multi-screen coordination between the mobile phone and the tablet computer can be established. If the user taps "No", a state of multi-screen coordination between the mobile phone and the PC can be maintained.

In an implementation, the pop-up window 520 may further include a do-not-disturb option 521. The do-not-disturb option 521 may include prompt information used to guide the user in selecting and deselecting the do-not-disturb option 521, for example, "Don't ask again". If the user selects the do-not-disturb option, the master device does not display the pop-up window 520 for a same scenario afterwards, but directly responds to a user operation. For example, if the user drags 52 the device identifier 502 of the tablet computer in a direction towards the device identifier 501 of the mobile phone, and the device identifier 502 of the tablet computer comes into contact with the device identifier 501 of the mobile phone, the mobile phone may directly terminate the multi-screen coordination between the mobile phone and the PC, and establish multi-screen coordination between the mobile phone and the tablet computer.

When using multi-device collaboration, the user may encounter the following scenario 2: In a state in which the master device has established multi-device collaboration with one off-ring device (another device other than a near field device), the user wants to establish multi-device collaboration between the master device and one near field device.

For scenario 2, the multi-device collaboration method may include the following steps: in a state in which the master device has established multi-device collaboration with an off-ring device, terminating the established multi-device collaboration between the master device and the off-ring device, and establishing multi-device collaboration between the master device and a third near field device in response to a user operation.

FIG. 17A, FIG. 17B, and FIG. 17C are a ninth group of example diagrams of interaction of a multi-device collaboration method according to an embodiment of this application.

As shown in FIG. 17A, FIG. 17B, and FIG. 17C, for example, the master device is a mobile phone, the third near field device is a PC, and the off-ring device is a large-screen device. If the large-screen device is an off-ring device, even if the mobile phone has established multi-device collaboration, for example, screen projection, with the large-screen device, the first page 500 does not display a screen projection identifier, but continues to display a device identifier 501 of the mobile phone. Therefore, the user considers that the mobile phone is not connected to the multi-device collaboration. In this state, if the user drags 54 a device identifier 502 of a tablet computer in a direction towards the device identifier 501 of the mobile phone, and the device identifier 502 of the tablet computer comes into contact with the device identifier of the mobile phone, the mobile phone may display a pop-up window 530 on the first page 500. The pop-up window 530 may ask the user whether to perform a device switch, and may include two option buttons: "Yes" and "No". If the user taps 55 "Yes", the screen projection between the mobile phone and the large-screen device can be terminated, and multi-screen coordination between the mobile phone and the tablet computer can be established. If the user taps "No", a state of screen projection between the mobile phone and the large-screen device can continue to be maintained.

In an implementation, the pop-up window 530 may further include a do-not-disturb option 521. For specific content of the do-not-disturb option 521, refer to scenario 1 and FIG. 16A, FIG. 16B, and FIG. 16C. Details are not described herein again.

When using multi-device collaboration, the user may encounter the following scenario 3: In a state in which a near field device has established multi-device collaboration with an off-ring device, the user wants to establish multi-device collaboration between the master device and the near field device; or in a state in which one near field device has established multi-device collaboration with another near field device, the user wants to establish multi-device collaboration between the master device and one of the near field devices.

For scenario 3, the multi-device collaboration method may include the following steps: in a state in which a fourth near field device has established multi-device collaboration with an off-ring device or a fifth near field device, terminating the established multi-device collaboration between the fourth near field device and the off-ring device or the fifth near field device, and establishing multi-device collaboration between the master device and the fourth near field device in response to a user operation.

FIG. 18A, FIG. 18B, FIG. 18C, and FIG. 18D are a tenth group of example diagrams of interaction of a multi-device collaboration method according to an embodiment of this application.

As shown in FIG. 18A, FIG. 18B, FIG. 18C, and FIG. 18D, for example, the master device is a mobile phone, the fourth near field device is a tablet computer, the fifth near field device is a PC, and the off-ring device is a large-screen device. In a state in which the tablet computer has established multi-device collaboration with the PC or the large-screen device, if the user drags 56 a device 502 identifier of the tablet computer in a direction towards a device identifier 501 of the mobile phone, and the device 502 identifier of the tablet computer comes into contact with the device identifier 501 of the mobile phone, the mobile phone may display a pop-up window 540 on the first page. The pop-up window 540 may ask the user whether to perform a device switch, and may include two option buttons: "Yes" and "No". If the user taps 57 "Yes", multi-device collaboration between the tablet computer and the PC or the large-screen device can be terminated, and multi-screen coordination between the mobile phone and the tablet computer can be established. If the user selects "No", original multi-device collaboration of the tablet computer can be maintained.

In an implementation, the pop-up window 540 may further include a do-not-disturb option 521. For specific content of the do-not-disturb option 521, refer to scenario 1 and FIG. 16A, FIG. 16B, and FIG. 16C. Details are not described herein again.

When using multi-device collaboration, the user may encounter the following scenario 4: Each of the master device and a near field device has established multi-device collaboration with another device, and in this state, the user wants to establish multi-device collaboration between the master device and the near field device.

For scenario 4, the multi-device collaboration method may include the following steps: in a state in which each of the master device and a sixth near field device has established multi-device collaboration with another device, terminating the multi-device collaboration established by each of the master device and the sixth near field device, and establishing multi-device collaboration between the master device and the sixth near field device in response to a user operation.

FIG. 19A, FIG. 19B, FIG. 19C, FIG. 19D, FIG. 19E, and FIG. 19F are an eleventh group of example diagrams of interaction of a multi-device collaboration method according to an embodiment of this application.

As shown in FIG. 19A, FIG. 19B, FIG. 19C, FIG. 19D, FIG. 19E, and FIG. 19F, for example, the master device is a mobile phone, the sixth near field device is a tablet computer, and the off-ring device is a large-screen device. Scenario 4 may include at least the following several states:

State 1: The tablet computer and another near field device (for example, PC1) have established multi-device collaboration (for example, screen mirroring), and the mobile phone and another near field device (for example, large-screen device 1) have established multi-device collaboration (for example, screen projection).

State 2: The tablet computer and an off-ring device (for example, large-screen device 2) have established multi-device collaboration (for example, screen projection), and the mobile phone and another near field device (for example, large-screen device 1) have established multi-device collaboration (for example, screen projection).

State 3: The tablet computer and another near field device (for example, PC1) have established multi-device collaboration (for example, screen mirroring), and the mobile phone and an off-field device (for example, large-screen device 2) have established multi-device collaboration (for example, screen projection).

State 4: The tablet computer and an off-field device (for example, large-screen device 2) have established multi-device collaboration (for example, screen projection), and the mobile phone and an off-field device (for example, PC2) have established multi-device collaboration (for example, multi-screen coordination).

In the foregoing states, if the user drags 58 a device identifier 502 of the tablet computer in a direction towards a device identifier 501 of the mobile phone, and the device identifier 502 of the tablet computer comes into contact with the device identifier 501 of the mobile phone, the mobile phone may display a pop-up window 550 on the first page 500. The pop-up window 550 may ask the user whether to perform a device switch, and may include two option buttons: "Yes" and "No". If the user taps 59 "Yes", the multi-device collaboration established by each of the mobile phone and the tablet computer is terminated, and multi-screen coordination between the mobile phone and the tablet computer is established. If the user selects "No", the mobile phone and the tablet computer can separately maintain respective original multi-device collaboration.

In an implementation, the pop-up window 550 may further include a do-not-disturb option 521. For specific content of the do-not-disturb option 521, refer to scenario 1 and FIG. 16A, FIG. 16B, and FIG. 16C. Details are not described herein again.

According to the method provided in this embodiment of this application, when the master device and/or the slave device have/has established collaboration, the user may directly add, on the first page, a device that is to participate in multi-device collaboration or switch a device participating in multi-device collaboration, thereby improving user experience.

In scenario 1 to scenario 4 described above, the first page may use different colors of a device identifier to indicate states of multi-device collaboration establishment by a master device or a near field device.

For example, if the master device does not establish multi-device collaboration with an off-ring device, the device identifier of the master device may be in a first preset color; or if the master device has established multi-device collaboration with an off-ring device, the device identifier of the master device may be in a second preset color.

For example, if multi-device collaboration is not established between two near field devices, device identifiers of the two near field devices may be in the first preset color; or if multi-device collaboration has been established between two near field devices, device identifiers of the two near field devices may be in the second preset color.

For example, if multi-device collaboration is not established between a near field device and an off-ring device, a device identifier of the near field device may be in the first preset color; or if multi-device collaboration has been established between a near field device and an off-ring device, a device identifier of the near field device may be in the second preset color.

FIG. 20A, FIG. 20B, and FIG. 20C are a first example diagram of a color of a device identifier according to an embodiment of this application.

As shown in FIG. 20A, FIG. 20B, and FIG. 20C, for scenario 1, based on the examples in FIG. 15A, FIG. 15B, FIG. 16A, FIG. 16B, and FIG. 16C, when the mobile phone and the PC have established Connected Input or multi-screen coordination, the device identifier 501 of the mobile phone and the device identifier 504 of the PC may be displayed in the second preset color, and the device identifier 502 of the tablet computer and the device identifier 503 of the large-screen device may be displayed in the first preset color. When the tablet computer is also connected to Connected Input or multi-screen coordination, the device identifier 502 of the tablet computer may be changed from the first preset color to the second preset color. When the PC terminates the multi-screen coordination, the device identifier 504 of the PC may be changed from the second preset color to the first preset color.

FIG. 21 is a second example diagram of a color of a device identifier according to an embodiment of this application.

As shown in FIG. 21, for scenario 2, based on the example in FIG. 17A, FIG. 17B, and FIG. 17C, when the mobile phone and the off-ring large-screen device have established screen projection, the device identifier 501 of the mobile phone may be displayed in the second preset color, and the device identifier 502 of the tablet computer, the device identifier 504 of the PC, and the device identifier 503 of the near-field large-screen device may be displayed in the first preset color. When the tablet computer and the mobile phone have established multi-screen coordination, the device identifier 502 of the tablet computer may be changed from the first preset color to the second preset color.

FIG. 22 is a third example diagram of a color of a device identifier according to an embodiment of this application.

As shown in FIG. 22, for scenario 3, based on the example in FIG. 18A, FIG. 18B, FIG. 18C, and FIG. 18D, when the tablet computer and the PC have established screen mirroring, the device identifier 502 of the tablet computer and the device identifier 504 of the PC may be displayed in the second preset color, and the device identifier 501 of the mobile phone and the device identifier 503 of the near-field large-screen device may be displayed in the first preset color. When the tablet computer and the off-ring large-screen device have established screen mirroring, the device identifier 502 of the tablet computer may be displayed in the second preset color, and the device identifier 501 of the mobile phone, the device identifier 504 of the PC, and the device identifier 503 of the near-field large-screen device may be displayed in the first preset color.

FIG. 23A, FIG. 23B, FIG. 23C, and FIG. 23D are a fourth example diagram of a color of a device identifier according to an embodiment of this application.

As shown in FIG. 23A, FIG. 23B, FIG. 23C, and FIG. 23D, for scenario 4, based on the example in FIG. 19A, FIG. 19B, FIG. 19C, FIG. 19D, FIG. 19E, and FIG. 19F:

For state 1: When the tablet computer and the PC have established screen mirroring, and the mobile phone and the in-ring large-screen device have established screen projection, the device identifier 502 of the tablet computer, the device identifier 504 of the PC, the device identifier 501 of the mobile phone, and the device identifier 503 of the in-ring large-screen device may be displayed in the second preset color.

For state 2: When the tablet computer and the off-ring large-screen device have established screen projection, and the mobile phone and the in-ring large-screen device have established screen projection, the device identifier 502 of the tablet computer, the device identifier 501 of the mobile phone, and the device identifier 503 of the in-ring large-screen device may be displayed in the second preset color, and the device identifier 504 of the PC may be displayed in the first preset color.

For state 3: When the tablet computer and the PC have established screen mirroring, and the mobile phone and the off-ring large-screen device have established screen projection, the device identifier 502 of the tablet computer, the device identifier 501 of the mobile phone, and the device identifier 504 of the PC may be displayed in the second preset color, and the device identifier 503 of the in-ring large-screen device may be displayed in the first preset color.

For state 4: When the tablet computer and the off-ring large-screen device have established screen projection, and the mobile phone and the off-ring PC have established multi-screen coordination, the device identifier 502 of the tablet computer and the device identifier 501 of the mobile phone may be displayed in the second preset color, and the device identifier 504 of the in-ring PC and the device identifier 503 of the in-ring large-screen device are displayed in the first preset color.

According to the method provided in this embodiment of this application, states of multi-device collaboration establishment by the master device or a near field device may be indicated by using different colors of a device identifier. In this way, the user can intuitively learn whether the master device and the slave device have currently established multi-device collaboration, thereby improving user experience.

The solutions of the multi-device collaboration method provided in this application are described in the foregoing embodiments provided in this application. It may be understood that to implement the foregoing functions, the electronic device includes corresponding hardware structures and/or software modules for performing the functions. A person skilled in the art should be easily aware that the example units and algorithm steps described with reference to the embodiments disclosed in this specification can be implemented in this application in a form of hardware or a combination of hardware and computer software. Whether a function is performed by hardware or by driving hardware by using computer software depends on particular applications and design constraints of the technical solutions. A skilled person may use different methods to implement the described functions for each specific application, but it should not be considered that the implementation goes beyond the scope of this application.

FIG. 24 is a schematic diagram of a structure of a multi-device collaboration apparatus according to an embodiment of this application. In an embodiment, an electronic device, for example, a first electronic device, may implement a corresponding function by using the hardware apparatus shown in FIG. 24. As shown in FIG. 24, the multi-device collaboration apparatus may include a display 1001, a memory 1002, a processor 1003, and a communication module 1004. The components may be connected by using one or more communication buses 1005.

In an embodiment, the display 1001 may include a display panel 10011 and a touch sensor 10012. The display panel 10011 is configured to display an image. The touch sensor 10012 may transfer a detected touch operation to an application processor, to determine a type of a touch event, and provide a visual output related to the touch operation by using the display panel 10011. The processor 1003 may include one or more processing units. For example, the processor 1003 may include an application processor, a modem processor, a graphics processing unit, an image signal processor, a controller, a video codec, a digital signal processor, a baseband processor, and/or a neural-network processing unit. Different processing units may be independent components, or may be integrated into one or more processors. The memory 1002 is coupled to the processor 1003, and is configured to store various software programs and/or a plurality of sets of instructions. The memory 1002 may include a volatile memory and/or a non-volatile memory.

When the software programs and/or the plurality of sets of instructions in the memory 1002 are executed by the processor 1003, the first electronic device is enabled to implement the following method steps: displaying a first page on the display 1001, where the first page includes a device identifier of the first electronic device and a device identifier of at least one near field device, the near field device includes a second electronic device, and there are a plurality of collaboration modes between the first electronic device and the second electronic device; displaying, on the first page, a mode identifier of at least one of the plurality of collaboration modes in response to a user's operation on the first page; determining a collaboration mode corresponding to a first mode identifier as a target collaboration mode in response to the user's tap operation on the first mode identifier, where the first mode identifier is any one of a mode identifier of the at least one collaboration mode; and establishing multi-device collaboration with the second electronic device based on the target collaboration mode.

According to the apparatus provided in this embodiment of this application, when the first electronic device and the second electronic device support a plurality of collaboration modes, the user may select, on the first electronic device, the target collaboration mode that the user expects to use. In this way, the first electronic device and the second electronic device can establish multi-device collaboration based on the target collaboration mode, thereby improving user experience.

In an implementation, when the software programs and/or the plurality of sets of instructions in the memory 1002 are executed by the processor 1003, the first electronic device is enabled to specifically implement the following method step to implement displaying, on the first page, the mode identifier of the at least one of the plurality of collaboration modes in response to the user's operation on the first page: displaying, on the first page, the mode identifier of the at least one of the plurality of collaboration modes in response to an operation of dragging, by the user on the first page, a device identifier of the second electronic device so that the device identifier of the second electronic device comes into contact with the device identifier of the first electronic device. In this way, when the user wants to establish multi-device collaboration between the first electronic device and the second electronic device, the user can intuitively learn, based on a mode identifier, a collaboration mode that can be selected by the user.

In an implementation, when the software programs and/or the plurality of sets of instructions in the memory 1002 are executed by the processor 1003, the first electronic device is enabled to specifically implement the following method steps to implement displaying, on the first page, the mode identifier of the at least one of the plurality of collaboration modes in response to the user's operation on the first page: establishing multi-device collaboration with the second electronic device based on a preset collaboration mode in response to an operation of dragging, by the user on the first page, a device identifier of the second electronic device so that the device identifier of the second electronic device comes into contact with the device identifier of the first electronic device; displaying, on the first page, a mode identifier of the preset collaboration mode; and displaying, on the first page, the mode identifier of the at least one of the plurality of collaboration modes in response to the user's tap operation on the mode identifier of the preset collaboration mode. In this way, when the user wants to establish multi-device collaboration between the first electronic device and the second electronic device, the first electronic device may first establish multi-device collaboration with the second electronic device based on the preset collaboration mode, and then the user selects the target collaboration mode.

In an implementation, when the software programs and/or the plurality of sets of instructions in the memory 1002 are executed by the processor 1003, the first electronic device is enabled to specifically implement the following method step to implement establishment of multi-device collaboration with the second electronic device based on the target collaboration mode: switching the multi-device collaboration between the first electronic device and the second electronic device from the preset collaboration mode to the target collaboration mode. In this way, when the first electronic device and the second electronic device support a plurality of collaboration modes, the first electronic device and the second electronic device may first establish multi-device collaboration based on the preset collaboration mode, and then the user may select, on the first electronic device, the target collaboration mode that the user expects to use. The first electronic device may switch from the preset collaboration mode to the target collaboration mode based on the user's selection, thereby improving user experience.

In an implementation, when the software programs and/or the plurality of sets of instructions in the memory 1002 are executed by the processor 1003, the first electronic device is further enabled to specifically implement the following method steps: displaying, on the first page, a mode identifier of the target collaboration mode; and terminating the multi-device collaboration with the second electronic device in response to the user's operation on the mode identifier of the target collaboration mode. In this way, the user may terminate, on the first page, the multi-device collaboration between the first electronic device and the second electronic device, thereby improving user experience.

In an implementation, when the software programs and/or the plurality of sets of instructions in the memory 1002 are executed by the processor 1003, the first electronic device is further enabled to specifically implement the following method steps: displaying a first button on the first page; displaying a second page on the display in response to the user's tap operation on the first button, where the second page includes a first list, and the first list includes an option of at least one collaboration mode; displaying a third page in response to the user's tap operation on a first option, where the first option is an option of any collaboration mode in the first list, and the third page includes a switch button of the collaboration mode corresponding to the first option; and turning on or turning off the collaboration mode in response to the user's tap operation on the switch button. In this way, the user may directly enter a multi-device collaboration settings page from a multi-device collaboration connection page, to perform control such as turn-on and turn-off on an automatic collaboration service, thereby improving user experience.

In an implementation, when the software programs and/or the plurality of sets of instructions in the memory 1002 are executed by the processor 1003, the first electronic device is further enabled to specifically implement the following method steps: displaying a second button on the first page; displaying a second list on the first page in response to the user's tap operation on the second button, where the second list includes an option of at least one collaboration mode;

and displaying first support information on the first page in response to the user's tap operation on a second option, where the second option is an option of any collaboration mode in the second list, and the first support information includes whether the first electronic device and/or the near field device support/supports the collaboration mode corresponding to the second option. In this way, the first electronic device can directly display support information of the automatic collaboration service on the multi-device collaboration connection page, thereby improving user experience.

In an implementation, the first support information includes a preset tag added to a device identifier, on the first page, of an electronic device that supports the collaboration mode corresponding to the second option.

In an implementation, when the software programs and/or the plurality of sets of instructions in the memory 1002 are executed by the processor 1003, the first electronic device is further enabled to specifically implement the following method step: displaying second support information on the first page in response to the user's tap operation on the second option, where the second support information includes whether another electronic device other than the first electronic device and the near field device supports the collaboration mode corresponding to the second option.

In an implementation, when the software programs and/or the plurality of sets of instructions in the memory 1002 are executed by the processor 1003, the first electronic device is further enabled to specifically implement the following method step: in a state in which the first electronic device has established first multi-device collaboration with a first near field device, connecting a second near field device to the first multi-device collaboration in response to an operation of dragging, by the user on the first page, a device identifier of the second near field device so that the device identifier of the second near field device comes into contact with the device identifier of the first electronic device, where the first multi-device collaboration is established based on a first collaboration mode, the first collaboration mode supports simultaneous connection of three electronic devices, and the second near field device is a near field device that supports the first collaboration mode.

In an implementation, when the software programs and/or the plurality of sets of instructions in the memory 1002 are executed by the processor 1003, the first electronic device is further enabled to specifically implement the following method steps: in a state in which the first electronic device has established second multi-device collaboration with a first near field device, terminating the second multi-device collaboration and establishing multi-device collaboration with a second near field device in response to an operation of dragging, by the user on the first page, a device identifier of the second near field device so that the device identifier of the second near field device comes into contact with the device identifier of the first electronic device, where the second multi-device collaboration is established based on a second collaboration mode, and the second collaboration mode does not support simultaneous connection of three electronic devices.

In an implementation, when the software programs and/or the plurality of sets of instructions in the memory 1002 are executed by the processor 1003, the first electronic device is further enabled to specifically implement the following method steps: in a state in which the first electronic device has established multi-device collaboration with an off-ring device, terminating the established multi-device collaboration with the off-ring device and establishing multi-device collaboration with a third near field device in response to an operation of dragging, by the user on the first page, a device identifier of the third near field device so that the device identifier of the third near field device comes into contact with the device identifier of the first electronic device.

In an implementation, when the software programs and/or the plurality of sets of instructions in the memory 1002 are executed by the processor 1003, the first electronic device is further enabled to specifically implement the following method steps: in a state in which a fourth near field device has established multi-device collaboration with an off-ring device or the fourth near field device has established multi-device collaboration with a fifth near field device, terminating the established multi-device collaboration between the fourth near field device and the fifth near field device or the off-ring device, and establishing multi-device collaboration between the first electronic device and the fourth near field device in response to an operation of dragging, by the user on the first page, a device identifier of the fourth near field device so that the device identifier of the fourth near field device comes into contact with the device identifier of the first electronic device.

In an implementation, when the software programs and/or the plurality of sets of instructions in the memory 1002 are executed by the processor 1003, the first electronic device is further enabled to specifically implement the following method steps: in a state in which each of the first electronic device and a sixth near field device has established multi-device collaboration with another electronic device, terminating the multi-device collaboration established by each of the first electronic device and the sixth near field device, and establishing multi-device collaboration between the first electronic device and the sixth near field device in response to an operation of dragging, by the user on the first page, a device identifier of the sixth near field device so that the device identifier of the sixth near field device comes into contact with the device identifier of the first electronic device.

In this way, when the first electronic device and/or the near field device have/has established multi-device collaboration, the user may directly add, on the first page, a device that is to participate in multi-device collaboration or switch a device participating in multi-device collaboration, thereby improving user experience.

In an implementation, when the software programs and/or the plurality of sets of instructions in the memory 1002 are executed by the processor 1003, the first electronic device is further enabled to specifically implement the following method steps: on the first page, displaying, in a first preset color, a device identifier of each electronic device that has established a multi-device connection, and displaying, in a second preset color, a device identifier of each electronic device that has not established a multi-device connection, where the first preset color is different from the second preset color. In this way, the first page may use different colors of a device identifier to indicate states of multi-device collaboration establishment by a master device or a near field device, thereby improving user experience.

FIG. 25 is a schematic diagram of a structure of another multi-device collaboration apparatus according to an embodiment of this application. In an embodiment, an electronic device, for example, a first electronic device, may implement a corresponding function by using the software apparatus shown in FIG. 25. As shown in FIG. 25, the multi-device collaboration apparatus may include a display module 1101, a first response module 1102, a second response module 1103, and a connection module 1104.

The display module 1101 is configured to display a first page on a display, where the first page includes a device identifier of the first electronic device and a device identifier of at least one near field device, the near field device includes a second electronic device, and there are a plurality of collaboration modes between the first electronic device and the second electronic device. The first response module 1102 is configured to display, on the first page, a mode identifier of at least one of the plurality of collaboration modes in response to a user's operation on the first page. The second response module 1103 is configured to determine a collaboration mode corresponding to a first mode identifier as a target collaboration mode in response to the user's tap operation on the first mode identifier, where the first mode identifier is any one of a mode identifier of the at least one collaboration mode. The connection module 1104 is configured to establish multi-device collaboration with the second electronic device based on the target collaboration mode.

According to the apparatus provided in this embodiment of this application, when the first electronic device and the second electronic device support a plurality of collaboration modes, the user may select, on the first electronic device, the target collaboration mode that the user expects to use. In this way, the first electronic device and the second electronic device can establish multi-device collaboration based on the target collaboration mode, thereby improving user experience.

In an implementation, the first response module 1102 is specifically configured to display, on the first page, the mode identifier of the at least one of the plurality of collaboration modes in response to an operation of dragging, by the user on the first page, a device identifier of the second electronic device so that the device identifier of the second electronic device comes into contact with the device identifier of the first electronic device. In this way, when the user wants to establish multi-device collaboration between the first electronic device and the second electronic device, the user can intuitively learn, based on a mode identifier, a collaboration mode that can be selected by the user.

In an implementation, the first response module 1102 is specifically configured to establish multi-device collaboration with the second electronic device based on a preset collaboration mode in response to an operation of dragging, by the user on the first page, a device identifier of the second electronic device so that the device identifier of the second electronic device comes into contact with the device identifier of the first electronic device; display, on the first page, a mode identifier of the preset collaboration mode; and display, on the first page, the mode identifier of the at least one of the plurality of collaboration modes in response to the user's tap operation on the mode identifier of the preset collaboration mode. In this way, when the user wants to establish multi-device collaboration between the first electronic device and the second electronic device, the first electronic device may first establish multi-device collaboration with the second electronic device based on the preset collaboration mode, and then the user selects the target collaboration mode.

In an implementation, the connection module 1104 is specifically configured to switch the multi-device collaboration between the first electronic device and the second electronic device from the preset collaboration mode to the target collaboration mode. In this way, when the first electronic device and the second electronic device support a plurality of collaboration modes, the first electronic device and the second electronic device may first establish multi-device collaboration based on the preset collaboration mode, and then the user may select, on the first electronic device, the target collaboration mode that the user expects to use. The first electronic device may switch from the preset collaboration mode to the target collaboration mode based on the user's selection, thereby improving user experience.

In an implementation, the connection module 1104 is further configured to display, on the first page, a mode identifier of the target collaboration mode; and terminate the multi-device collaboration with the second electronic device in response to the user's operation on the mode identifier of the target collaboration mode. In this way, the user may terminate, on the first page, the multi-device collaboration between the first electronic device and the second electronic device, thereby improving user experience.

In an implementation, the device collaboration apparatus further includes a third response module. The display module 1101 is further configured to display a first button on the first page. The third response module is configured to display a second page on the display in response to the user's tap operation on the first button, where the second page includes a first list, and the first list includes an option of at least one collaboration mode; display a third page in response to the user's tap operation on a first option, where the first option is an option of any collaboration mode in the first list, and the third page includes a switch button of the collaboration mode corresponding to the first option; and turn on or turn off the collaboration mode in response to the user's tap operation on the switch button. In this way, the user may directly enter a multi-device collaboration settings page from a multi-device collaboration connection page, to perform control such as turn-on and turn-off on an automatic collaboration service, thereby improving user experience.

In an implementation, the device collaboration apparatus further includes a fourth response module. The display module 1101 is further configured to display a second button on the first page. The fourth response module is configured to display a second list on the first page in response to the user's tap operation on the second button, where the second list includes an option of at least one collaboration mode; and display first support information on the first page in response to the user's tap operation on a second option, where the second option is an option of any collaboration mode in the second list, and the first support information includes whether the first electronic device and/or the near field device support/supports the collaboration mode corresponding to the second option. In this way, the first electronic device can directly display support information of the automatic collaboration service on the multi-device collaboration connection page, thereby improving user experience.

In an implementation, the first support information includes a preset tag added to a device identifier, on the first page, of an electronic device that supports the collaboration mode corresponding to the second option.

In an implementation, the fourth response module is further configured to display second support information on the first page in response to the user's tap operation on the second option, where the second support information includes whether another electronic device other than the first electronic device and the near field device supports the collaboration mode corresponding to the second option.

In an implementation, the first response module 1102 is further configured to: in a state in which the first electronic device has established first multi-device collaboration with a first near field device, connect a second near field device to the first multi-device collaboration in response to an operation of dragging, by the user on the first page, a device identifier of the second near field device so that the device identifier of the second near field device comes into contact with the device identifier of the first electronic device, where the first multi-device collaboration is established based on a first collaboration mode, the first collaboration mode supports simultaneous connection of three electronic devices, and the second near field device is a near field device that supports the first collaboration mode.

In an implementation, the first response module 1102 is further configured to: in a state in which the first electronic device has established second multi-device collaboration with a first near field device, terminate the second multi-device collaboration and establish multi-device collaboration with a second near field device in response to an operation of dragging, by the user on the first page, a device identifier of the second near field device so that the device identifier of the second near field device comes into contact with the device identifier of the first electronic device, where the second multi-device collaboration is established based on a second collaboration mode, and the second collaboration mode does not support simultaneous connection of three electronic devices.

In an implementation, the first response module 1102 is further configured to: in a state in which the first electronic device has established multi-device collaboration with an off-ring device, terminate the established multi-device collaboration with the off-ring device and establish multi-device collaboration with a third near field device in response to an operation of dragging, by the user on the first page, a device identifier of the third near field device so that the device identifier of the third near field device comes into contact with the device identifier of the first electronic device.

In an implementation, the first response module 1102 is further configured to: in a state in which a fourth near field device has established multi-device collaboration with an off-ring device or the fourth near field device has established multi-device collaboration with a fifth near field device, terminate the established multi-device collaboration between the fourth near field device and the fifth near field device or the off-ring device, and establish multi-device collaboration between the first electronic device and the fourth near field device in response to an operation of dragging, by the user on the first page, a device identifier of the fourth near field device so that the device identifier of the fourth near field device comes into contact with the device identifier of the first electronic device.

In an implementation, the first response module 1102 is further configured to: in a state in which each of the first electronic device and a sixth near field device has established multi-device collaboration with another electronic device, terminate the multi-device collaboration established by each of the first electronic device and the sixth near field device, and establish multi-device collaboration between the first electronic device and the sixth near field device in response to an operation of dragging, by the user on the first page, a device identifier of the sixth near field device so that the device identifier of the sixth near field device comes into contact with the device identifier of the first electronic device.

In this way, when the first electronic device and/or the near field device have/has established multi-device collaboration, the user may directly add, on the first page, a device that is to participate in multi-device collaboration or switch a device participating in multi-device collaboration, thereby improving user experience.

In an implementation, the display module 1101 is further configured to: on the first page, display, in a first preset color, a device identifier of each electronic device that has established a multi-device connection, and display, in a second preset color, a device identifier of each electronic device that has not established a multi-device connection, where the first preset color is different from the second preset color. In this way, the first page may use different colors of a device identifier to indicate states of multi-device collaboration establishment by a master device or a near field device, thereby improving user experience.

An embodiment of this application further provides a computer-readable storage medium. The computer-readable storage medium stores instructions. When the instructions are run on a computer, the computer is enabled to perform the method in the foregoing aspects.

An embodiment of this application further provides a computer program product including instructions. When the computer program product runs on a computer, the computer is enabled to perform the method in the foregoing aspects.

An embodiment of this application further provides a chip system. The chip system includes a processor, configured to support the foregoing apparatus in implementing functions in the foregoing aspects, for example, generating or processing information in the foregoing method. In a possible design, the chip system further includes a memory, configured to store computer instructions and data that are necessary for the multi-device collaboration apparatus. The chip system may include a chip, or may include a chip and another discrete device.

The objectives, technical solutions, and beneficial effects of the embodiments of this application are further described in detail in the foregoing specific implementations. It should be understood that the foregoing descriptions are merely specific implementations of the embodiments of this application, but are not intended to limit the protection scope of the embodiments of this application. Any modification, equivalent replacement, or improvement made based on the technical solutions in the embodiments of this application shall fall within the protection scope of the embodiments of this application.

What is claimed is:

1. A method, comprising:

displaying, by a first electronic device, a first page on a display, wherein the first page comprises a device identifier of the first electronic device and a device identifier of at least one near field device, the at least one near field device comprises a second electronic device, a plurality of collaboration modes are usable between the first electronic device and the second electronic device, and each of the plurality of collaboration modes defines a different type of multi-device collaboration associated with at least one of the following items shared among multiple electronic devices: display content, a user interface input device, or a notification;

displaying, by the first electronic device, a mode identifier of at least one of the plurality of collaboration modes on the first page, in response to a user's operation on the first page, wherein the mode identifier of the at least one of the plurality of collaboration modes replaces the device identifier of the first electronic device at an original location of the device identifier of the first electronic device;

determining, by the first electronic device, a collaboration mode corresponding to a first mode identifier as a target collaboration mode, in response to a tap operation of the user on the first mode identifier, wherein the collaboration mode corresponding to the first mode identifier is comprised in the plurality of collaboration modes; and establishing, by the first electronic device, multi-device collaboration with the second electronic device based on the target collaboration mode.

2. The method according to claim 1, wherein displaying, by the first electronic device, the mode identifier of the at least one of the plurality of collaboration modes on the first page, in response to the user's operation on the first page comprises:

displaying, by the first electronic device, the mode identifier of the at least one of the plurality of collaboration modes on the first page, in response to an operation of dragging, by the user on the first page, a device identifier of the second electronic device in a manner that the device identifier of the second electronic device comes into contact with the device identifier of the first electronic device.

3. The method according to claim 1, wherein displaying, by the first electronic device, the mode identifier of the at least one of the plurality of collaboration modes on the first page, in response to the user's operation on the first page comprises:

establishing, by the first electronic device, multi-device collaboration with the second electronic device based on a preset collaboration mode, in response to an operation of dragging, by the user on the first page, a device identifier of the second electronic device in a manner that the device identifier of the second electronic device comes into contact with the device identifier of the first electronic device;

displaying, by the first electronic device, a mode identifier of the preset collaboration mode on the first page; and displaying, by the first electronic device, the mode identifier of the at least one of the plurality of collaboration modes on the first page, in response to a tap operation of the user on the mode identifier of the preset collaboration mode.

4. The method according to claim 3, wherein establishing, by the first electronic device, the multi-device collaboration with the second electronic device based on the preset collaboration mode comprises:

switching, by the first electronic device, the multi-device collaboration between the first electronic device and the second electronic device from the preset collaboration mode to the target collaboration mode.

5. The method according to claim 1, wherein after establishing, by the first electronic device, the multi-device collaboration with the second electronic device based on the target collaboration mode, the method further comprises:

displaying, by the first electronic device, a mode identifier of the target collaboration mode on the first page; and terminating, by the first electronic device, the multi-device collaboration with the second electronic device, in response to the user's operation on the mode identifier of the target collaboration mode.

6. The method according to claim 1, further comprising:

displaying, by the first electronic device, a first button on the first page;

displaying, by the first electronic device, a second page on the display in response to a tap operation of the user on the first button, wherein the second page comprises a first list, and the first list comprises an option of at least one collaboration mode;

displaying, by the first electronic device, a third page in response to a tap operation of the user on a first option, wherein the first option is an option of any collaboration mode in the first list, and the third page comprises a switch button of the collaboration mode corresponding to the first option; and turning on or turning off, by the first electronic device, the collaboration mode in response to a tap operation of the user on the switch button.

7. The method according to claim 1, further comprising:

displaying, by the first electronic device, a second button on the first page;

displaying, by the first electronic device, a second list on the first page in response to a tap operation of the user on the second button, wherein the second list comprises an option of at least one collaboration mode; and displaying, by the first electronic device, first support information on the first page in response to a tap operation of the user on a second option, wherein the second option is an option of any collaboration mode in the second list, and the first support information comprises whether the first electronic device or the near field device supports the collaboration mode corresponding to the second option.

8. The method according to claim 7, wherein the first support information comprises a preset tag added to a device identifier, on the first page, of an electronic device that supports the collaboration mode corresponding to the second option.

9. The method according to claim 7, further comprising:

displaying, by the first electronic device, second support information on the first page in response to the tap operation of the user on the second option, wherein the second support information comprises whether another electronic device other than the first electronic device and the near field device supports the collaboration mode corresponding to the second option.

10. The method according to claim 1, further comprising:

connecting, by the first electronic device, a second near field device to a first multi-device collaboration in response to an operation of dragging, by the user on the first page, a device identifier of the second near field device in a manner that the device identifier of the second near field device comes into contact with the device identifier of the first electronic device, wherein the first electronic device is in a state in which the first electronic device has established first multi-device collaboration with a first near field device when the first electronic device connects the second near field device to the first multi-device collaboration, the first multi-device collaboration is established based on a first collaboration mode, the first collaboration mode supports simultaneous connection of three electronic devices, and the second near field device is a near field device that supports the first collaboration mode.

11. The method according to claim 1, further comprising:

terminating, by the first electronic device, a second multi-device collaboration and establishing multi-device collaboration with a second near field device in response to an operation of dragging, by the user on the first page, a device identifier of the second near field device in a manner that the device identifier of the second near field device comes into contact with the device identifier of the first electronic device, wherein the first electronic device is in a state in which the first electronic device has established a second multi-device collaboration with a first near field device when the second multi-device collaboration is terminated, the second multi-device collaboration is established based on a second collaboration mode, and the second collaboration mode does not support simultaneous connection of three electronic devices.

12. The method according to claim 1, further comprising:

receiving, by the first electronic device, an operation of dragging a device identifier of a third near field device in a manner that the device identifier of the third near field device comes into contact with the device identifier of the first electronic device, when the first electronic device is in a state in which the first electronic device has established multi-device collaboration with an off-ring device; and terminating, by the first electronic device, the established multi-device collaboration with the off-ring device and establishing multi-device collaboration with the third near field device in response to the operation.

13. The method according to claim 1, further comprising:

when in a state in which a fourth near field device has established multi-device collaboration with an off-ring device or the fourth near field device has established multi-device collaboration with a fifth near field device, the first electronic device terminates the established multi-device collaboration between the fourth near field device and the fifth near field device or the off-ring device, and establishes multi-device collaboration between the first electronic device and the fourth near field device in response to an operation of dragging, by the user on the first page, a device identifier of the fourth near field device in a manner that the device identifier of the fourth near field device comes into contact with the device identifier of the first electronic device.

14. The method according to claim 1, further comprising:

when in a state in which each of the first electronic device and a sixth near field device have established multi-device collaboration with another electronic device, the first electronic device terminates the multi-device collaboration established by each of the first electronic device and the sixth near field device, and establishes multi-device collaboration between the first electronic device and the sixth near field device in response to an operation of dragging, by the user on the first page, a device identifier of the sixth near field device in a manner that the device identifier of the sixth near field device comes into contact with the device identifier of the first electronic device.

15. The method according to claim 1, further comprising:

displaying, by the first electronic device, a device identifier of each electronic device that has established a multi-device connection in a first preset color on the first page; and displaying, by the first electronic device, a device identifier of each electronic device that has not established a multi-device connection in a second preset color on the first page, wherein the first preset color is different from the second preset color.

16. An electronic device, comprising:

a processor;

a memory; and a display, wherein the memory stores a computer program, and when the computer program is executed by the processor, the electronic device is enabled to perform:

displaying a first page on the display, wherein the first page comprises a device identifier of a first electronic device and a device identifier of at least one near field device, the near field device comprises a second electronic device, there are a plurality of collaboration modes between the first electronic device and the second electronic device, and each of the plurality of collaboration modes defines a different type of multi-device collaboration associated with at least one of the following items shared among multiple electronic devices: display content, a user interface input device, or a notification;

displaying a mode identifier of at least one of the plurality of collaboration modes on the first page, in response to a user's operation on the first page, wherein the mode identifier of the at least one of the plurality of collaboration modes replaces the device identifier of the first electronic device at an original location of the device identifier of the first electronic device;

determining a collaboration mode corresponding to a first mode identifier as a target collaboration mode, in response to a tap operation of the user on the first mode identifier, wherein the collaboration mode corresponding to the first mode identifier is comprised in the plurality of collaboration modes; and establishing multi-device collaboration with the second electronic device based on the target collaboration mode.

17. A non-transitory computer-readable storage medium, wherein the non-transitory computer-readable storage medium stores a computer program, and when the computer program is run on a computer, the computer is enabled to perform:

displaying a first page on a display, wherein the first page comprises a device identifier of a first electronic device and a device identifier of at least one near field device, the near field device comprises a second electronic device, a plurality of collaboration modes are usable between the first electronic device and the second electronic device, and each of the plurality of collaboration modes defines a different type of multi-device collaboration associated with at least one of the following items shared among multiple electronic devices: display content, a user interface input device, or a notification;

displaying a mode identifier of at least one of the plurality of collaboration modes on the first page, in response to a user's operation on the first page, wherein the mode identifier of the at least one of the plurality of collaboration modes replaces the device identifier of the first electronic device at an original location of the device identifier of the first electronic device;

determining a collaboration mode corresponding to a first mode identifier as a target collaboration mode, in response to a tap operation of the user on the first mode identifier, wherein the collaboration mode corresponding to the first mode identifier is comprised in the plurality of collaboration modes; and establishing multi-device collaboration with the second electronic device based on the target collaboration mode.

* * * * *